(12) United States Patent
Enomoto et al.

(10) Patent No.: US 9,561,704 B2
(45) Date of Patent: Feb. 7, 2017

(54) VEHICULAR THERMAL MANAGEMENT SYSTEM INCLUDING SELECTIVE HEAT TRANSFER MEDIUM CIRCULATION

(71) Applicant: DENSO CORPORATION, Kariya, Aichi-pref. (JP)

(72) Inventors: Norihiko Enomoto, Nagoya (JP); Nobuharu Kakehashi, Toyoake (JP); Michio Nishikawa, Nagoya (JP); Yasumitsu Omi, Okazaki (JP); Takashi Yamanaka, Kariya (JP); Masayuki Takeuchi, Nukata-gun (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 201 days.

(21) Appl. No.: 14/403,148

(22) PCT Filed: May 16, 2013

(86) PCT No.: PCT/JP2013/003126
§ 371 (c)(1),
(2) Date: Nov. 21, 2014

(87) PCT Pub. No.: WO2013/175739
PCT Pub. Date: Nov. 28, 2013

(65) Prior Publication Data
US 2015/0101789 A1 Apr. 16, 2015

(30) Foreign Application Priority Data

May 24, 2012 (JP) .................................. 2012-118357
Apr. 22, 2013 (JP) .................................. 2013-089455

(51) Int. Cl.
*B60H 1/00* (2006.01)
*B60K 11/02* (2006.01)
(Continued)

(52) U.S. Cl.
CPC ...... *B60H 1/00278* (2013.01); *B60H 1/00485* (2013.01); *B60H 1/00899* (2013.01);
(Continued)

(58) Field of Classification Search
CPC ... B60H 1/00278; B60H 1/00899; B60H 1/00; B60H 1/06; B60K 11/02
See application file for complete search history.

(56) References Cited

U.S. PATENT DOCUMENTS 5,327,987 A * 7/1994 Abdelmalek ............ B60K 6/48
180/65.25
5,537,956 A * 7/1996 Rennfeld ........... B60H 1/00885
123/41.29

(Continued)

FOREIGN PATENT DOCUMENTS

JP H08138762 A 5/1996
JP 2002322911 A 11/2002
(Continued)

OTHER PUBLICATIONS

International Search Report and Written Opinion (in Japanese with English Translation) for PCT/JP2013/003126, mailed Aug. 13, 2013; ISA/JP.

*Primary Examiner* — Ljiljana Ciric
(74) *Attorney, Agent, or Firm* — Harness, Dickey & Pierce, P.L.C.

(57) ABSTRACT

First circulation portions switch a flow of a heat transfer medium such that one of the heat transfer media for two systems selectively circulates through a radiator flow path or a first bypass flow path. Second circulation portions switch the flow of the heat transfer medium such that the heat transfer media for the two systems selectively circulate with respect to a second flow path group. The first circulation portions and the second circulation portions are adapted to switch the flow of the heat transfer medium so as to form a (Continued)

first circulation circuit for allowing the heat transfer medium to circulate among a first flow path group, the second flow path group, and a first pump, as well as a second circulation circuit for allowing the heat transfer medium to circulate among the first flow path group, the second flow path group, and a second pump.

33 Claims, 36 Drawing Sheets

(51) Int. Cl.

| | | |
|---|---|---|
| F01P 3/20 | (2006.01) | |
| B60L 1/00 | (2006.01) | |
| B60L 1/02 | (2006.01) | |
| B60L 11/14 | (2006.01) | |
| B60L 11/18 | (2006.01) | |
| B60H 1/06 | (2006.01) | |
| F01P 7/16 | (2006.01) | |
| H01M 10/625 | (2014.01) | |
| H01M 10/6563 | (2014.01) | |
| H01M 10/6561 | (2014.01) | |
| B60K 11/06 | (2006.01) | |
| B60K 1/00 | (2006.01) | |
| B60K 1/04 | (2006.01) | |

(52) U.S. Cl.
CPC .............. *B60H 1/06* (2013.01); *B60K 11/02* (2013.01); *B60L 1/003* (2013.01); *B60L 1/02* (2013.01); *B60L 11/14* (2013.01); *B60L 11/1803* (2013.01); *B60L 11/1816* (2013.01); *B60L 11/1874* (2013.01); *B60L 11/1875* (2013.01); *F01P 3/20* (2013.01); *F01P 7/16* (2013.01); *F01P 7/165* (2013.01); *H01M 10/625* (2015.04); *H01M 10/6561* (2015.04); *H01M 10/6563* (2015.04); *B60H 2001/00307* (2013.01); *B60H 2001/00928* (2013.01); *B60K 11/06* (2013.01); *B60K 2001/003* (2013.01); *B60K 2001/005* (2013.01); *B60K 2001/0416* (2013.01); *B60L 2240/34* (2013.01); *B60L 2240/36* (2013.01); *B60L 2240/445* (2013.01); *B60L 2240/525* (2013.01); *B60L 2240/545* (2013.01); *F01P 2050/24* (2013.01); *F01P 2060/08* (2013.01); *Y02T 10/70* (2013.01); *Y02T 10/705* (2013.01); *Y02T 10/7005* (2013.01); *Y02T 10/7072* (2013.01); *Y02T 10/7077* (2013.01); *Y02T 90/14* (2013.01)

(56) References Cited

U.S. PATENT DOCUMENTS

| | | | | |
|---|---|---|---|---|
| 5,669,338 A * | 9/1997 | Pribble | ............... | F01P 7/165 123/41.29 |
| 5,678,760 A * | 10/1997 | Muso | ................ | B60K 11/02 165/41 |
| 5,834,132 A | 11/1998 | Hasegawa et al. | | |
| 5,839,656 A * | 11/1998 | Yamano | ............. | B60H 1/00278 180/65.1 |
| 6,040,561 A * | 3/2000 | Murty | ................ | B60H 1/00392 219/494 |
| 6,124,644 A * | 9/2000 | Olson | ................ | F01P 3/20 180/165 |
| 6,213,233 B1 * | 4/2001 | Sonntag | ............... | B60H 1/004 123/142.5 R |
| 6,330,925 B1 * | 12/2001 | Ovshinsky | ............. | B60K 6/24 180/65.245 |
| 6,357,541 B1 * | 3/2002 | Matsuda | ............. | B60K 6/22 165/43 |
| 6,450,275 B1 * | 9/2002 | Gabriel | ................ | B60K 6/22 165/41 |
| 6,575,258 B1 * | 6/2003 | Clemmer | ............. | B60K 11/02 165/41 |
| 6,616,059 B2 | 9/2003 | Sabhapathy et al. | | |
| 7,789,176 B2 * | 9/2010 | Zhou | ............... | B60H 1/00278 180/65.1 |
| 8,613,305 B2 * | 12/2013 | Yu | ................ | B60H 1/00492 123/41.14 |
| 8,662,226 B2 * | 3/2014 | Varns | ................ | B60H 1/00278 135/42 |
| 8,725,330 B2 * | 5/2014 | Failing | ................ | B60L 3/00 701/22 |
| 8,742,701 B2 * | 6/2014 | Sujan | ................ | F01P 3/20 123/41.09 |
| 8,851,153 B2 * | 10/2014 | Park | ................ | B60K 6/46 165/41 |
| 8,899,492 B2 * | 12/2014 | Kelty | ................ | B60L 11/1816 236/34 |
| 8,907,629 B2 * | 12/2014 | Kelty | ................ | B60L 11/187 320/132 |
| 9,141,117 B2 * | 9/2015 | Shen | ................ | G05D 23/1932 |
| 9,233,593 B2 * | 1/2016 | Beschieru | ............. | B60H 1/00278 |
| 9,410,473 B2 * | 8/2016 | Cregut | ............. | B60K 11/02 |
| 2002/0027027 A1 * | 3/2002 | Skala | ............. | B60L 11/1892 180/65.22 |
| 2002/0040896 A1 * | 4/2002 | Ap | ............. | B60K 1/04 219/208 |
| 2002/0121554 A1 | 9/2002 | Vaudry et al. | | |
| 2003/0193009 A1 * | 10/2003 | Dill | ............. | H01M 8/04029 250/206 |
| 2005/0133215 A1 * | 6/2005 | Ziehr | ............. | B60H 1/00392 165/202 |
| 2005/0241865 A1 * | 11/2005 | Varenne | ............. | B60L 1/003 180/65.1 |
| 2007/0199320 A1 * | 8/2007 | Yager | ............. | F02B 29/0412 60/599 |
| 2008/0103635 A1 * | 5/2008 | Vuk | ............. | B60H 1/00828 700/300 |
| 2008/0251235 A1 * | 10/2008 | Zhou | ............. | B60H 1/00278 165/41 |
| 2008/0251303 A1 | 10/2008 | Rouaud et al. | | |
| 2012/0210746 A1 | 8/2012 | Kadle et al. | | |
| 2014/0124170 A1 * | 5/2014 | Young | ............. | F01P 3/20 165/104.14 |
| 2015/0217622 A1 * | 8/2015 | Enomoto | ............. | B60H 1/00878 165/42 |

FOREIGN PATENT DOCUMENTS

| | | |
|---|---|---|
| JP | 2002352867 A | 12/2002 |
| JP | 3373770 B2 | 2/2003 |
| JP | 3443296 B2 | 9/2003 |
| JP | 2003262127 A | 9/2003 |
| JP | 2006051852 A | 2/2006 |
| JP | 2006321389 A | 11/2006 |
| JP | 4013832 B2 | 11/2007 |
| JP | 2009507717 A | 2/2009 |
| JP | 2009202794 A | 9/2009 |
| JP | 2010272289 A | 12/2010 |
| JP | 4657723 B2 | 3/2011 |
| JP | 2011098628 A | 5/2011 |
| JP | 2011121551 A | 6/2011 |
| JP | 4753996 B2 | 8/2011 |
| JP | 2013230805 A | 11/2013 |

\* cited by examiner

VEHICULAR THERMAL MANAGEMENT SYSTEM INCLUDING SELECTIVE HEAT TRANSFER MEDIUM CIRCULATION

CROSS REFERENCE TO RELATED APPLICATIONS

This application is a U.S. National Phase Application under 35 U.S.C. 371 of International Application No.PCT/JP2013/0031 filed on may 16,2013 and published in Japanese as WO 2013/175739 A1 on Nov. 28, 2013. This application is based on and claims the benefit of priority from Japanese Patent Applications No. 2012-118357 filed on May 24, 2012, and No. 2013-089455 filed on Apr. 22, 2013. The entire disclosures of all of the above applications are incorporated herein by reference.

FIELD OF THE INVENTION

The preset disclosure relates to a thermal management system used for a vehicle.

BACKGROUND ART

Conventionally, Patent Document 1 discloses a heat controller for a vehicle, which cools a motor generator and an inverter, and cools or heats a battery, a vehicle compartment, and a reduction gear mechanism.

Heat controllers for vehicles include a cooling circuit for circulation of a coolant to cool the motor generator and the inverter, a first circulation circuit for circulation of a coolant to cool and heat the battery, vehicle compartment, and reduction gear mechanism, and a second circulation circuit for circulation of a coolant that passes through an exterior heat exchanger to exchange heat with outside air.

Further, the heat controllers include a first valve for connecting and disconnecting between the cooling circuit and the first circulation circuit, a second valve for connecting the cooling circuit to either the first circulation circuit or second circulation circuit, and a third valve for connecting and disconnecting between the cooling circuit and the second circulation circuit. The respective valves are controlled to switch the subject of connection of the cooling circuit between the first and second circulation circuits.

Heat can be transferred by a heat transfer device between a coolant circulating through the first circulation circuit and another coolant circulating through the second circulation circuit. The heat transfer device transfers the heat from the coolant at a low temperature to the coolant at a high temperature, between the coolants in the first and second circulation circuits.

The cooling circuit is connected to the first circulation circuit or second circulation circuit by use of the first to third valves, so that the heat of the coolant in the cooling circuit can be dissipated to the outside air by the exterior heat exchanger in the second circulation circuit, thereby cooling the motor generator and inverter.

The heat of the coolant in the first circulation circuit is transferred to the coolant in the second circulation circuit by the heat transfer device, and the heat of the coolant in the second circulation circuit is dissipated into the outside air by the exterior heat exchanger, which can cool the battery, vehicle compartment, and reduction gear mechanism.

The heat of the coolant in the second circulation circuit is transferred to the coolant in the first circulation circuit by the heat transfer device, and the coolant having a low temperature in the second circulation circuit exchanges heat with outside air at the exterior heat exchanger, thereby heating the battery, vehicle compartment, and reduction gear mechanism.

PRIOR ART LIST

Patent Documents

Patent Document 1: Japanese Patent Unexamined Publication No. 2011-121551

SUMMARY OF THE INVENTION

As a result of intensive studies by the inventors of the present application, a motor generator and an inverter can be switched and connected to either a first circulation circuit or a second circulation circuit, so that coolants (heat media) for two systems can be switched and circulated through the motor generator and inverter. However, the battery, the vehicle compartment, and the reduction gear mechanism cannot be directly connected to the second circulation circuit, and thereby it is impossible to switch and circulate the coolants for two systems. Accordingly, the battery, the vehicle compartment, and the reduction gear mechanism might have a low degree of flexibility in temperature adjustment.

The second circulation circuit constantly allows the coolant to pass through the exterior heat exchanger (radiator), thereby consistently dissipating or absorbing heat (exchanging heat) with respect to the outside air. This arrangement makes it difficult to exchange heat between a plurality of devices to be heat-exchanged so as to effectively use the heat.

The present disclosure has been made in the foregoing points, and it is an object of the present disclosure to provide a thermal management system for a vehicle that can switch and circulate the heat transfer media for the two systems among the devices to be heat-exchanged, while interrupting heat exchange between the heat transfer media and outside air in a radiator.

A thermal management system for a vehicle according to the present disclosure includes a radiator, a first flow path group, a cooler, a heater, a heat transfer medium circulation device, a plurality of devices, a second flow path group, a first pump, a second pump, a first circulation portion, and a second circulation portion. The radiator exchanges heat between a heat transfer medium and outside air. The first flow path group includes a radiator flow path in which the heat transfer medium flows and the radiator is disposed, and a first bypass flow path and a second bypass flow path that allow the heat transfer medium to bypass the radiator. The cooler cools the heat transfer medium, and the heater heats the heat transfer medium. In the heat medium circulation device, the heat transfer medium heated by the heater circulates. The plurality of devices to be heat-exchanged exchanges heat with the heat transfer medium. The second flow path group includes (i) a cooler flow path in which the heat transfer medium flows and the cooler is disposed, (ii) a heater flow path in which the heat transfer medium flows and the heater is disposed, and a plurality of device flow paths in which the heat transfer medium flows and the devices to be heat-exchanged are disposed. The first pump and the second pump sucks and discharges the heat transfer medium in two systems. The first circulation portion circulates heat transfer medium in two systems, discharged from the first pump and the second pump, with respect to the first flow path group. The second circulation portion circulates the heat transfer medium in the two systems, with respect to the second flow path group.

The heat transfer medium circulation device is disposed in the heater flow path, or the heater flow path is connected to an end of a flow path with the heat transfer medium circulation device disposed therein. The first circulation portion switches a flow of the heat transfer medium such that one of the heat transfer media for the two systems selectively circulates through the radiator flow path or the first bypass flow path, the second circulation portion switches a flow of the heat transfer medium such that the heat transfer media for the two systems selectively circulate with respect to the second flow path group. In addition, the first circulation portion and the second circulation portion switch the flow of the heat transfer medium so as to form (i) a first circulation circuit that allows the heat transfer medium to circulate between the second flow path group and the first pump, as well as (ii) a second circulation circuit that allows the heat transfer medium to circulate among the first flow path group, the second flow path group, and the second pump.

With this arrangement, the device flow paths can be switched to the first circulation circuit on the first pump side or the second circulation circuit on the second pump side, so that the heat transfer mediums in two systems can be switched between and circulated through the devices to be heat-exchanged.

The circulation of the heat transfer medium to the radiator flow path can be blocked to thereby interrupt the heat exchange with the outside air in the radiator.

DETAILED DESCRIPTION OF THE PREFERRED EMBODIMENTS

Figure 1:
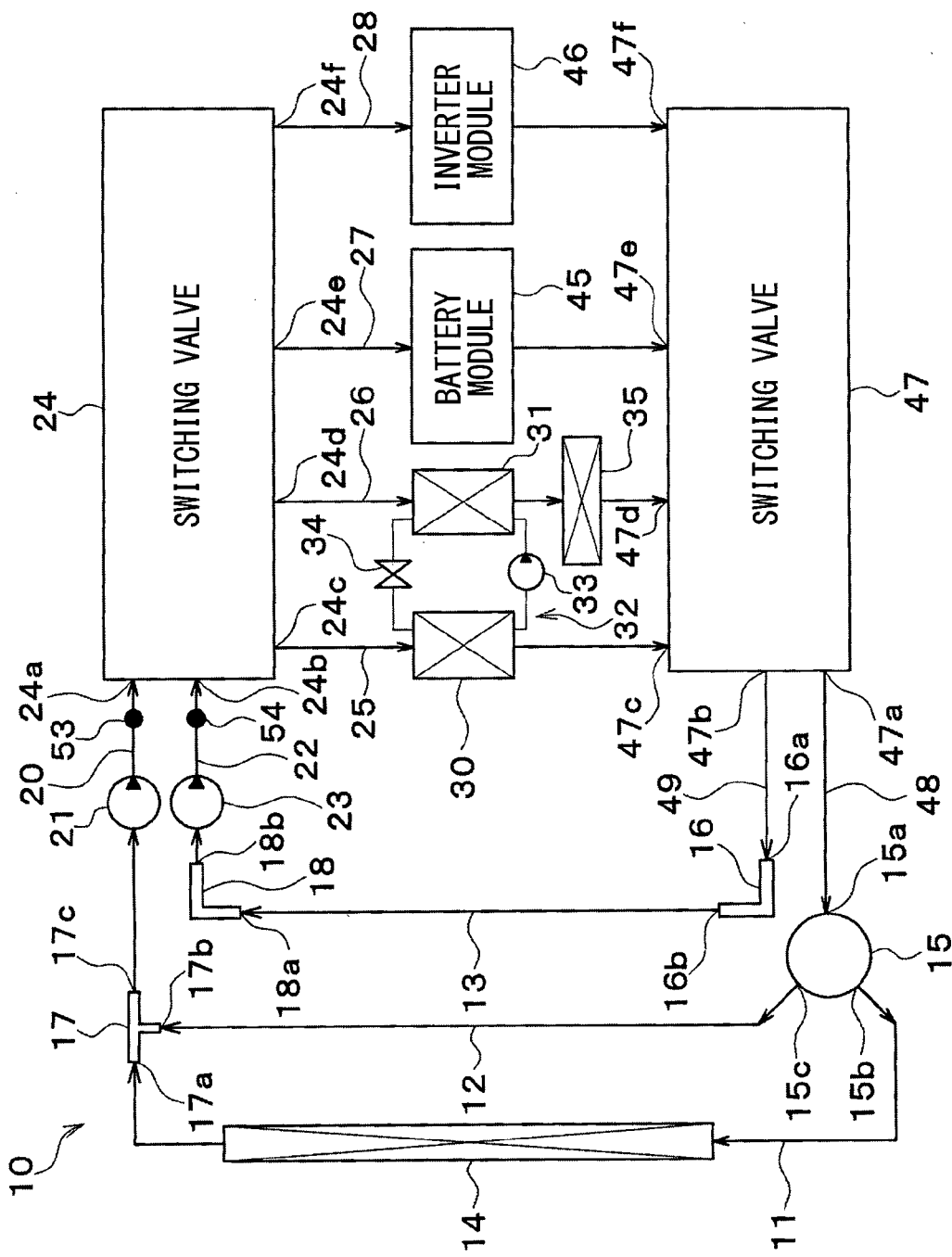
FIG. 1 is an entire configuration diagram of a vehicle thermal management system according to a first embodiment of the invention.

In the following, preferred embodiments of the present disclosure will be described with reference to the accompanying drawings. The same or equivalent parts in the embodiments below are indicated by the same reference characters throughout the figures.

(First Embodiment)

Now, a first embodiment of the invention will be described based on FIGS. 1 to 19. A vehicle thermal management system 10 shown in FIG. 1 is used to perform air conditioning (cooling or heating) of various devices mounted on a vehicle (devices requiring cooling or heating) or an interior of the vehicle to an appropriate temperature.

In this embodiment, the thermal management system 10 is applied to a hybrid vehicle that can obtain the driving force for traveling from both an internal combustion engine (engine) and an electric motor for traveling.

A hybrid vehicle of this embodiment is configured as a plug-in hybrid car that can charge a battery (vehicle-mounted battery) mounted on the vehicle with power supplied from an external power source (commercial power source) during stopping of the vehicle. For example, a lithium ion battery can be used as the battery.

A driving force output from an engine is used not only for traveling of the vehicle, but also for operating a generator. Power generated by the generator and power supplied from the external power source can be stored in the battery. The power stored in the battery can be supplied not only to the electric motor for traveling, but also to various vehicle-mounted devices, such as electric components included in a cooling system.

As shown in FIG. 1, the thermal management system 10 includes a radiator flow path 11, a first bypass flow path 12, and a second bypass flow path 13, which are arranged in parallel. The radiator flow path 11, the first bypass flow path 12, and the second bypass flow path 13 are coolant flow paths through which coolant flows.

The coolant is a fluid serving as the thermal medium. In this embodiment, a liquid containing at least ethylene glycol or dimethylpolysiloxane, or an antifreezing solution can be used as the coolant.

The radiator 14 is disposed in the radiator flow path 11. The radiator 14 is a radiator (exterior heat exchanger) that dissipates heat of the coolant into the outside air by exchanging the heat between the coolant and the air outside the vehicle compartment (hereinafter referred to as an outside air).

The outside air is blown to the radiator 14 by an exterior blower (not shown). The radiator 14 is disposed at the forefront of the vehicle. During traveling of the vehicle, traveling air can be blown on the radiator 14.

The first bypass flow path 12 and the second bypass flow path 13 are bypass flow paths through which the coolant flows bypassing the radiator 14. A device for exchanging heat with the coolant may be disposed at the midpoints of the first bypass flow path 12 and the second bypass flow path 13.

A three-way valve 15 is connected to the upstream side of the radiator flow path 11 and the first bypass flow path 12. The three-way valve 15 includes an inlet 15a for inflow of the coolant, a first outlet 15b and a second outlet 15c for outflow of the coolant, and a valve body (not shown). The valve body switches the flow of coolant such that the coolant flowing into the inlet 15a selectively flows from the first outlet 15b or the second outlet 15c.

The first outlet 15b of the three-way valve 15 is connected to the radiator flow path 11, and the second outlet 15c of the three-way valve 15 is connected to the first bypass flow path 12.

A first communication flow path 16 is connected to an upstream side of the second bypass flow path 13. The first communication flow path 16 includes an inlet 16a for inflow of the coolant, and an outlet 16b for outflow of the coolant. The first communication flow path 16 is a flow path for connecting the inlet 16a to the outlet 16b.

The outlet 16b of the first communication flow path 16 is connected to the second bypass flow path 13. Thus, the coolant flowing into the inlet 16a of the first communication flow path 16 passes through the first communication flow path 16 and then flows out of the outlet 16b into the second bypass flow path 13.

The downstream side of the radiator flow path 11 is connected to a first inlet 17a of a merging flow path 17. The downstream side of the first bypass flow path 12 is connected to a second inlet 17b of the merging flow path 17. The merging flow path 17 merges the coolant flowing into the first inlet 17a with the coolant flowing into the second inlet 17b to cause the merged coolant to flow out of an outlet 17c.

The downstream side of the second bypass flow path 13 is connected to a second communication flow path 18. The second communication flow path 18 includes an inlet 18a for inflow of the coolant, and an outlet 18b for outflow of the coolant. The second communication flow path 18 is a flow path for connecting the inlet 18a to the outlet 18b.

The outlet 18b of the second communication flow path 18 is connected to the second bypass flow path 13. Thus, the coolant flowing from the second bypass flow path 13 into the inlet 18a of the second communication flow path 18 passes through the second communication flow path 18 and then flows out of the outlet 18b.

The three-way valve 15, the first communication flow path 16, the merging flow path 17, and the second communication flow path 18 constitute a first circulation portion that allows the coolants for two systems to circulate through the radiator flow path 11, the first bypass flow path 12, and the second bypass flow path 13 (first flow path group). The outlet 17c of the merging flow path 17 is connected to a flow path 20. The flow path 20 is provided with a first pump 21. The outlet 18b of the second communication flow path 18 is connected to a flow path 22. The flow path 22 is provided with a second pump 23.

Each of the first pump 21 and the second pump 23 is an electric pump for sucking and discharging the coolant. The first pump 21 and the second pump 23 are arranged in parallel with each other. The coolants for two systems are sucked into and discharged from the flow path by the first and second pumps 21 and 23.

The downstream side of the flow path 20 on the first pump 21 side is connected to a first inlet 24a of a first switching valve 24. The downstream side of the flow path 22 on the second pump 23 side is connected to a second inlet 24b of the first switching valve 24.

The first switching valve 24 includes four (a number of) outlets 24c, 24d, 24e, and 24f from which the coolant flows. The first switching valve 24 switches the coolant flow such that the coolant from each of the outlets 24c, 24d, 24e, and 24f flows into either the first inlet 24a or the second inlet 24b.

The outlet 24c of the first switching valve 24 is connected to a first parallel flow path 25. The outlet 24d of the first switching valve 24 is connected to a second parallel flow path 26. The outlet 24e of the first switching valve 24 is connected to a third parallel flow path 27. The outlet 24f of the first switching valve 24 is connected to a fourth parallel flow path 28.

A coolant-cooling heat exchanger 30 is disposed in the first parallel flow path 25. A coolant-heating heat exchanger 31 is disposed in the second parallel flow path 26.

The coolant-cooling heat exchanger 30 serves as a low-pressure side heat exchanger of a refrigeration cycle 32. The coolant-cooling heat exchanger 30 is a cooler for cooling the coolant by exchanging heat between the coolant and a low-pressure refrigerant of the refrigeration cycle 32. Thus, the first parallel flow path 25 serves as a flow path for the cooler in which the cooler is disposed.

The coolant-heating heat exchanger 31 serves as a high-pressure side heat exchanger of the refrigeration cycle 32. The coolant-heating heat exchanger 31 is a heater for heating the coolant by exchanging heat between the high-pressure refrigerant of the refrigeration cycle 32 and the outside air. Thus, the second parallel flow path 26 serves as a heater flow path in which the heater is disposed.

The refrigeration cycle 32 is a vapor compression freezer. In this example, the refrigerant is a fluorocarbon refrigerant, and the refrigeration cycle 32 employs a subcritical refrigeration cycle whose high-pressure side refrigerant pressure does not exceed the critical pressure of the refrigerant.

The refrigeration cycle 32 includes not only the coolant-cooling heat exchanger 30 as a low-pressure side heat exchanger and the coolant-heating heat exchanger 31 as a high-pressure side heat exchanger, but also a compressor 33 and an expansion valve 34 (first expansion valve).

The compressor 33 is an electric compressor driven by an electric power supplied from the battery. The compressor 33 is adapted to suck gas-phase refrigerant and to compress and discharge the refrigerant. The compressor 33 may be rotatably driven by the engine via a pulley, a belt, and the like.

The high-temperature and high-pressure gas-phase refrigerant discharged from the compressor 33 exchanges heat with the coolant by the coolant-heating heat exchanger 31 as the high-pressure side heat exchanger to have its heat absorbed to be condensed.

The expansion valve 34 is a decompression device for decompressing and expanding a liquid-phase refrigerant condensed by the coolant-heating heat exchanger 31. The low-pressure refrigerant decompressed and expanded by the expansion valve 34 exchanges heat with the coolant by the coolant-cooling heat exchanger 30 as the low-pressure side heat exchanger to absorb heat from the coolant, thereby evaporating itself. The gas-phase refrigerant evaporated at the coolant-cooling heat exchanger 30 is sucked into and compressed by the compressor 33.

The radiator 14 cools the coolant by outside air, whereas the coolant-cooling heat exchanger 30 cools the coolant by the low-pressure refrigerant in the refrigeration cycle 32. Thus, the temperature of the coolant cooled by the coolant-cooling heat exchanger 30 is lower than that of the coolant cooled by the radiator 14.

Specifically, the radiator 14 cannot cool the coolant to a temperature lower than that of the outside air, while the coolant-cooling heat exchanger 30 can cool the coolant to a temperature lower than that of the outside air.

A heater core 35 is disposed on the downstream side of the coolant-heating heat exchanger 31 in the second parallel flow path 26. The heater core 35 is a heat exchanger for heating that exchanges heat between the air to be blown into the vehicle interior and the coolant heated by the coolant-heating heat exchanger 31, thereby heating the air. The heater core 35 is a coolant circulation device (heat medium circulation device) for allowing the coolant to circulate therethrough.

Figure 2:
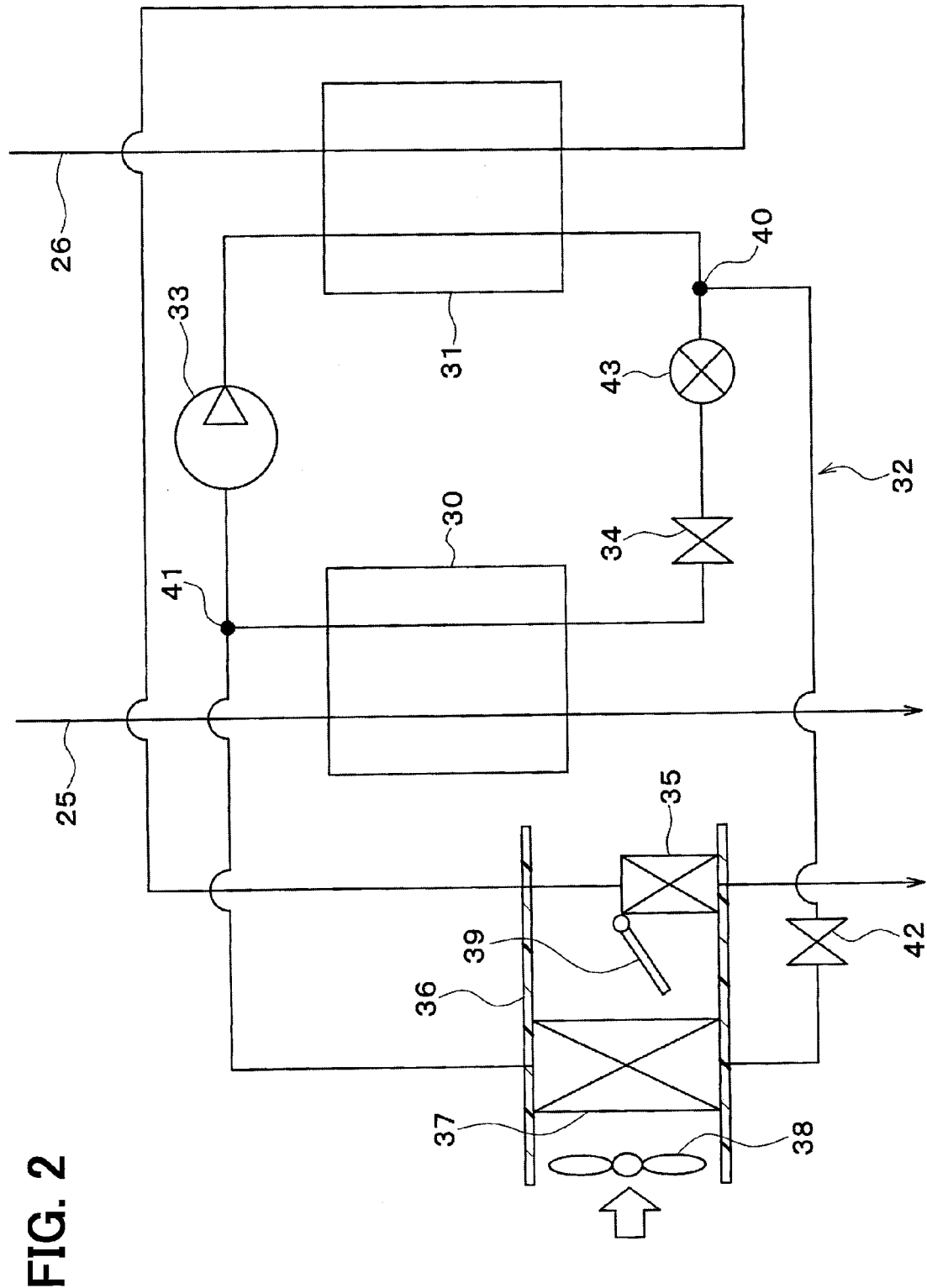
FIG. 2 is a configuration diagram of a refrigeration cycle in the first embodiment.

As shown in FIG. 2, the heater core 35 is disposed on the downstream side of the air flow of an evaporator 37 of the refrigeration cycle 32 within a casing 36 of the interior air conditioning unit.

The casing 36 forms an air passage through which the air blown by an interior blower 38 flows. The evaporator 37 is a low-pressure side heat exchanger of the refrigeration cycle 32, specifically, a heat exchanger for cooling that exchanges heat between the air and a low-pressure refrigerant of the refrigeration cycle to thereby cool the air.

An air mix door 39 is disposed in between the evaporator 37 and the heater core 35 within the casing 36 of the interior air conditioning unit. The air mix door 39 serves as an air volume ratio adjuster that adjusts a ratio of the volume of the air passing through the heater core 35 to that of the air bypassing the heater core 35.

In the refrigeration cycle 32, the evaporator 37 is connected in parallel with the coolant-cooling heat exchanger 30. Specifically, a branch portion 40 is provided for branching the refrigerant flow between the coolant-heating heat exchanger 31 and the expansion valve 34. A merging portion 41 is provided for merging the refrigerant flows between the coolant-cooling heat exchanger 30 and the compressor 33.

The refrigerants branched by the branch portion 40 respectively flow through an expansion valve 42 for the evaporator (second expansion valve) and the coolant-cooling heat exchanger 30 to be merged in the merging portion 41.

The second expansion valve 42 is a decompression device for decompressing and expanding a liquid-phase refrigerant condensed by the coolant-heating heat exchanger 31. The low-pressure refrigerant decompressed and expanded by the second expansion valve 42 exchanges heat with the air by the evaporator 37 as a low-pressure heat exchanger to absorb heat from the air, thereby evaporating itself. The gas-phase refrigerant evaporated at the evaporator 37 is sucked into and compressed by the compressor 33.

In the refrigeration cycle 32, an electromagnetic valve 43 for opening/closing a refrigerant flow path is disposed in the refrigerant flow path between the branch portion 40 and the expansion valve 34. When the electromagnetic valve 43 is closed, the supply of the refrigerant toward the expansion valve 34 and the coolant-cooling heat exchanger 30 is interrupted.

As shown in FIG. 1, a battery module 45 as the device to be heat-exchanged is disposed in the third parallel flow path 27, and an inverter module 46 as another device to be heat-exchanged is disposed in the fourth parallel flow path 28. Thus, the third parallel flow path 27 and the fourth parallel flow path 28 constitute a plurality of flow paths for the devices to be heat-exchanged (the number of flow paths being the same as that of the devices to be heat-exchanged) in which the devices to be heat-exchanged are respectively disposed individually.

Figure 3:
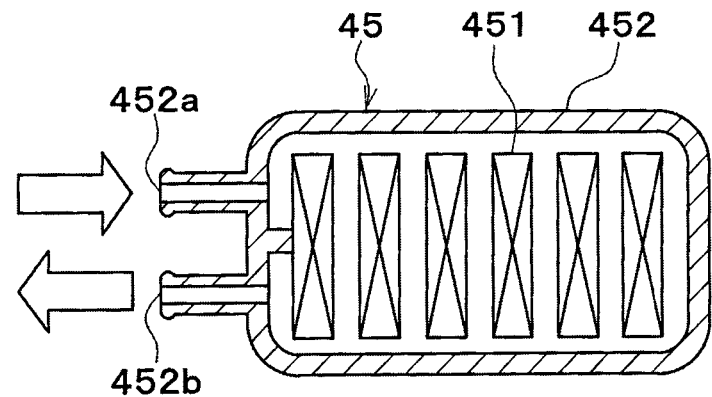
FIG. 3 is a cross-sectional view of a battery module in the first embodiment.

As shown in FIG. 3, the battery module 45 includes batteries 451 and a tank 452. The batteries 451 are composed of a plurality of battery cells or the like, and accommodated in the tank 452.

The tank 452 is provided with an inlet 452a and an outlet 452b for the coolant. The coolant entering the inlet 452a flows out of the outlet 452b through an internal space of the tank 452.

The coolant flowing through the internal space of the tank 452 exchanges heat with the batteries 451 to cool or heat the batteries 451. Each battery 451 preferably has its temperature maintained in a range of about 10° C. to 40° C. for the purpose of preventing the reduction in output, charging efficiency, degradation, and the like.

The tank 452 is formed of material with thermal insulating properties. Thus, the battery module 45 can store the hot heat and cold heat using a thermal capacity of the battery 451. In other words, the battery module 45 can be used as a heat storage member.

Figure 4:
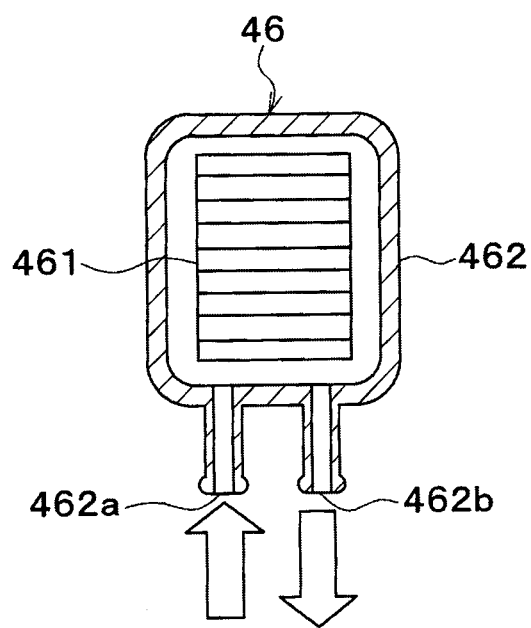
FIG. 4 is a cross-sectional view of an inverter module in the first embodiment.

As shown in FIG. 4, the inverter module 46 includes an inverter 461 and a tank 462. The inverter 461 is a power converter that converts a direct-current (DC) power supplied from the battery 451 to an alternating-current (AC) voltage, outputting the AC voltage to an electric motor for traveling.

The inverter 461 is constituted of a heat generating element, such as an insulated gate bipolar transistor (IGBT), or a silicon carbide element (SiC element). The inverter 461 is accommodated in the tank 462.

The tank 462 is provided with the inlet 452a and the outlet 452b for the coolant. The coolant entering an inlet 462a flows out of an outlet 462b through an internal space of the tank 462.

The coolant flowing through the internal space of the tank 462 exchanges heat with the inverter 461 to cool or heat the inverter 461. The inverter 461 preferably has its temperature maintained at 65° C. or lower for the purpose of preventing the degradation thereof or the like.

The tank 462 is formed of material with thermal insulating properties. Thus, the inverter module 46 can store the hot heat and cold heat using a thermal capacity of the inverter 461. In other words, the inverter module 46 can be used as a heat storage member.

As shown in FIG. 1, the downstream side of the first parallel flow path 25 is connected to an inlet 47c of a second switching valve 47.

The downstream side of the second parallel flow path 26 is connected to an inlet 47d of the second switching valve 47. The downstream side of the third parallel flow path 27 is connected to an inlet 47e of the second switching valve 47.

The downstream side of the fourth parallel flow path 28 is connected to an inlet 47f of the second switching valve 47.

The second switching valve 47 includes a first outlet 47a and a second outlet 47b from which the coolant flows. The second switching valve 47 switches the flow of coolant such that the coolant flowing from each of the first outlet 47a and the second outlet 47b flows into any one of the four (a number of) inlets 47c, 47d, 47e, and 47f.

The first outlet 47a of the second switching valve 47 is connected to the inlet 15a of the three-way valve 15 via a flow path 48. The second outlet 47b of the second switching valve 47 is connected to the inlet 16a of the first communication flow path 16 via a flow path 49.

The first switching valve 24 and the second switching valve 47 constitute a second circulation portion that allows the heat transfer medium in two systems to circulate through the first parallel flow path 25, the second parallel flow path 26, the third parallel flow path 27, and the fourth parallel flow path 28 (second flow path group).

Next, the details of the first and second switching valves 24 and 47 will be described based on FIGS. 5 to 12. The first and second switching valves 24 and 47 have the same basic structure, but differ in that an inlet for coolant and an outlet for fluid are reversed to each other.

Figure 5:
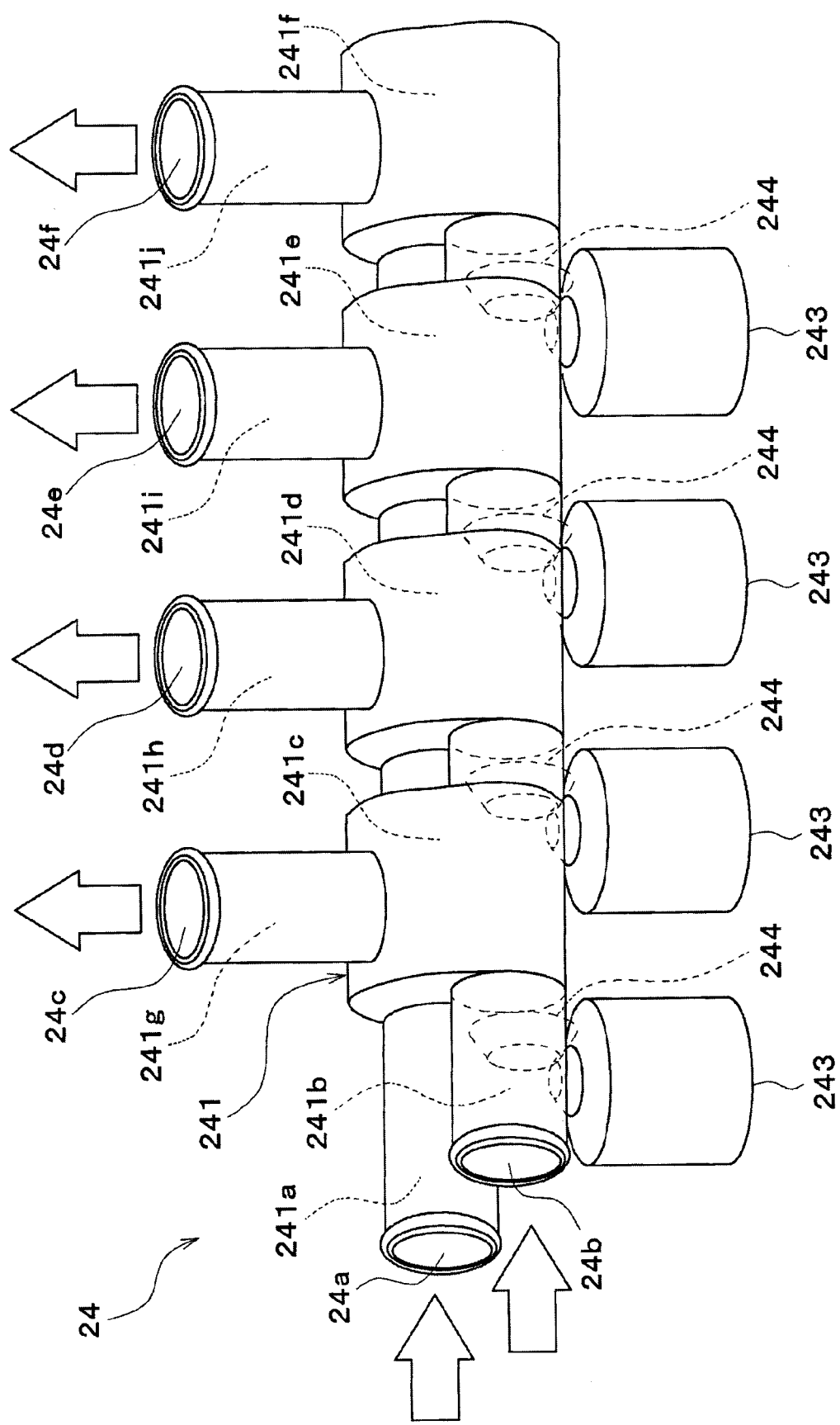
FIG. 5 is a perspective view of a first switching valve in the first embodiment.

As shown in FIG. 5, the first switching valve 24 includes a main body 241 provided with the first inlet 24a, the second inlet 24b, and the outlets 24c, 24d, 24e, and 24f.

Inside the main body 241, there are flow paths through which the coolants entering the first inlet 24a and the second inlet 24b flow to the outlets 24c, 24d, 24e, and 24f.

Specifically, there are two inlet-side flow paths 241a and 241b, four communication flow paths 241c, 241d, 241e, and 241f, and four outlet-side flow paths 241g, 241h, 241i, and 241j.

The inlet-side flow path 241a is a flow path with the first inlet 24a. The inlet-side flow path 241b is a flow path with the second inlet 24b. The four communication flow paths 241c, 241d, 241e, and 241f communicate with the two inlet-side flow paths 241a and 241b.

The outlet-side flow path 241g is a flow path communicating with the communication flow path 241c and having the outlet 24c. The outlet-side flow path 241h is a flow path communicating with the communication flow path 241d and having the outlet 24d. The outlet-side flow path 241i is a flow path communicating with the communication flow path 241e and having the outlet 24e. The outlet-side flow path 241j is a flow path communicating with the communication flow path 241f and having the outlet 24f.

Figure 6:
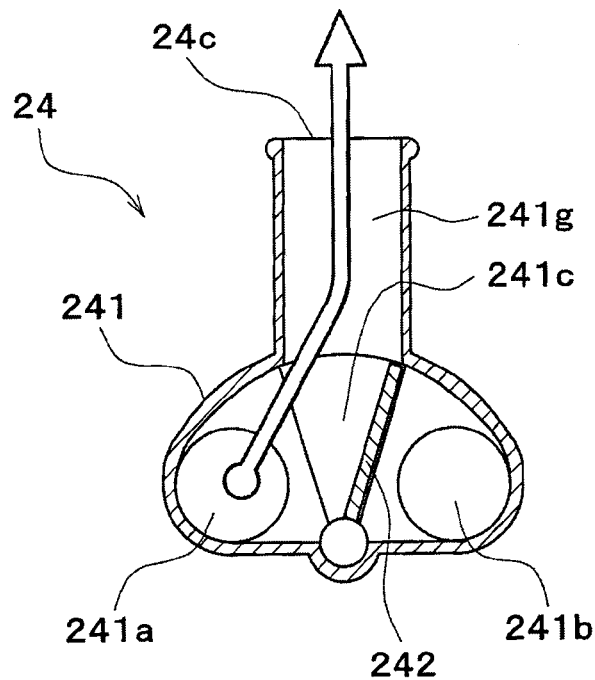
FIG. 6 is a cross-sectional view of a first switching valve in the first embodiment.

FIG. 6 shows a cross-sectional view of the first switching valve 24 taken vertically at the communication flow path 241c, the outlet-side flow path 241g, and the outlet 24c. The communication flow path 241c is provided with a door-type valve body 242 that switches a communication state between the inlet-side flow paths 241a and 241b and the outlet-side flow paths 241g.

When the valve body 242 is rotated to the position shown in FIG. 6, the outlet-side flow path 241g communicates with one inlet-side flow path 241a, and interrupts a connection portion with the other inlet-side flow path 241b. Thus, the coolant entering the first inlet 24a flow out of the outlet 24c, while the coolant entering the second inlet 24b is prevented from flowing out of the outlet 24c.

Figure 7:
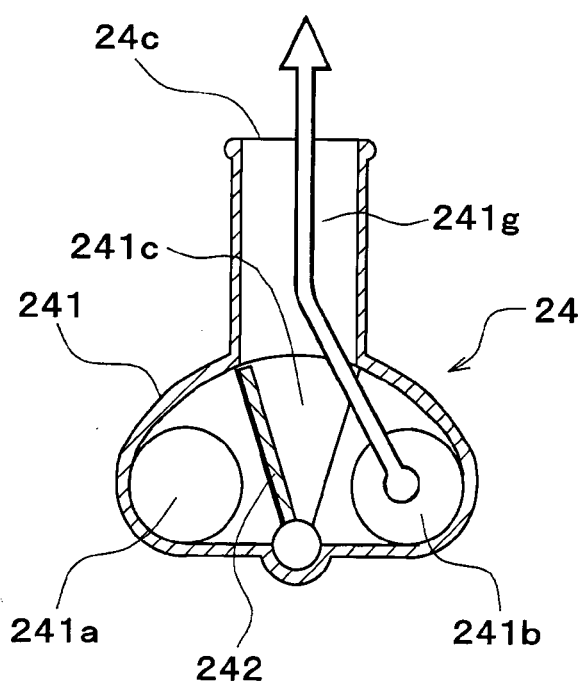
FIG. 7 is another cross-sectional view of the first switching valve in the first embodiment.

When the valve body 242 is rotated to the position shown in FIG. 7, the outlet-side flow path 241g interrupts a communication portion with one inlet-side flow path 241a, and communicates with the other inlet-side flow path 241b. Thus, the coolant entering the first inlet 24a does not flow from the outlet 24c, while the coolant entering the second inlet 24b flows out of the outlet 24c.

Figure 8:
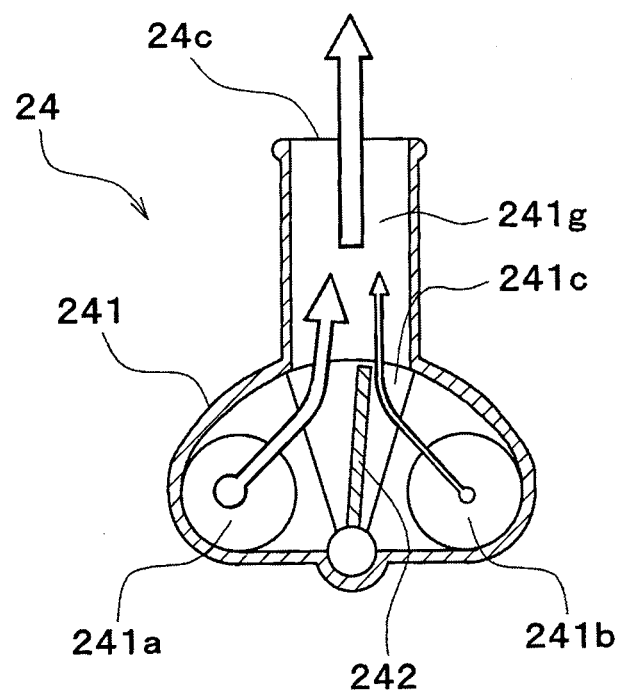
FIG. 8 is another cross-sectional view of the first switching valve in the first embodiment.

When the valve body 242 is rotated to the position shown in FIG. 8, the outlet-side flow path 241g communicates with both the inlet-side flow paths 241a and 241b. Thus, the coolant entering the first inlet 24a and the coolant entering the second inlet 24b are mixed together in the communication flow path 241c to flow out of the outlet 24c. A ratio of mixing of the coolant entering the first inlet 24a to the coolant entering the second inlet 24b is adjustable by the rotation position of the valve body 242.

Although not shown, like the communication flow path 241c, other three communication flow paths 241d, 241e, and 241f are also provided with door-type valve bodies for switching the communication between the inlet-side flow paths 241a and 241b and the outlet-side flow paths 241h, 241i, and 241j.

Each valve body is driven by an electric actuator 243 and a gear mechanism 244 shown in FIG. 5. In the example shown in FIG. 5, the electric actuators 243, the number of which is the same as that of the valve bodies, are disposed. Alternatively, the number of the electric actuators 243 may be set smaller than that of the valve bodies. In this case, the electric actuators 243 may be coupled to the valve bodies, so that the valve bodies may be cooperatively driven with the actuators.

Figure 9:
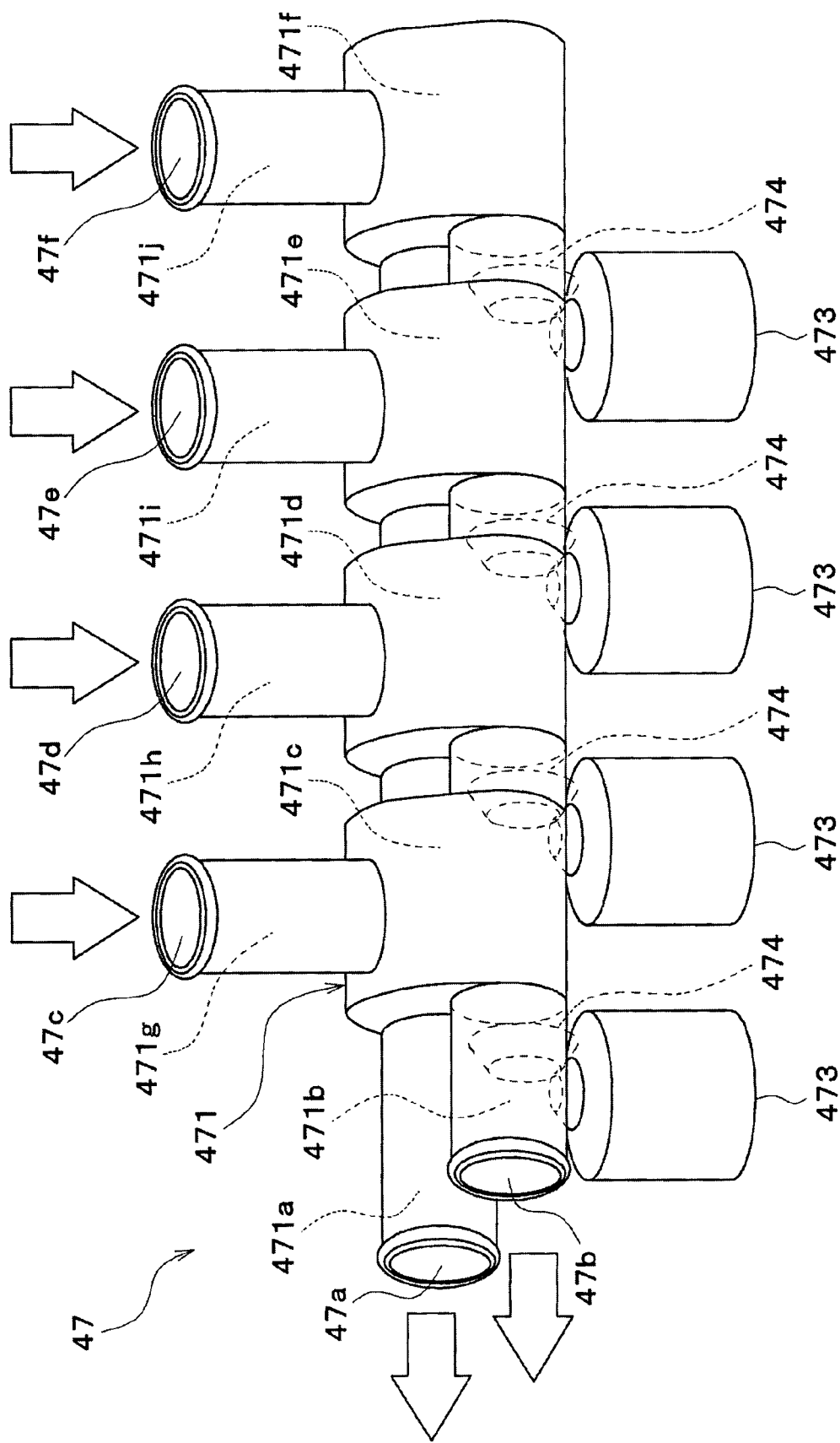
FIG. 9 is a perspective view of a second switching valve in the first embodiment.

As shown in FIG. 9, the second switching valve 47 includes a main body 471 provided with the first outlet 47a, the second outlet 47b, and the inlets 47c, 47d, 47e, and 47f.

Inside the main body 471, there are provided flow paths through which the coolants entering the first outlet 47a and the second outlet 24b flow to the inlets 47c, 47d, 47e, and 47f.

Specifically, there are provided two outlet-side flow paths 471a and 471b, four communication flow paths 471c, 471d, 471e, and 471f, and four inlet-side flow paths 471g, 471h, 471i, and 471j.

The outlet-side flow path 471a is a flow path with the first outlet 47a. The outlet-side flow path 471b is a flow path with the second outlet 47b. The four communication flow paths 471c, 471d, 471e, and 471f communicate with the two outlet-side flow paths 471a and 471b.

The inlet-side flow path 471g is a flow path communicating with the communication flow path 471c and having the inlet 47c. The inlet-side flow path 471h is a flow path communicating with the communication flow path 471d and having the inlet 47d. The inlet-side flow path 471i is a flow path communicating with the communication flow path 471e and having the inlet 47e. The inlet-side flow path 471j is a flow path communicating with the communication flow path 471f and having the inlet 47f.

Figure 10:
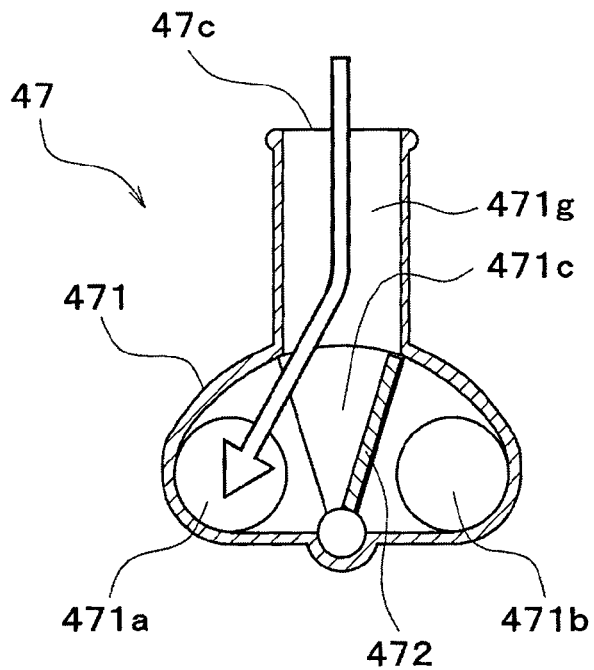
FIG. 10 is a cross-sectional view of the second switching valve in the first embodiment.

FIG. 10 shows a cross-sectional view of the second switching valve 47 taken vertically at the communication flow path 471c, the inlet-side flow path 471g, and the inlet 47c. The communication flow path 471c is provided with a door-type valve body 472 that switches a communication state between each of the outlet-side flow paths 471a and 471b and the inlet-side flow path 471g.

When the valve body 472 is rotated to the position shown in FIG. 10, the inlet-side flow path 471g communicates with one outlet-side flow path 471a, and interrupts a connection portion with the other outlet-side flow path 471b. Thus, the coolant entering the inlet 47c flows out of a first outlet 74a, while being prevented from flowing out of a second outlet 74b.

Figure 11:
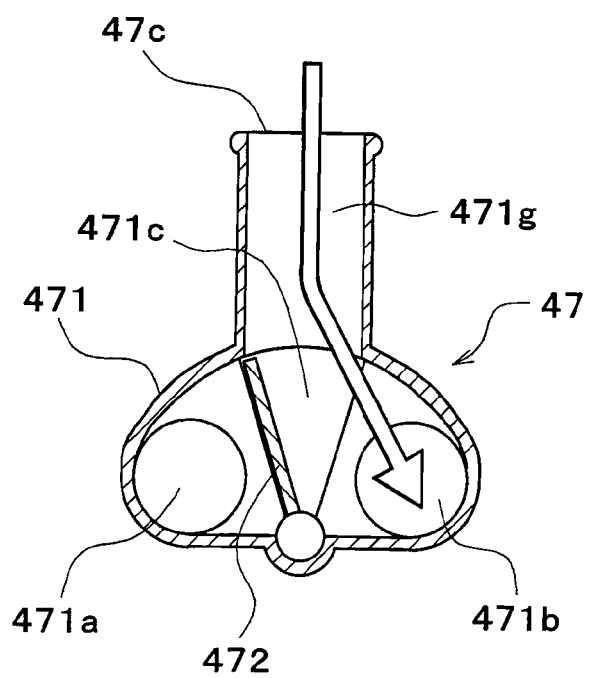
FIG. 11 is another cross-sectional view of the second switching valve in the first embodiment.

When the valve body 472 is rotated to the position shown in FIG. 11, the inlet-side flow path 471g interrupts a connection portion with one outlet-side flow path 471a, and communicates with the other outlet-side flow path 471b. Thus, the coolant entering the first inlet 47c is prevented from flowing out of the first outlet 74a, and flows out of the second outlet 74b.

Figure 12:
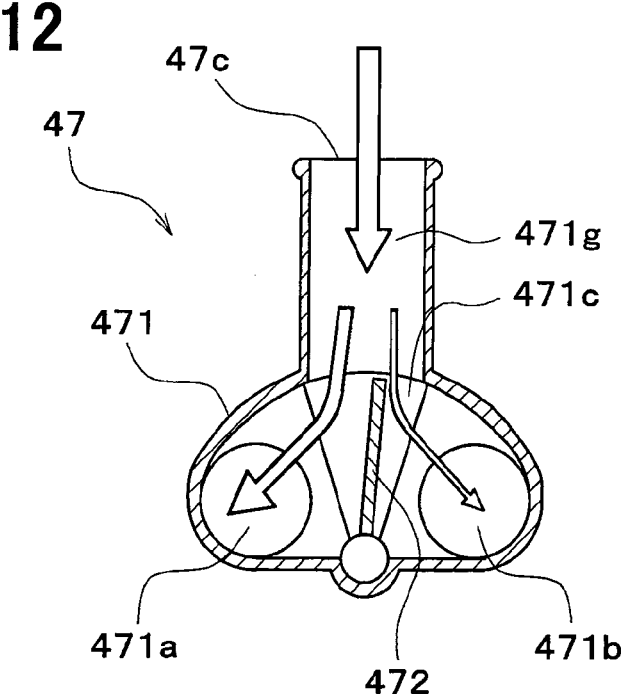
FIG. 12 is another cross-sectional view of the second switching valve in the first embodiment.

When the valve body 472 is rotated to the position shown in FIG. 12, the inlet-side flow path 471g communicates with both the outlet-side flow paths 471a and 471b. Thus, the coolant entering the inlet 47c is distributed by the communication flow path 471c to flow out of the first outlet 74a and the second outlet 74b. A ratio of distribution of the coolant flowing from the first outlet 74a to the coolant flowing from the second outlet 74b is adjustable by the rotation position of the valve body 472.

Although not shown, like the communication flow path 471c, other three communication flow paths 471d, 471e, and 471f are also provided with door-type valve bodies for switching the communication between the outlet-side flow paths 471a and 471b and the inlet-side flow paths 471h, 471i, and 471j.

Each valve body is driven by an electric actuator 473 and a gear mechanism 474 shown in FIG. 9. In the example shown in FIG. 9, the electric actuators 473, the number of which is the same as that of the valve bodies, are disposed. Alternatively, the number of the electric actuators 473 may be set smaller than that of the valve bodies. In this case, the electric actuators 473 may be coupled to the valve bodies via a link mechanism, so that the valve bodies may be cooperatively driven with the actuators.

Figure 13:
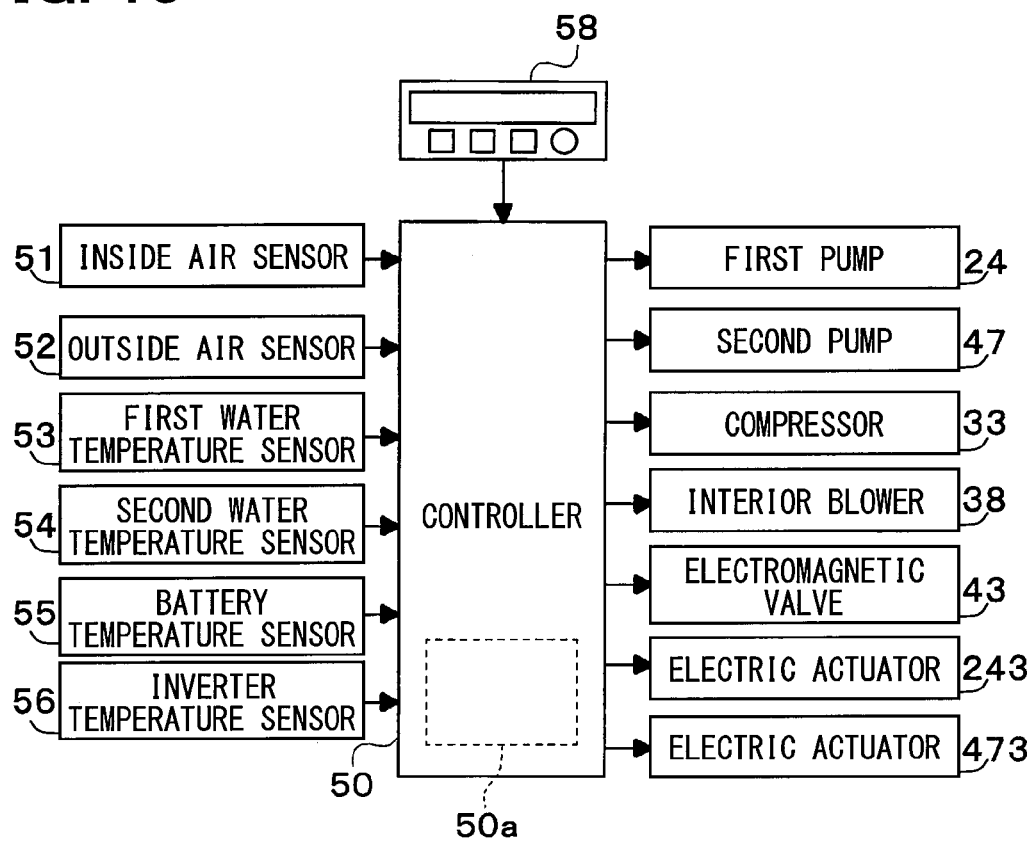
FIG. 13 is a block diagram showing an electric controller in the vehicle thermal management system in the first embodiment.

Now, an electric controller of the thermal management system 10 will be described with reference to FIG. 13. A controller 50 includes a well-known microcomputer, including a CPU, a ROM, a RAM, and the like, and its peripheral circuit. The controller 50 performs various types of computations and processing based on an air conditioning control program stored in the ROM to thereby control the operations of the first pump 24, the second pump 47, the compressor 33, the interior blower 38, the electromagnetic valve 43, the electric actuator 243 for the first switching valve, and the electric actuator 473 for the second switching valve which are connected its output side.

The controller 50 has a control unit integrally configured with various types of target devices for control that are connected to the output side thereof. Each control unit (hardware and software) is configured to control the operation of each of the target devices for control.

In this embodiment, particularly, the control unit (hardware and software) that controls the operation of the electric actuators 243 and 473 for the first and second switching valves is a switching valve controller 50a. Obviously, the switching valve controller 50a may be independently provided as a separated member from the controller 50.

Detection signals from various sensors, including an inside air sensor 51, an outside air sensor 52, a first water temperature sensor 53, a second water temperature sensor 54, a battery temperature sensor 55, and an inverter temperature sensor 56 are input to an input side of the controller 50.

The inside air sensor 51 is a detector (inside air temperature detector) for detecting the temperature of inside air (or the temperature of the vehicle interior). The outside air sensor 52 is a detector (outside air temperature detector) for detecting the temperature of outside air.

The first water temperature sensor 53 is a temperature detector for detecting the temperature of coolant flowing into the first inlet 24a of the first switching valve 24. The second water temperature sensor 54 is another temperature detector for detecting the temperature of coolant flowing into the second inlet 24b of the first switching valve 24.

The battery temperature sensor 55 is a battery temperature detector for detecting the temperature of the coolant flowing from the battery module 45. The inverter temperature sensor 56 is a battery temperature detector for detecting the temperature of the inverter flowing from the inverter module 46.

An operation panel 58 is disposed near an instrument board at the front of the vehicle compartment. Operation signals are input from various types of air conditioning operation switches provided on the operation panel 58 to the input side of the controller 50. The various types of air conditioning operation switches provided in the operation panel 58 include an air conditioner switch, an automatic switch, an air volume setting switch of the interior blower 38, a vehicle-interior temperature setting switch, and the like.

The air conditioner switch is a switch for switching between operating and stopping (turning On and Off) of air conditioning (cooling or heating). The automatic switch is a switch for setting or resetting automatic control of the air conditioning. The vehicle-interior temperature setting switch serves as target temperature setting means for setting a target vehicle interior temperature by a passenger's operation.

Now, the operation of the above-mentioned structure will be described. The controller 50 controls the operations of the electric actuator 243 for the first switching valve and the electric actuator 473 for the second switching valve, so that the valve body 242 of the first switching valve 24 and the valve body 472 of the second switching valve 47 are driven to switch the operation mode of the thermal management system 10.

The operation modes of the thermal management system 10 include, for example, a waste heat recovery heating mode, an outside-air heat absorption heat pump heating mode, a first defrosting mode, a second defrosting mode, and a heat-storage-member heat absorption heat pump heating mode.

Figure 14:
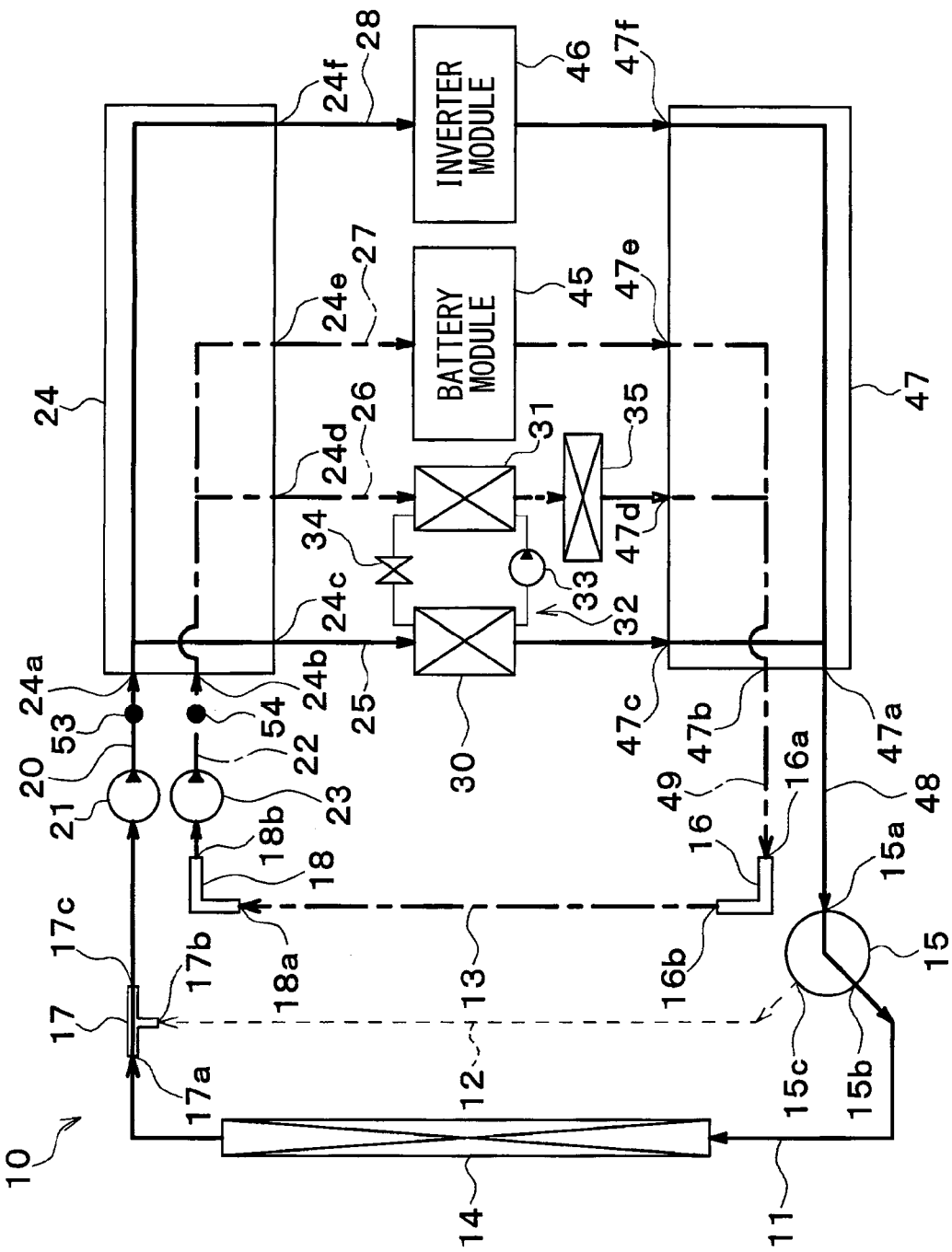
FIG. 14 is an entire configuration diagram of the vehicle thermal management system, while showing a waste heat recovery heating mode in the first embodiment.

In the waste heat recovery heating mode shown in FIG. 14, the vehicle interior is heated by the air heated by the heater core 35. This mode is performed when the water temperature at an outlet of at least one of the battery module 45 and the inverter module 46 which serve as the device to be heat-exchanged is set to 40° C. (preset value) or higher.

FIG. 14 shows an example in which the temperature of coolant flowing from the battery module 45 is 40° C. or more, and the temperature of coolant flowing from the inverter module 46 is less than 40° C.

In this case, the first switching valve 24 allows the first inlet 24a to communicate with the outlets 24c and 24f, and also allows the second inlet 24b to communicate with the outlets 24d and 24e. The second switching valve 47 allows the first outlet 47a to communicate with the inlets 47c and 47f, and also allows the second inlet 47b to communicate with the inlets 47d and 47e. The three-way valve 15 allows the inlet 15a to communicate with the first outlet 15b as shown in FIG. 14.

Thus, as indicated by solid arrows and alternate long and short dashed arrows of FIG. 14, two coolant circulation circuits (first circulation circuit and second circulation circuit) are formed.

Specifically, there is provided one circulation circuit (high-temperature coolant circulation circuit) for circulation of the coolant (high-temperature coolant) at 40° C. or more from the battery module 45 through the second bypass flow path 13 and the heater core 35. Further, there is another circulation circuit (non-high-temperature coolant circulation circuit) for circulation of the coolant (non-high-temperature coolant) of less than 40° C. from the inverter module 46 through the radiator flow path 11.

Thus, the coolant at 40° C. or more having flowed from the battery module 45 flows through the heater core 35, while the coolant at less than 40° C. flowing from the inverter module 46 does not flow through the heater core 35, so that the coolant flowing through the heater core 35 can be maintained at a temperature of 40° C. or more. Thus, the air can be heated by the heater core 35 to a temperature required for heating or higher, whereby the waste heat from the battery module 45 can be used for heating.

Figure 15:
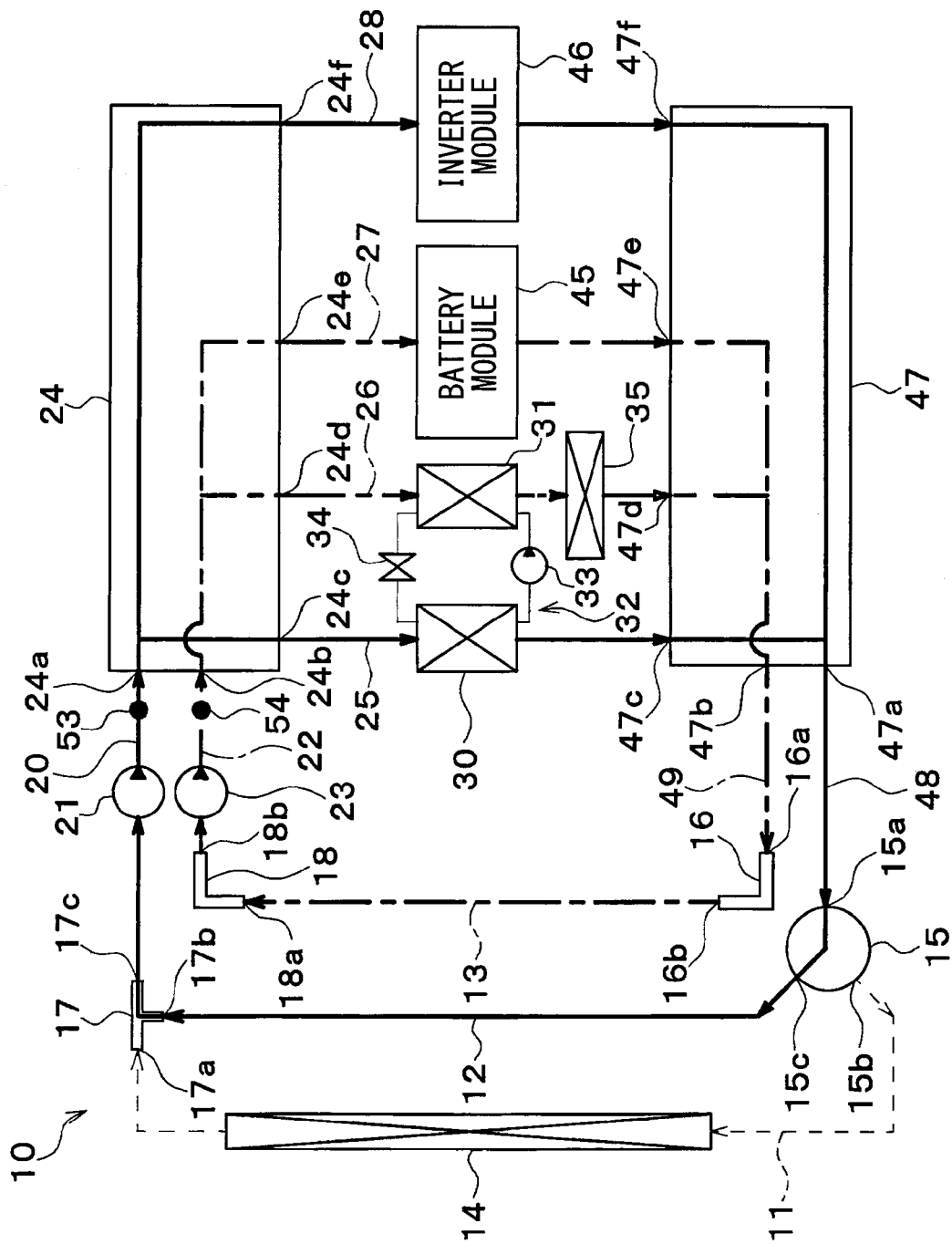
FIG. 15 is an entire configuration diagram of the vehicle thermal management system, while showing another example of the waste heat recovery heating mode in the first embodiment.

In the waste heat recovery heating mode, as shown in FIG. 15, the three-way valve 15 may allow the inlet 15a to communicate with the second outlet 15c, thereby causing the coolant (non-high-temperature coolant) at less than 40° C. from the inverter module 46 to circulate through the first bypass flow path 12.

Thus, the radiator 14 does not absorb heat from the outside air, which can drastically increase the temperature of a heat transfer medium flowing into the coolant-cooling heat exchanger 30 as compared to the case where the radiator 14 absorbs heat from the outside air. As a result, on the low-pressure side of the refrigeration cycle 32, the efficiency of evaporating the refrigerant can be improved.

Figure 16:
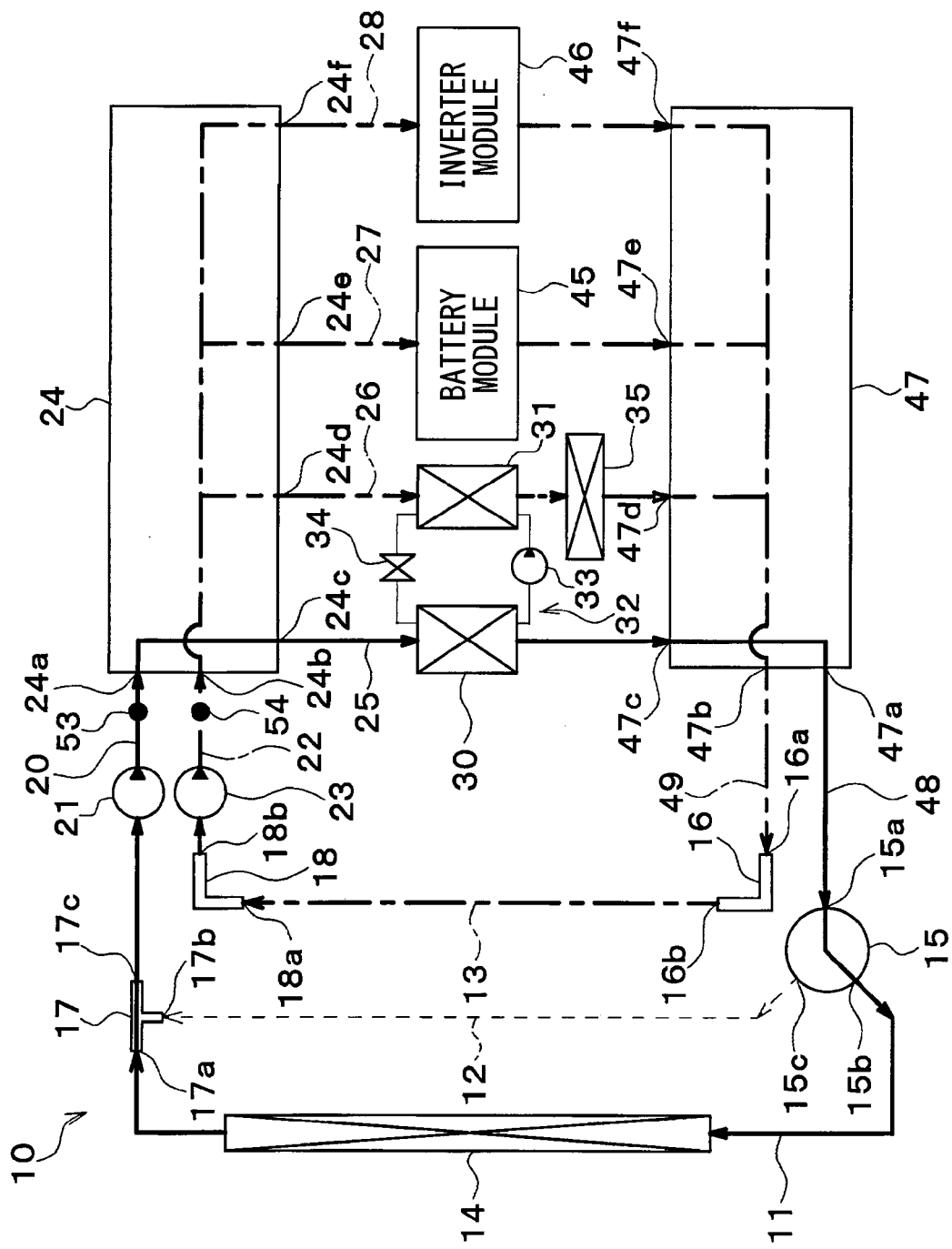
FIG. 16 is an entire configuration diagram of the vehicle thermal management system, while showing an outside-air heat absorption heat pump heating mode in the first embodiment.

The outside-air heat absorption heat pump heating mode shown in FIG. 16 is performed when the amount of waste heat recovered from the devices 45 and 46 to be heat-exchanged is not sufficient for heating capacity. For example, when the vehicle interior temperature is estimated not to reach the air conditioning preset temperature in the above waste heat recovery heating mode, it can be determined that the amount of the waste heat recovered from the device to be heat-exchanged is not sufficient for heating capacity.

When the total of the amount of heat dissipated from the devices 45 and 46 to be heat-exchanged into the coolant and the power of the compressor 33 in the refrigeration cycle 32 is estimated not to exceed the heat amount required for heating of the vehicle interior, it can be determined that the amount of the waste heat recovered from the device to be heat-exchanged is not sufficient for the heating capacity. When the total of the amount of heat dissipated from the devices 45 and 46 to be heat-exchanged into the coolant and the power of the compressor 33 in the refrigeration cycle 32 is estimated to exceed the heat amount required for heating of the vehicle interior, it can be determined that the amount of the waste heat recovered from the device to be heat-exchanged is sufficient for the heating capacity.

When the total of the amount of heat generated from the devices 45 and 46 to be heat-exchanged and the amount of heat dissipated by the coolant-heating heat exchanger 31 into the coolant is estimated not to exceed the heat amount required for heating of the vehicle interior, it can be determined that the amount of the waste heat recovered from the device to be heat-exchanged is not sufficient for the heating capacity. When the total of the amount of heat generated from the devices 45 and 46 to be heat-exchanged and the amount of heat dissipated by the coolant-heating heat exchanger 31 into the coolant is estimated to exceed the heat amount required for heating of the vehicle interior, it can be determined that the amount of the waste heat recovered from the device to be heat-exchanged is sufficient for the heating capacity.

In the outside-air heat absorption heat pump heating mode, the first switching valve 24 allows the first inlet 24a to communicate with the outlet 24c, and also allows the second inlet 24b to communicate with the outlets 24d, 24e, and 24f. The second switching valve 47 allows the first outlet 47a to communicate with the inlet 47c, and also allows the second inlet 47b to communicate with the inlets 47d, 47e, and 47f. The three-way valve 15 allows the inlet 15a to communicate with the first outlet 15b.

Thus, as indicated by solid arrows and alternate long and short dashed arrows of FIG. 16, two coolant circulation circuits (first circulation circuit and second circulation circuit) are formed.

Specifically, there is provided one circulation circuit (low-temperature coolant circulation circuit) that allows the low-temperature coolant flowing from the coolant-cooling heat exchanger 30 to circulate through the radiator flow path 11. Further, there is provided another circulation circuit (high-temperature coolant circulation circuit) that allows the high-temperature coolant flowing from the coolant-heating heat exchanger 31 to circulate through the second bypass flow path 13, the heater core 35, the battery module 45, and the inverter module 46.

Thus, the low-temperature coolant that is cooled to the outside air temperature or lower by the coolant-cooling heat exchanger 30 flows through the radiator 14, whereby the radiator 14 allows the coolant to absorb heat from the outside air. Then, the coolant that has absorbed heat from the outside air in the radiator 14 exchanges heat with the refrigerant of the refrigeration cycle 32 in the coolant-cooling heat exchanger 30 to dissipate heat therefrom. Thus, in the coolant-cooling heat exchanger 30, the refrigerant of the refrigeration cycle 32 absorbs heat from the outside air via the coolant.

The refrigerant having absorbed heat from the outside air in the coolant-cooling heat exchanger 30 exchanges heat with the coolant in the coolant-heating heat exchanger 31 to thereby heat the coolant. The high-temperature coolant heated by the coolant-heating heat exchanger 31 exchanges heat with the air to be blown into the vehicle interior in flowing through the heater core 35, thereby dissipating heat therefrom. Thus, the heater core 35 heats the air to be blown into the vehicle interior. Accordingly, the heat pump heating can be achieved which involves absorbing heat from the outside air to heat the vehicle interior.

When the amount of waste heat recovered from the device to be heat-exchanged is sufficient for the heating capacity, as shown in FIG. 15, the three-way valve 15 allows the inlet 15a to communicate with the second outlet 15c. In this case, the coolant that is cooled to the outside air temperature or lower by the coolant-cooling heat exchanger 30 bypasses the radiator 14, and thus the radiator 14 does not absorb heat from the outside air.

Figure 17:
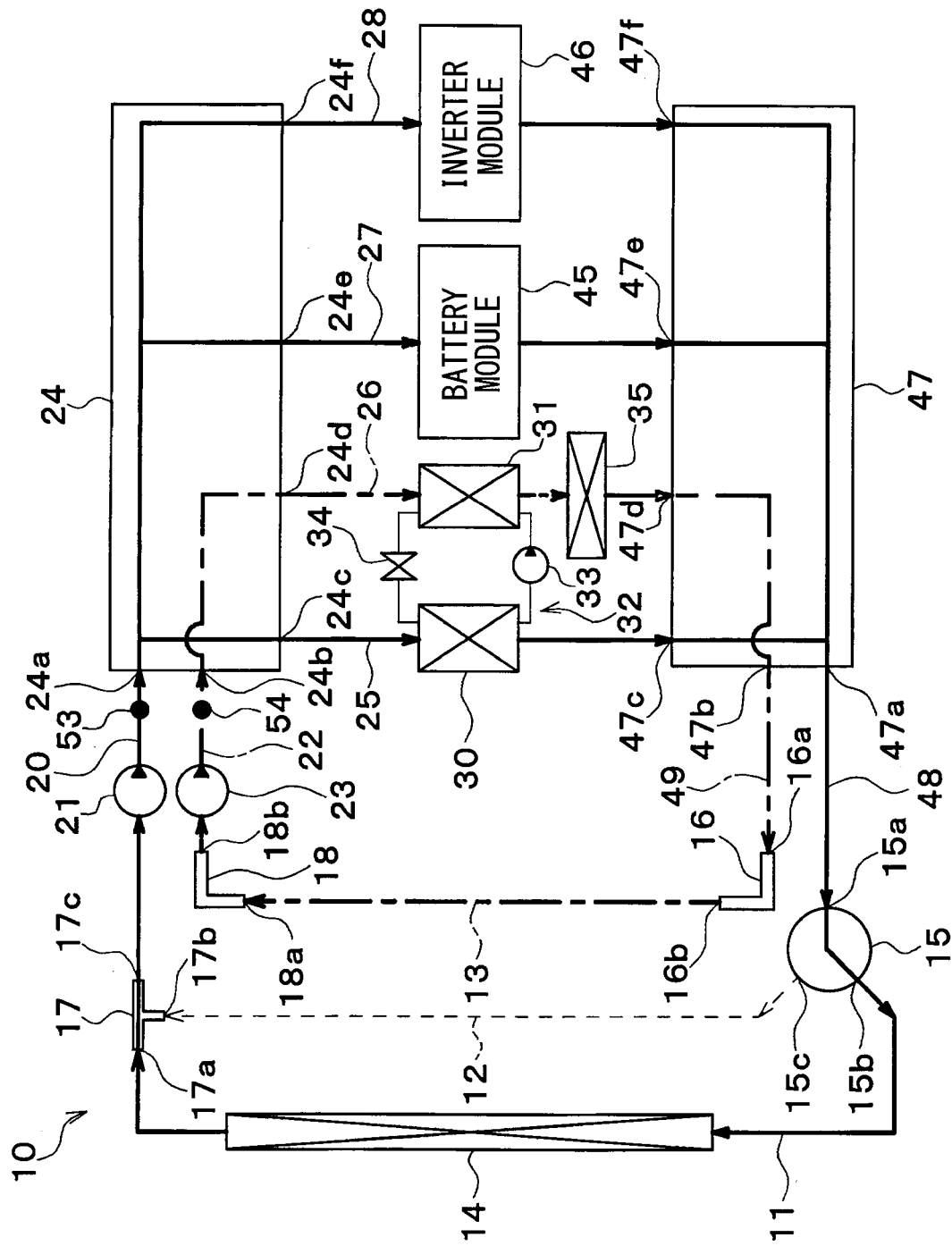
FIG. 17 is an entire configuration diagram of the vehicle thermal management system, while showing a first defrosting mode in the first embodiment.

Thus, the heat pump heating is performed using the waste heat from the devices 45 and 46 to be heat-exchanged as a heat absorption source without performing another heat pump heating which involves absorbing heat from the outside air. Since the radiator 14 does not absorb heat from the outside air, the above heat pump heating can drastically increase the temperature of the heat transfer medium flowing into the coolant-cooling heat exchanger 30, and can also improve the efficiency of evaporating the refrigerant on the low-pressure side of the refrigeration cycle 32, as compared to the outside-air heat absorption heat pump heating mode in which the radiator 14 absorbs heat from the outside air The first defrosting mode shown in FIG. 17 is performed when frost is formed on the radiator 14. As mentioned above, in the outside-air heat absorption heat pump heating mode, the coolant cooled to the outside air temperature or lower by the coolant-cooling heat exchanger 30 flows through the radiator 14.

When the moisture of the outside air (corresponding to humidity) contacts with the radiator 14 to cause the temperature of the air in the interior to become a freezing point or lower, frost is formed on the radiator 14. Under the frost formation, the heat exchanging property of the radiator 14 is drastically reduced. For this reason, the first defrosting mode is performed to melt the frost to defrost.

In the first defrosting mode, the first switching valve 24 allows the first inlet 24a to communicate with the outlets 24c, 24e, and 24f, and also allows the second inlet 24b to communicate with the outlet 24d. The second switching valve 47 allows the first outlet 47a to communicate with the inlets 47c, 47e, and 47f, and also allows the second outlet 47b to communicate with the inlet 47d. The three-way valve 15 allows the inlet 15a to communicate with the first outlet 15b.

Thus, as indicated by solid arrows and alternate long and short dashed arrows of FIG. 17, two coolant circulation circuits (first circulation circuit and second circulation circuit) are formed.

Specifically, there is provided one circulation circuit (low-temperature coolant circulation circuit) that allows the low-temperature coolant flowing from the coolant-cooling heat exchanger 30 to circulate through the battery module 45, the inverter module 46, and the radiator 14. Further, there is provided another circulation circuit (high-temperature coolant circulation circuit) that allows the high-temperature coolant flowing from the coolant-heating heat exchanger 31 to circulate through the second bypass flow path 13.

The battery module 45 and the inverter module 46 can be used as the heat storage member as mentioned above. Thus, in the outside-air heat absorption heat pump heating mode, the battery module 45 and the inverter module 46 can store therein the hot heat.

In the first defrosting mode, when the coolant flows through the battery module 45 and the inverter module 46 as the heat storage members 45 and 46, the coolant can absorb heat from the heat storage members.

Because the low-temperature coolant flowing from the coolant-cooling heat exchanger 30 absorbs heat from the heat storage members 45 and 46, which can increase the temperature of the low-temperature coolant. As a result, the temperature of the coolant flowing into the radiator 14 is increased to at least 0° C. or more, so that the frost formed on the radiator 14 can be melted.

With the increase in temperature of the low-temperature coolant, the temperature of the coolant flowing into the coolant-cooling heat exchanger 30 is also increased, which can increase the evaporation temperature of the low-pressure side refrigerant in the refrigeration cycle 32 to drastically improve a coefficient of performance (COP) of the refrigeration cycle.

Figure 18:
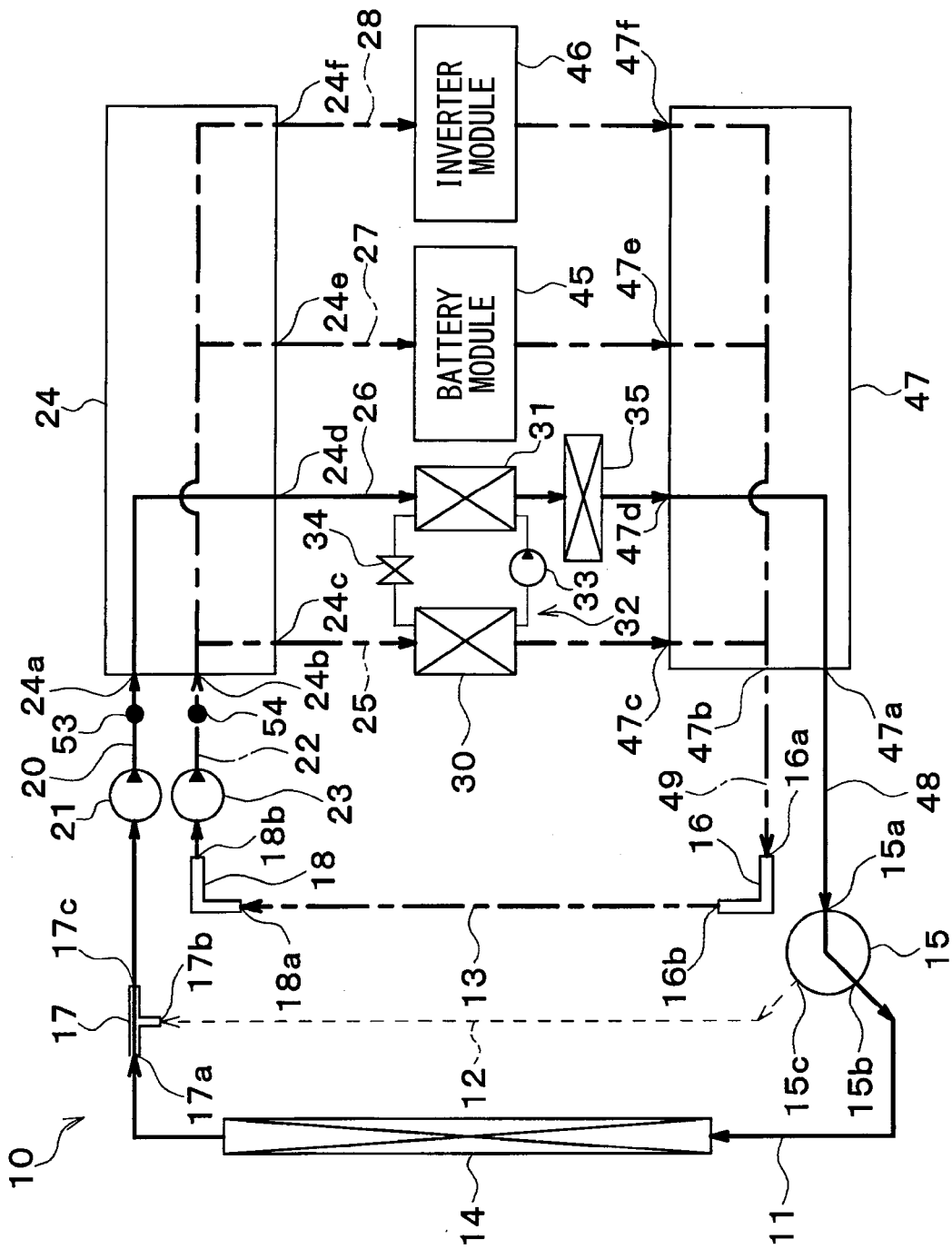
FIG. 18 is an entire configuration diagram of the vehicle thermal management system in the first embodiment, while showing a second defrosting mode.

The second defrosting mode shown in FIG. 18 is performed when a higher defrosting capacity than that in the first defrosting mode is required.

In the second defrosting mode, the first switching valve 24 allows the first inlet 24a to communicate with the outlet 24d, and also allows the second inlet 24b to communicate with the outlets 24c, 24e, and 24f. The second switching valve 47 allows the first outlet 47a to communicate with the inlet 47d, and also allows the second outlet 47b to communicate with the inlets 47c, 47e, and 47f. The three-way valve 15 allows the inlet 15a to communicate with the first outlet 15b.

Thus, as indicated by solid arrows and alternate long and short dashed arrows of FIG. 18, two coolant circulation circuits (first circulation circuit and second circulation circuit) are formed.

Specifically, there is provided one circulation circuit (low-temperature coolant circulation circuit) that allows the low-temperature coolant flowing from the coolant-cooling heat exchanger 30 to circulate through the battery module 45 and the inverter module 46 as the heat storage member. Further, there is provided another circulation circuit (high-temperature coolant circulation circuit) that allows the high-temperature coolant flowing from the coolant-heating heat exchanger 31 to circulate through the radiator 14.

Thus, the high-temperature coolant in the high-temperature coolant circulation circuit is increased by the heat pump operation of absorbing heat from the heat storage members 45 and 46, so that the high-temperature coolant can be introduced into the radiator 14. As a result, the temperature of the coolant introduced into the radiator 14 can be set higher as compared to that in the first defrosting mode, which can surely melt the frost formed on the radiator 14.

With the increase in temperature of the coolant flowing into the coolant-cooling heat exchanger 30 by absorption of heat from the heat storage members 45 and 46, the evaporation temperature of the refrigerant on a low-pressure side of the refrigeration cycle 32 is also increased, which can drastically improve the coefficient of performance (COP) of the refrigeration cycle.

Figure 19:
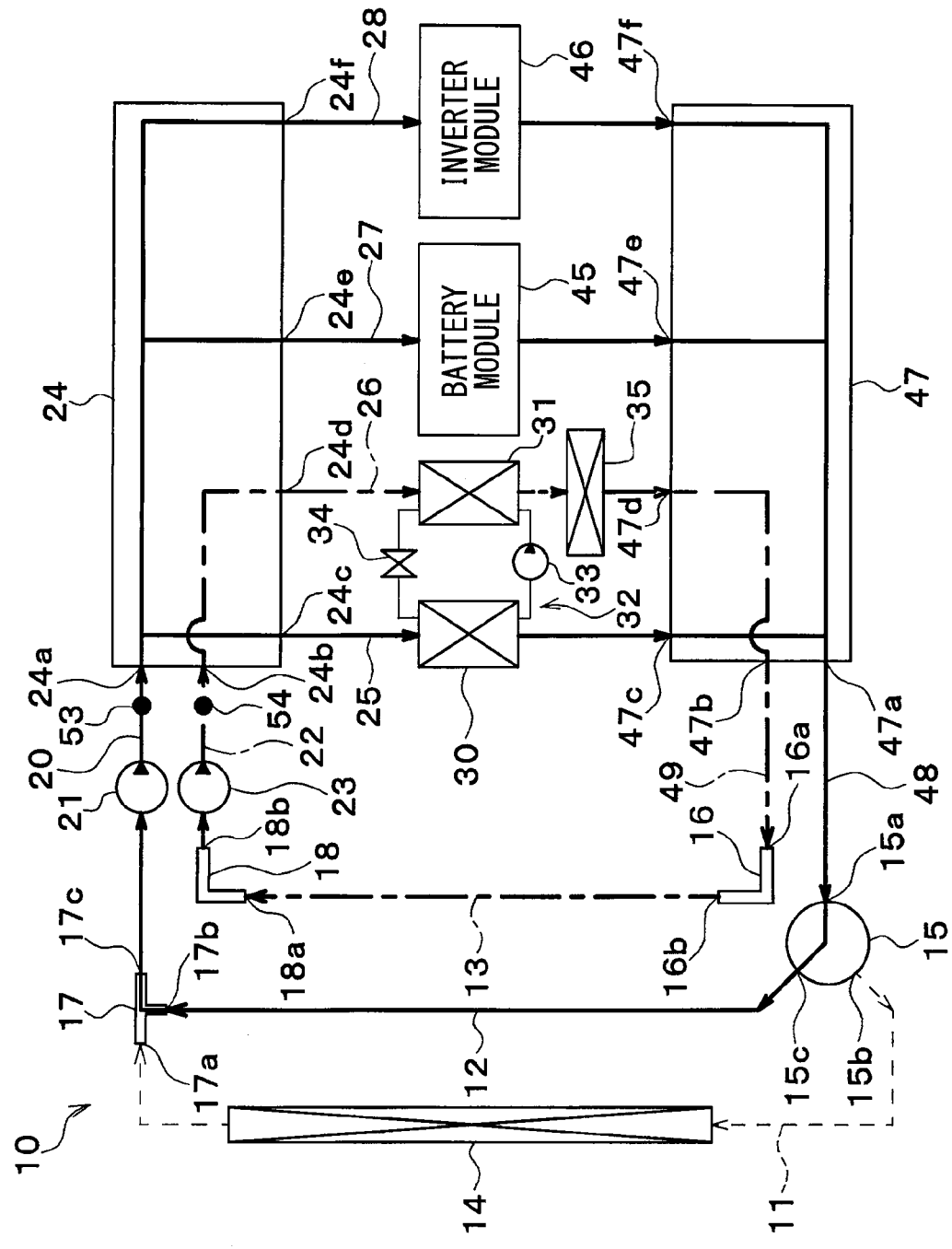
FIG. 19 is an entire configuration diagram of the vehicle thermal management system, while showing a heat-storage-member heat absorption heat pump heating mode in the first embodiment.

The heat-storage-member heat absorption heat pump heating mode shown in FIG. 19 is performed when storing the hot heat in an amount that is necessary and sufficient for the battery module 45 and the inverter module 46 as the heat storage member. As mentioned above, the heat stored in the heat storage members 45 and 46 can be performed in the outside-air heat absorption heat pump heating mode. The heat can also be stored in the heat storage members 45 and 46 in charging the battery 451 with power from an external power source.

In the heat-storage-member heat absorption heat pump heating mode, the first switching valve 24 allows the first inlet 24a to communicate with the outlets 24c, 24e, and 24f, and also allows the second inlet 24b to communicate with the outlet 24d. The second switching valve 47 allows the first outlet 47a to communicate with the inlets 47c, 47e, and 47f, and also allows the second outlet 47b to communicate with the inlet 47d. The three-way valve 15 allows the inlet 15a to communicate with the second outlet 15c.

Thus, as indicated by solid arrows and alternate long and short dashed arrows of FIG. 19, two coolant circulation circuits (first circulation circuit and second circulation circuit) are formed.

Specifically, there is provided one circulation circuit (low-temperature coolant circulation circuit) that allows the low-temperature coolant flowing from the coolant-cooling heat exchanger 30 to bypass the radiator 14 and circulate through the battery module 45 and the inverter module 46 as the heat storage member. Further, there is provided another circulation circuit (high-temperature coolant circulation circuit) that allows the high-temperature coolant flowing from the coolant-heating heat exchanger 31 to bypass the radiator 14 and circulate through the heater core 35.

Thus, the vehicle interior can be heated by the heat pump operation which involves absorbing heat from the heat storage members 45 and 46.

In the outside-air heat absorption heat pump heating mode for absorbing heat from the radiator 14, the temperature of coolant flowing into the coolant-cooling heat exchanger 30 is equal to or lower than the outside air temperature. For this reason, when the outside air temperature is low (for example, at −10° C. or less), the effect of evaporating the refrigerant on the low-pressure side of the refrigeration cycle 32 is deteriorated.

In contrast, in the heat-storage-member heat absorption heat pump heating mode, the heat is not absorbed from the radiator 14, so that the temperature of the coolant flowing into the coolant-cooling heat exchanger 30 can be drastically increased as compared to the outside-air heat absorption heat pump heating mode of absorbing heat from the radiator 14. Thus, the efficiency of evaporating the refrigerant on the low-pressure side of the refrigeration cycle 32 can be drastically improved to reduce the power for driving the compressor 33, thereby achieving energy saving of the air conditioning.

In this embodiment, the first circulation portions 15, 16, 17, and 18 switch the flow of coolant such that one heat medium of the coolants for two systems selectively circulate through the radiator flow path 11 or the first bypass flow path 12. The second circulation portions 24 and 47 switch the flow of coolant such that the coolants for two systems selectively circulate among the second flow path group 25, 26, 27, and 28.

The first circulation portions 15, 16, 17, and 18 and the second circulation portions 24 and 47 switch the flow of coolant such that the coolant circulates through a first circulation circuit for circulation of the coolant among the first flow path groups 11, 12, and 13, the second flow path group 25, 26, 27, and 28, and the first pump 21, or a second circulation circuit of the coolant among the first flow path groups 11, 12, and 13, the second flow path group 25, 26, 27, and 28, and the second pump 23.

With this arrangement, the flow paths 27 and 28 for the devices to be heat-exchanged can be switched to the first circulation circuit on the first pump 21 side or the second circulation circuit on the second pump 23 side, so that the coolants for two systems can be switched between and circulated through the devices to be heat-exchanged.

The circulation of the coolant can be interrupted with respect to the radiator flow path 11, which can block the heat exchange with the outside air in the radiator 14.

In the waste heat recovery heating mode shown in FIGS. 14 and 15, in heating the vehicle interior with the air heated by the heater core 35, one of the first and second circulation circuits includes the device 45 to be heat-exchanged of the devices 45 and 46 to be heat-exchanged whose coolant temperature at the coolant outlet (heat medium outlet) is the preset value or more, the heater core 35, and one bypass flow path 13 of the first and second bypass flow paths 12 and 13. On the other hand, the other one of the first and second circulation circuits includes the other device 46 to be heat-exchanged of the devices 45 and 46 to be heat-exchanged whose coolant temperature at the coolant outlet is less than the preset value, and one flow path other than one bypass flow path 13 among the first flow paths 11, 12, and 13.

Thus, the coolant having a relatively higher temperature among the coolants flowing from the devices 45 and 46 to be heat-exchanged circulates through the heater core 35, while the coolant having a relatively lower temperature among the coolants flowing from the devices 45 and 46 to be heat-exchanged does not circulate through the heater core 35. When performing the heating using the waste heat from the devices 45 and 46 to be heat-exchanged, the blown air temperature of the heater core 35 can be set as high as possible.

In the outside-air heat absorption heat pump heating mode shown in FIG. 16, when the waste heat recovered from the devices 45 and 46 to be heat-exchanged is not sufficient for the heating capacity, the coolant-heating heat exchanger 31, the heater core 35, and one bypass flow path 13 of the first and second bypass flow paths 12 and 13 are included in one of the first and second circulation circuits. On the other hand, the coolant-cooling heat exchanger 30 and the radiator flow path 11 are included in the other one of the first and second circulation circuits.

Thus, the vehicle interior can be heated by the heat pump operation which involves absorbing heat from the outside air.

When the waste heat recovered by the devices 45 and 46 to be heat-exchanged is sufficient for the heating capacity, the waste heat recovery heating mode is performed as shown in FIG. 15. In this case, the coolant-heating heat exchanger 31, the heater core 35, and one bypass flow path 13 are included in one circulation circuit, while at least one device 46 to be heat-exchanged of the devices 45 and 46 to be heat-exchanged, the coolant-cooling heat exchanger 30, and the other bypass flow path 12 are included in the other one of the first and second circulation circuits.

Thus, the vehicle interior can be heated using the waste heat from the devices 45 and 46 to be heat-exchanged. Since the coolant does not flow through the radiator flow path 11 and the radiator 14, the coolant does not absorb heat from the outside air in the radiator 14.

For this reason, the temperature of the coolant flowing into the coolant-cooling heat exchanger 30 can be drastically increased as compared to the outside-air heat absorption heat pump heating mode in which the coolant absorbs heat from the outside air in the radiator 14, thereby improving the efficiency of evaporating the refrigerant on the low-pressure side of the refrigeration cycle 32.

When the total of the amount of heat dissipated from the devices 45 and 46 to be heat-exchanged into the coolant and the power of the compressor 33 of the refrigeration cycle 32 is estimated not to exceed the heat amount required for heating of the vehicle interior, it can be determined that the amount of the waste heat recovered from the device to be heat-exchanged is not sufficient for the heating capacity. On the other hand, when the total of the amount of heat dissipated from the devices 45 and 46 to be heat-exchanged into the coolant and the power of the compressor 33 in the refrigeration cycle 32 is estimated to exceed the heat amount required for heating of the vehicle interior, it can be determined that the amount of the waste heat recovered from the device to be heat-exchanged is sufficient for the heating capacity.

When the total of the amount of heat generated by the devices 45 and 46 to be heat-exchanged and the amount of heat dissipated by the coolant-heating heat exchanger 31 into the coolant is estimated not to exceed the heat amount required for heating of the vehicle interior, it can be determined that the amount of the waste heat recovered from the device to be heat-exchanged is not sufficient for the heating capacity. On the other hand, when the total of the amount of heat generated by the devices 45 and 46 to be heat-exchanged and the amount of heat dissipated by the coolant-heating heat exchanger 31 into the coolant is estimated to exceed the heat amount required for heating of the vehicle interior, it can be determined that the amount of the waste heat recovered from the device to be heat-exchanged is sufficient for the heating capacity.

In the first defrosting mode shown in FIG. 17, when the frost is supposed to be formed on the radiator 14, the devices 45 and 46 to be heat-exchanged as the heat storage member, the coolant-cooling heat exchanger 30, and the radiator flow path 11 are included in one of the first and second circulation circuits. On the other hand, the coolant-heating heat exchanger 31 and one bypass flow path 13 of the first and second bypass flow paths 12 and 13 are included in the other one of the first and second circulation circuits.

Thus, in the heat pump operation of absorbing heat from the devices 45 and 46 to be heat-exchanged as the heat storage member, the temperature of the coolant to be introduced into the radiator 14 can be increased to melt the frost formed on the radiator 14.

In the second defrosting mode shown in FIG. 18, when the frost is supposed to be formed on the radiator 14, the devices 45 and 46 to be heat-exchanged as the heat storage member, the coolant-cooling heat exchanger 30, and one bypass flow path 13 of the first and second bypass flow paths 12 and 13 are included in one of the first and second circulation circuits. On the other hand, the coolant-heating heat exchanger 31 and the radiator flow path 11 are included in the other one of the first and second circulation circuits.

Thus, in the heat pump operation of absorbing heat from the devices 45 and 46 to be heat-exchanged as the heat storage member, the temperature of the coolant to be introduced into the radiator 14 can be increased to melt the frost formed on the radiator 14.

In the heat-storage-member heat absorption heat pump heating mode shown in FIG. 19, when the temperature of the devices 45 and 46 to be heat-exchanged as the heat storage member is higher than a predetermined temperature, the flow of coolant is switched in the following manner. Specifically, the devices 45 and 46 to be heat-exchanged as the heat storage member, the coolant-cooling heat exchanger 30, and one bypass flow path 12 of the first and second bypass flow paths 12 and 13 are included in one of the first and second circulation circuits. Further, the coolant-heating heat exchanger 31 and the other bypass flow path 13 of the first and second bypass flow paths 12 and 13 are included in the other one of the first and second circulation.

Thus, the vehicle interior can be heated in the heat pump operation which involves absorbing heat from the devices 45 and 46 to be heat-exchanged as the heat storage member.

As described in FIG. 8, the first switching valve 24 can mix the coolant entering the first inlet 24a with the coolant entering the second inlet 24b in the communication flow path 241c by controlling the rotation position of the valve body 242, so that the mixed coolant can flow from the outlet 24c.

That is, the four communication flow paths 241c, 241d, 241e, and 241f of the first switching valve 24 serve as a mixing space for mixing the coolant entering the first inlet 24a and the coolant entering the second inlet 24b.

Likewise, the second switching valve 47 can distribute the coolant entering the inlets 47c, 47d, 47e, and 47f to a coolant flowing from the first outlet 47a and another coolant flowing from the second outlet 47b in the four continuous flow paths 471c, 471d, 471e, and 471f by controlling the rotation position of the valve body 472.

That is, the four communication flow paths 471c, 471d, 461e, and 471f of the second switching valve 47 serve as a distribution space for distributing the coolant entering the inlets 47c, 47d, 47e, and 47f to the coolant flowing from the first outlet 47a and the coolant flowing from the second outlet 47b.

Thus, for example, a ratio of mixing of the coolant entering the first inlet 24a to the coolant entering the second inlet 24b is adjusted by rotating the valve body 242 of the first switching valve 24 based on the temperature of coolant requested by the battery module 45 and the inverter module 46 as the device to be heat-exchanged. Based on the mixing ratio, the valve body 472 of the second switching valve 47 is rotated, whereby a ratio of distribution of the coolant flowing from the first outlet 47a to that flowing from the second outlet 47b can be adjusted. In this way, the high-temperature coolant and the low-temperature coolant are mixed together according to the temperature request made by the battery module 45 and the inverter module 46 to thereby produce the intermediate-temperature coolant.

(Second Embodiment)

Figure 20:
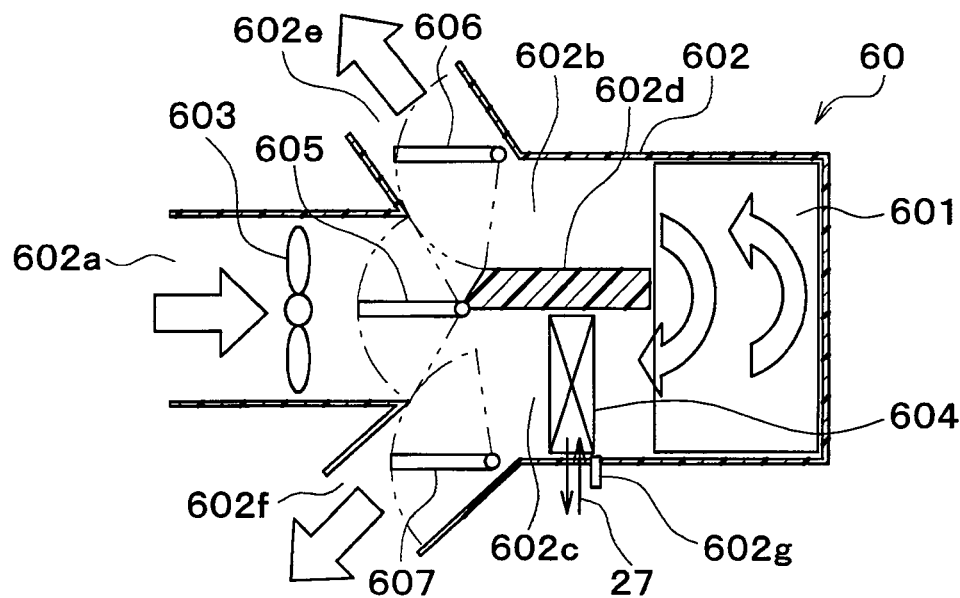
FIG. 20 is a cross-sectional view of a battery module according to a second embodiment of the invention.

Although in the first embodiment, the battery module 45 directly exchanges heat between the battery 451 and the coolant, as shown in FIG. 20, in a second embodiment, a battery module 60 exchanges heat between the coolant and a battery 601 via the air.

The battery module 60 includes a casing 602 for accommodating therein the battery 601. The casing 602 forms an air passage through which the air blown by a blower 603 flows. The casing 602 is provided with an inside air introduction port 602a for introducing air in the vehicle interior (hereinafter referred to as an inside air).

The battery 601 is disposed on one end side of the inside of the casing 602. The inside air introduction port 602a is disposed on the other end side of the inside of the casing 602. One end part of the casing 602 with the battery 601 disposed therein is formed of thermal insulating material. Thus, the battery module 60 has a heat retaining structure for storing hot heat and cold heat in the battery 601.

The blower 603 is disposed in the vicinity of the inside air introduction port 602a. In the operation of the blower 603, the inside air is introduced from the inside air introduction port 602a to be blown to an air passage in the casing 602.

Inside the casing 602, a partitioning plate 602d is provided for partitioning the space leading from the inside air introduction port 602a to the battery 601 into two air passages 602b and 602c.

An air passage (not shown) through which air flows is formed in the battery 601. The battery 601 is cooled or heated by exchanging heat with the air passing through the battery. The air passage inside the battery 601 communicates with the two air passages 602b and 602c inside the casing 602.

The casing 602 is provided with two air discharge ports 602e and 602f for discharging the air having flowed through the air passages 602b and 602c. One air discharge port 602e communicates with one air passage 602b. The other air discharge port 602f communicates with the other air passage 602c.

The other air passage 602c is provided with a battery heat exchanger 604. The battery heat exchanger 604 exchanges heat between the air and the coolant.

A drain 602g is disposed near the battery heat exchanger 604 of the casing 602, and adapted to discharge condensed water generated when the air passes through the battery heat exchanger 604.

Three air path switching doors 605, 606, and 607 are disposed inside the casing 602.

The three air path switching doors 605, 606, and 607 constitute an air flow switching device that switches the air flow in the air passages 602b and 602c.

The first air path switching door 605 switches between the inside air introduction port 602a and each of the air passages 602b and 602c to make communication therebetween. The second air path switching door 606 opens/closes one air discharge port 602e. The third air path switching door 607 opens/closes the other air discharge port 602f.

The operation of the electric actuator for rotatably driving the three air path switching doors 605, 606, and 607 is controlled by the controller 50.

The rotation of the three air path switching doors 605, 606, and 607 switches the battery module 60 among four modes, namely, the heat-retention mode, the heat storage mode, the cold storage mode, and the stored cold heat recovery mode.

Figure 21:
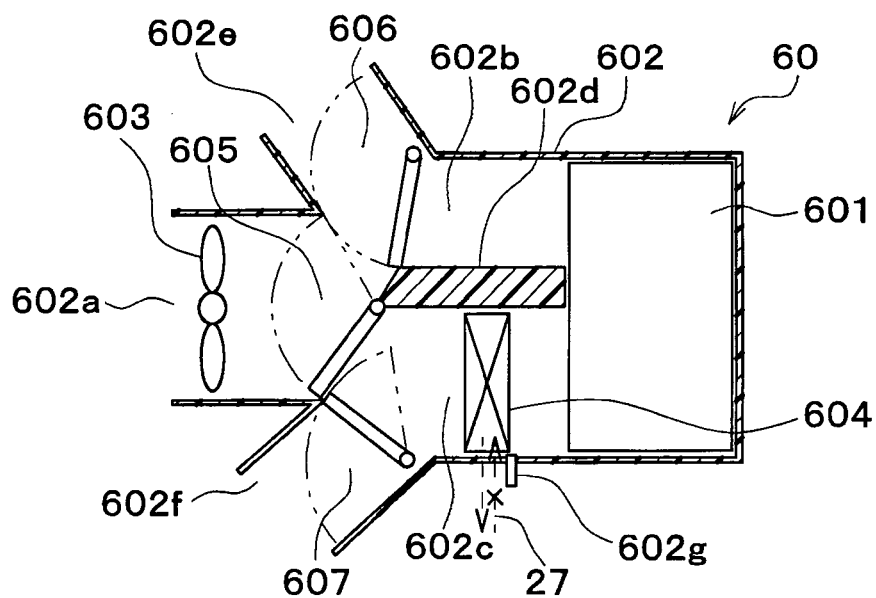
FIG. 21 is a cross-sectional view of the battery module, while showing a heat-retention mode in the second embodiment.

In the heat-retention mode, the three air path switching doors 605, 606, and 607 are rotated to the position shown in FIG. 21 to close all the inside air introduction port 602a and the air discharge ports 602e and 602f.

Thus, in the air passage inside the casing 602, the circulation of both the inside air and outside air is interrupted. The battery 601 stores herein heat generated by itself. In the heat-retention mode, the circulation of the coolant to the battery heat exchanger 604 is preferably interrupted so as to effectively store the heat in the battery 601.

Figure 22:
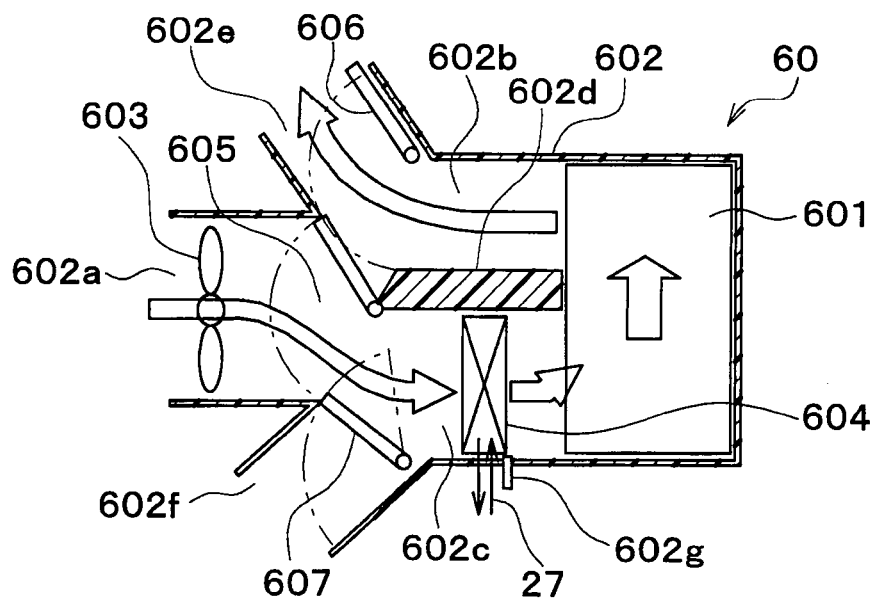
FIG. 22 is a cross-sectional view of the battery module, while showing a heat storage mode and a cold storage mode in the second embodiment.

The heat storage mode is performed when the outside air temperature is low, mainly in winter (at a low outside air temperature). As shown in FIG. 22, in the heat storage mode, the first air path switching door 605 brings the inside air introduction port 602a into communication with the air passage 602c, while the second air path switching door 606 opens one air discharge port 602e, and the third air path switching door 607 closes the other air discharge port 602f.

Thus, the inside air introduced from the inside air introduction port 602a flows through the air passage 602c, the battery heat exchanger 604, and the battery 601 in that order and then through the air passage 602b to be discharged from one air discharge port 602d.

At this time, the battery heat exchanger 604 allows the circulation of the coolant heated by at least one of the coolant-heating heat exchanger 31 and the inverter module 46.

In this way, the inside air heated by the battery heat exchanger 604 flows through the battery 601, causing the hot heat to be stored in the battery 601.

The cold storage mode is performed when the outside air temperature is high, mainly in summer (at a high outside air temperature). In the cold storage mode, like the heat storage mode shown in FIG. 22, the three air path switching doors 605, 606, and 607 are rotatably operated.

Thus, the inside air introduced from the inside air introduction port 602a flows through the air passage 602c, the battery heat exchanger 604, and the battery 601 in that order and then through the air passage 602b to be discharged from one air discharge port 602d.

At this time, the battery heat exchanger 604 allows the coolant cooled by the coolant-cooling heat exchanger 30 to circulate therethrough. In this way, the inside air cooled by the battery heat exchanger 604 flows through the battery 601, causing the cold heat to be stored in the battery 601.

Figure 23:
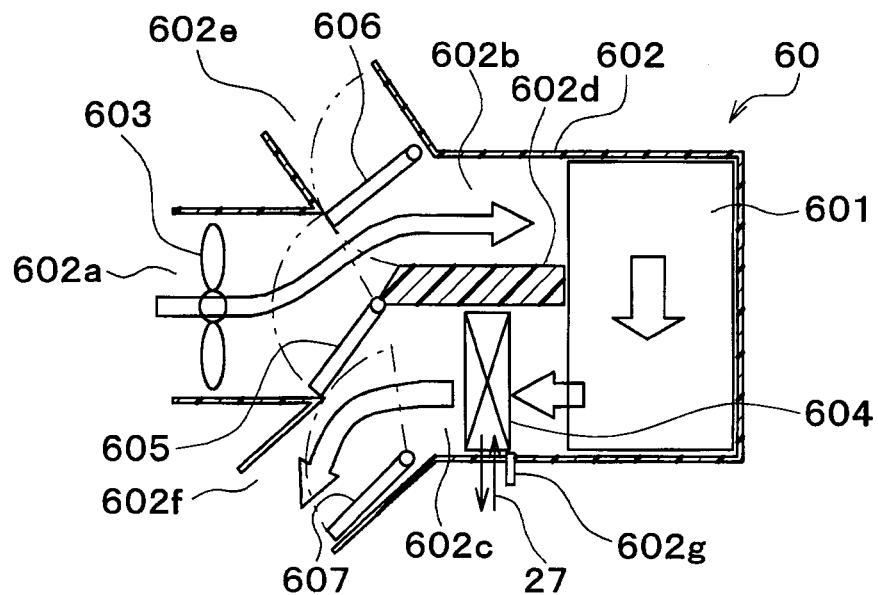
FIG. 23 is a cross-sectional view of the battery module, while showing a stored cold heat recovery mode in the second embodiment.

The stored cold heat recovery mode is performed, after the heat storage mode or cold storage mode, that is, when the hot heat or cold heat is stored in the battery 601. As shown in FIG. 23, in the stored cold heat recovery mode, the first air path switching door 605 brings the inside air introduction port 602a into communication with the air passage 602b, while the second air path switching door 606 closes one air discharge port 602e, and the third air path switching door 607 opens the other air discharge port 602f.

Thus, the inside air introduced from the inside air introduction port 602a flows through the air passage 602b, the battery 601, and the battery heat exchanger 604 in that order, and then through the air passage 602b to be discharged from the other air discharge port 602e.

At this time, when the hot heat is stored in the battery 601, the battery heat exchanger 604 allows the coolant cooled by the coolant-cooling heat exchanger 30 to circulate therethrough. Thus, the inside air heated by the battery 601 flows through the battery heat exchanger 604, so that the hot heat stored in the battery 601 can be recovered in the coolant.

On the other hand, when the cold heat is stored in the battery 601, the battery heat exchanger 604 allows the circulation of the coolant heated by at least one of the coolant-heating heat exchanger 31 and the inverter module 46. Thus, the inside air cooled by the battery 601 flows through the battery heat exchanger 604, so that the cold heat stored in the battery 601 can be recovered in the coolant.

Figure 24:
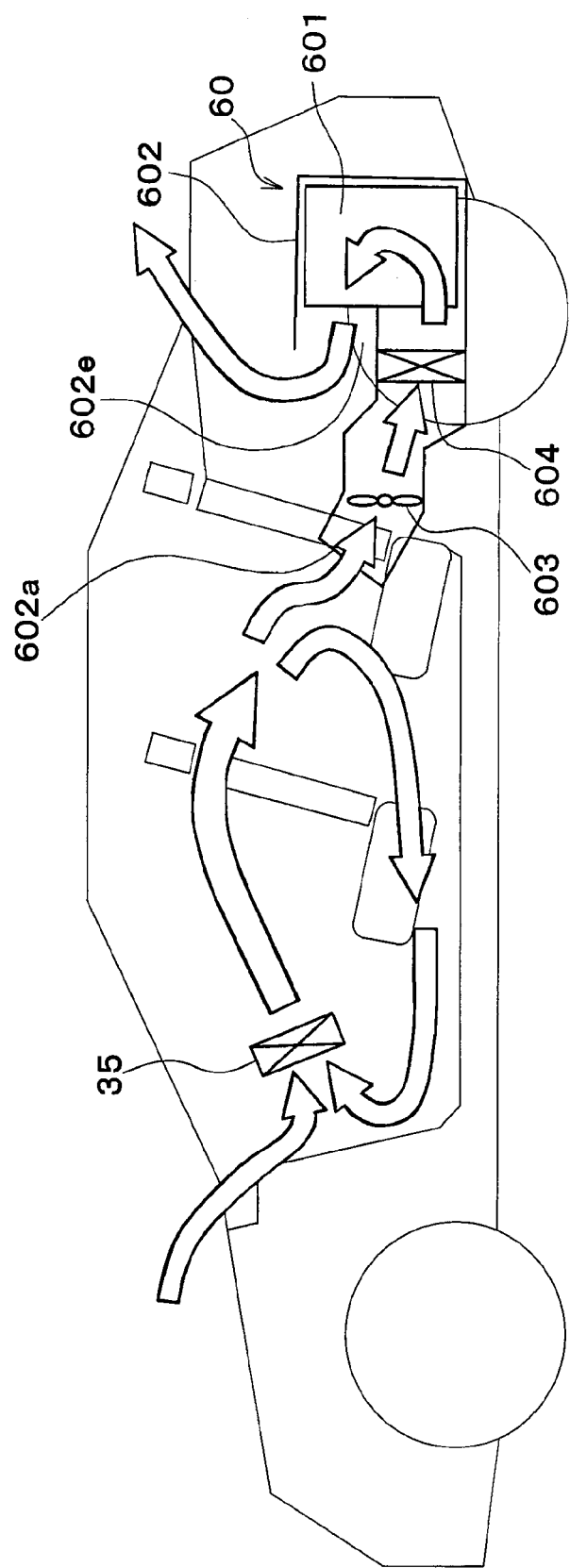
FIG. 24 is a diagram for explaining a first air guide path pattern of a ventilation loss recovery mode in the second embodiment.
Figure 25:
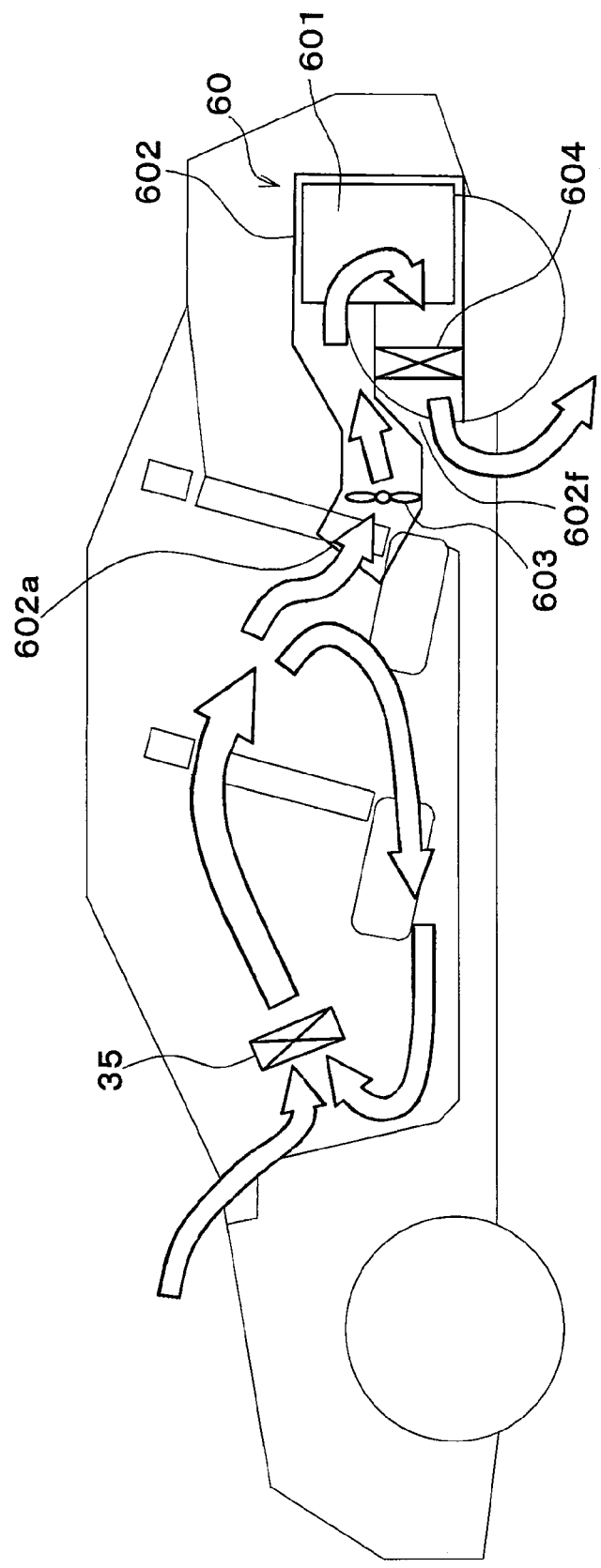
FIG. 25 is a diagram for explaining a second air guide path pattern of the ventilation loss recovery mode in the second embodiment.

Referring to FIGS. 24 and 25, the battery module 60 is disposed in a luggage room at the rear part of the vehicle compartment.

FIGS. 24 and 25 show the ventilation loss recovery mode in which the hot heat and cold heat are recovered from the air which is to be discharged from the vehicle interior to the outside of the vehicle for ventilation. Specifically, FIG. 24 illustrates a first air guide path pattern (first air flow state) in the ventilation loss recovery mode, and FIG. 25 illustrates a second air guide path pattern (second air flow state) in the ventilation loss recovery mode.

The first air guide path pattern shown in FIG. 24 is a pattern of the air flow in the vehicle interior in use of a heater in winter and when the vehicle interior temperature is higher than a battery temperature (vehicle interior temperature>battery temperature), or in use of a cooler in summer and when the vehicle interior temperature is lower than a battery temperature (vehicle interior temperature<battery temperature). The first air guide path pattern is achieved by switching the battery module 60 to the heat storage mode or the cold storage mode.

In use of the heater in winter, the coolant whose temperature is lower than the air temperature of the vehicle interior is allowed to circulate through the battery heat exchanger 604. Thus, when the temperature of the battery 601 is lower than the vehicle interior air temperature in winter, the vehicle interior air is discharged to the outside air through the battery 601 after the hot heat is recovered by the coolant in the battery heat exchanger 604. As a result, the amount of heat absorbed from the vehicle interior air can be maximized.

On the other hand, in use of the cooler in summer, the coolant whose temperature is higher than the air temperature of the vehicle interior is allowed to circulate through the battery heat exchanger 604. Thus, when the temperature of the battery 601 is higher than the vehicle interior air temperature in summer, the vehicle interior air cools the coolant in the battery heat exchanger 604, and then passes through the battery 601 to be discharged to the outside air. Thus, the cooling of the coolant with the vehicle interior air can be maximized.

A second air guide path pattern shown in FIG. 25 is a pattern of the air flow in the vehicle interior in use of a heater in winter and when the vehicle interior temperature is lower than a battery temperature (vehicle interior temperature<battery temperature), or in use of a cooler in summer and when the vehicle interior temperature is higher than a battery temperature (vehicle interior temperature>battery temperature). The second air guide path pattern is achieved by switching the battery module 60 to the stored cold heat recovery mode.

In use of the heater in winter, the coolant whose temperature is lower than the air temperature of the vehicle interior is allowed to circulate through the battery heat exchanger 604. Thus, when the temperature of the battery 601 is higher than the vehicle interior air temperature in winter, the vehicle interior air passes through the battery 601 to recover the hot heat stored in the battery 601, and then passes through the battery heat exchanger 604 to recover the hot heat in the coolant to be discharged to the outside air. In this way, the amount of absorption of excessive heat of the battery 601 can be maximized in addition to the amount of heat absorption from the vehicle interior.

On the other hand, in use of the cooler in summer, the coolant whose temperature is higher than the air temperature of the vehicle interior is allowed to circulate through the battery heat exchanger 604. Thus, when the temperature of the battery 601 is lower than the vehicle interior air temperature in summer, the vehicle interior air passes through the battery 601 to be cooled by the cold heat stored in the battery 601. Then, the vehicle interior air passes through the battery heat exchanger 604 to thereby cool the coolant, and is discharged to the outside air. As a result, the cooling of the coolant with the battery 601 can be maximized in addition to the cooling of the coolant with the vehicle interior air.

Thus, in the first air guide path pattern and second air guide path pattern in the ventilation loss recovery mode, the cold and hot heats held in the inside air to be discharged to the outside of the vehicle for the ventilation can be recovered in the coolant to thereby effectively perform the thermal management.

In this embodiment, in the case of transferring the hot heat from the air to the coolant, when the temperature of the battery 601 is higher than that of the air, the three air path switching doors 605, 606, and 607 are operated to switch the air flow to the second air guide path pattern, whereas when the temperature of the battery 601 is lower than that of the air, the three air path switching doors 605, 606, and 607 are operated to switch the air flow to the first air guide path pattern.

In the case of transferring the cold heat from the air to the coolant, when the temperature of the battery 601 is higher than that of the air, the three air path switching doors 605, 606, and 607 are operated to switch the air flow to the first air guide path pattern, whereas when the temperature of the battery 601 is lower than that of the air, the three air path switching doors 605, 606, and 607 are operated to switch the air flow to the second air guide path pattern.

Thus, the hot heat and the cold heat can be recovered from the air which is to be discharged from the vehicle interior to the outside of the vehicle.

In this embodiment, in the case of transferring the hot heat from the air to the coolant, when the temperature of the battery 601 is higher than that of the air, the three air path switching doors 605, 606, and 607 are operated to switch the air flow to the second air guide path pattern, whereas when the temperature of the battery 601 is lower than that of the air, the three air path switching doors 605, 606, and 607 are operated to switch the air flow to the first air guide path pattern.

In the case of transferring the cold heat from the air to the coolant, when the temperature of the battery 601 is higher than that of the air, the three air path switching doors 605, 606, and 607 are operated to switch the air flow to the first air guide path pattern, whereas when the temperature of the battery 601 is lower than that of the air, the three air path switching doors 605, 606, and 607 are operated to switch the air flow to the second air guide path pattern.

Thus, the hot heat and the cold heat can be recovered from the air which is to be discharged from the vehicle interior to the outside of the vehicle.

(Third Embodiment)

Figure 26:
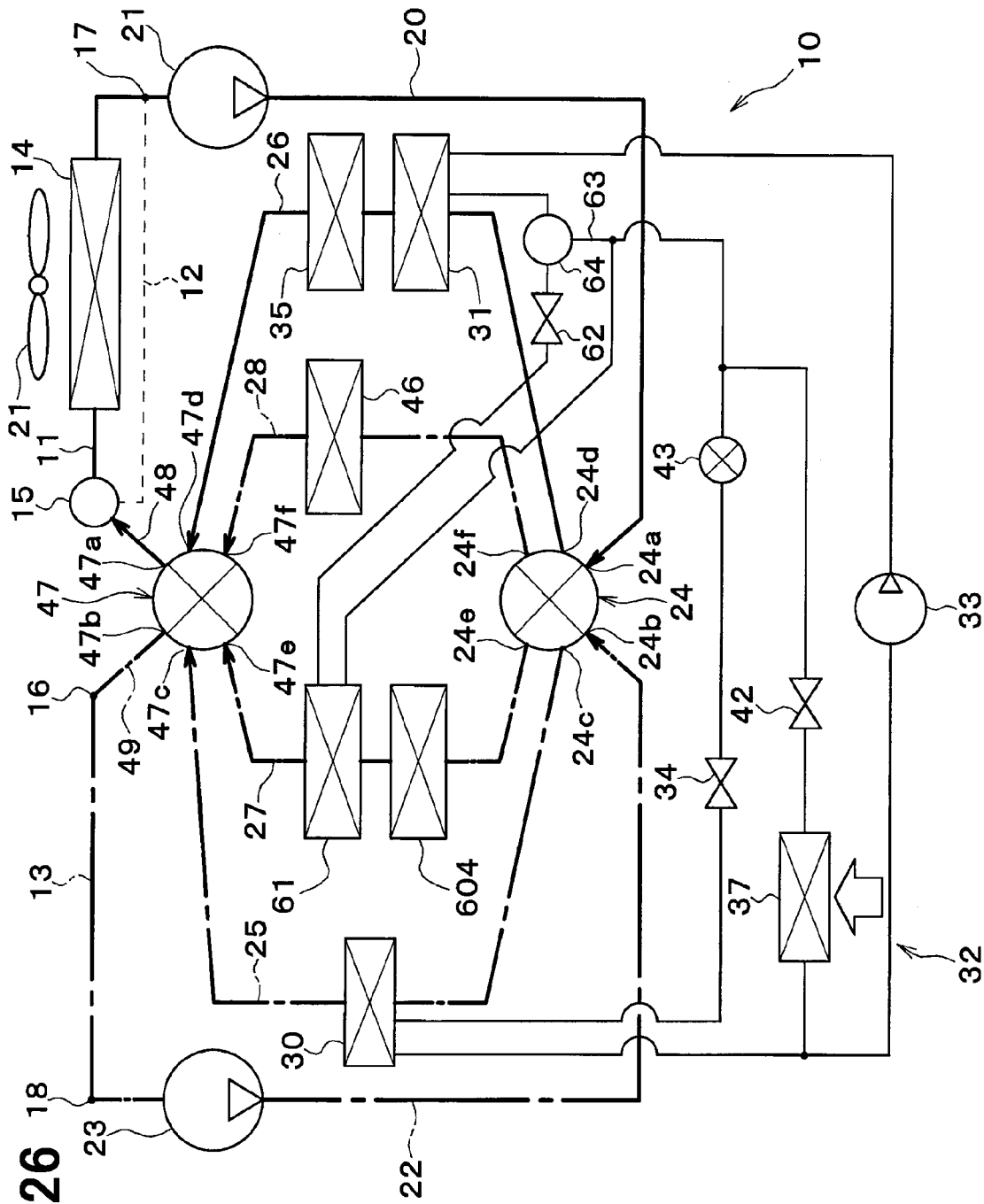
FIG. 26 is an entire configuration diagram of the vehicle thermal management system, while showing a subcool mode according to a third embodiment of the invention.

In a third embodiment of the invention, as shown in FIG. 26, a coolant-refrigerant heat exchanger 61 is added to the structure of the above second embodiment.

The coolant-refrigerant heat exchanger 61 is a heat exchanger (heat medium-refrigerant heat exchanger) that exchanges heat between the coolant (heat medium) flowing from the battery heat exchanger 604 and the refrigerant flowing from the coolant-heating heat exchanger 31.

Specifically, the coolant-refrigerant heat exchanger 61 is disposed on the downstream side of the battery heat exchanger 604 in the third parallel flow path 27, and on the downstream side of the coolant-heating heat exchanger 31 in the refrigeration cycle 32. That is, the coolant-refrigerant heat exchanger 61 and the battery heat exchanger 604 are arranged in series in the third parallel flow path 27.

An electric expansion valve 62 is disposed between the coolant-heating heat exchanger 31 and the coolant-refrigerant heat exchanger 61. The opening degree of the electric expansion valve 62 is controlled by the controller 50.

The refrigeration cycle 32 includes a bypass flow path 63 and a three-way valve 64. The bypass flow path 63 is a flow path that allows the refrigerant flowing from the coolant-heating heat exchanger 31 to bypass the electric expansion valve 62 and the coolant-refrigerant heat exchanger 61. The three-way valve 64 is a switching device that switches the refrigerant flowing from the coolant-heating heat exchanger 31 between the state of flow through the electric expansion valve 62 and the coolant-refrigerant heat exchanger 61, and the state of flow through the bypass flow path 63.

In the ventilation loss recovery mode, the opening degree of the electric expansion valve 62 is changed to switch among three modes, namely, a subcool mode, an intermediate pressure mode, and a heat absorption source mode.

The subcool mode is a mode that is performed in the cooling mode in summer. In the subcool mode, as indicated by solid arrows and alternate long and short dashed arrows of FIG. 26, two coolant circulation circuits (first circulation circuit and second circulation circuit) are formed.

Specifically, the radiator 14, the coolant-heating heat exchanger 31, and the heater core 35 form the high-temperature coolant circuit, whereas the coolant-cooling heat exchanger 30, the battery heat exchanger 604, the coolant-refrigerant heat exchanger 61, and the inverter module 46 form the low-temperature coolant circuit.

Figure 27:
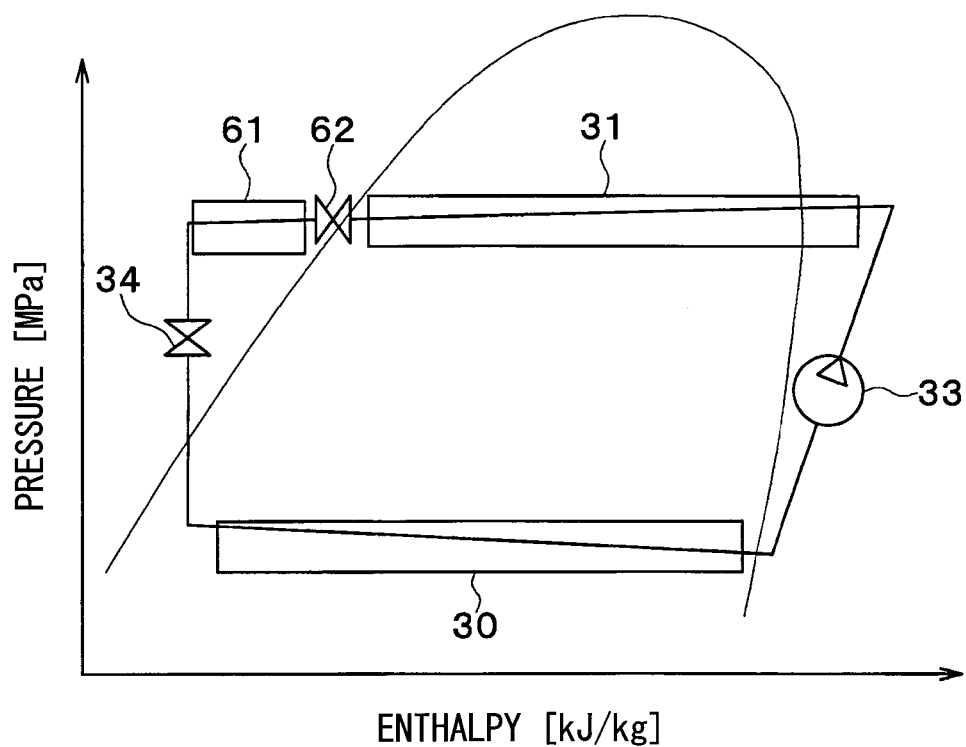
FIG. 27 is a Mollier chart of a refrigeration cycle in the subcool mode.

In the subcool mode, the opening degree of the electric expansion valve 62 is brought into a fully opened state. FIG. 27 is a Mollier chart of the refrigeration cycle 32 in the subcool mode.

In the refrigeration cycle 32, the refrigerant flowing from the coolant-heating heat exchanger 31 flows through the coolant-refrigerant heat exchanger 61 without being decompressed by the electric expansion valve 62. At this time, in the coolant circuit, the coolant having recovered the cold heat from the inside air ventilated by the battery heat exchanger 604 flows through the coolant-refrigerant heat exchanger 61.

Thus, the liquid-phase refrigerant condensed by the coolant-heating heat exchanger 31 can be further cooled by the cold heat recovered by the inside air ventilated to enhance the degree of supercooling of the refrigerant. Thus, the coefficient of performance of the refrigeration cycle 32 can be improved to reduce the power consumption of the compressor 33.

Figure 28:
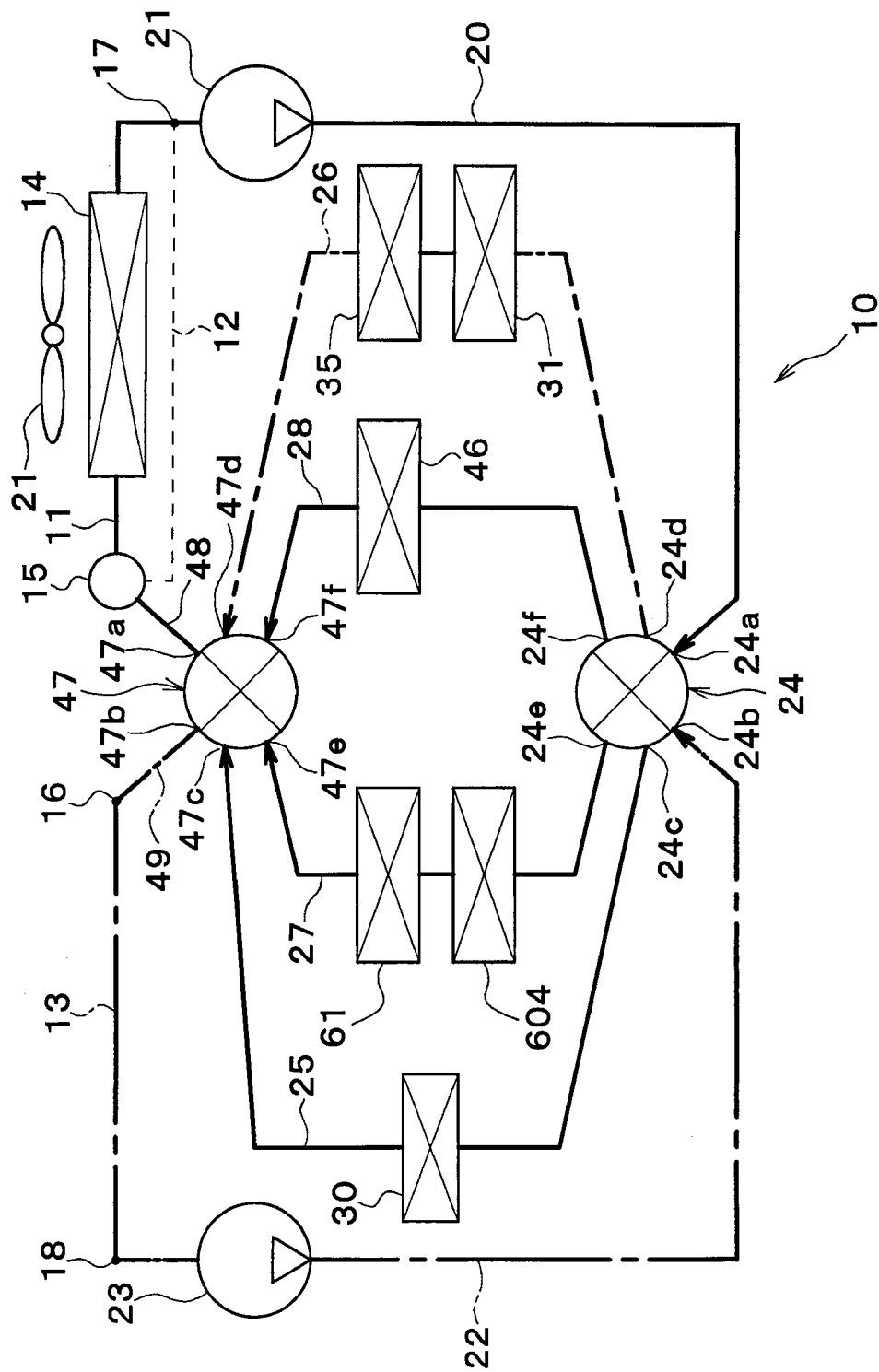
FIG. 28 is an entire configuration diagram of the vehicle thermal management system, while showing an intermediate pressure mode in the third embodiment.

The intermediate pressure mode is a mode that is performed in the winter heating mode. In the intermediate pressure mode, as indicated by solid arrows and alternate long and short dashed arrows of FIG. 28, two coolant circulation circuits (first circulation circuit and second circulation circuit) are formed.

Specifically, the radiator 14, the coolant-cooling heat exchanger 30, the battery heat exchanger 604, the coolant-refrigerant heat exchanger 61, and the inverter module 46 form the low-temperature coolant circuit, whereas the coolant-heating heat exchanger 31, and the heater core 35 form the high-temperature coolant circuit.

Figure 29:
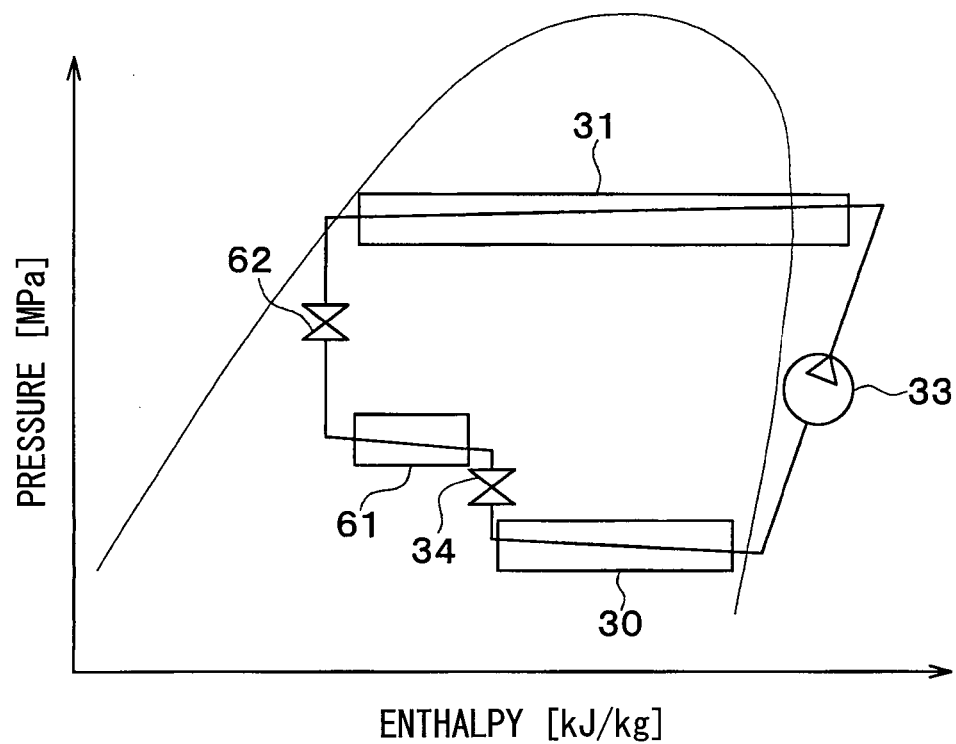
FIG. 29 is a Mollier chart of the refrigeration cycle in the intermediate pressure mode.

In the intermediate pressure mode, the opening degree of the electric expansion valve 62 is restricted to a predetermined opening degree. FIG. 29 is a Mollier chart of a refrigeration cycle 32 in the intermediate pressure mode.

In the refrigeration cycle 32, the refrigerant flowing from the coolant-heating heat exchanger 31 is decompressed by an electric expansion valve 62, and then flows through the coolant-refrigerant heat exchanger 61 to exchange heat with the coolant. Further, the refrigerant is decompressed by the expansion valve 34, and then flows through the coolant-cooling heat exchanger 30 to exchange heat with the coolant.

The coolant flowing through the coolant-refrigerant heat exchanger 61 is heated by the battery heat exchanger 604. The coolant flowing through the coolant-cooling heat exchanger 30 is not heated by the battery heat exchanger 604. Thus, the temperature of the coolant becomes lower in the coolant-cooling heat exchanger 30, so that the refrigerant flowing from the coolant-cooling heat exchanger 30 is decompressed by the expansion valve 34 to be introduced into the coolant-cooling heat exchanger 30, so that the coolant-cooling heat exchanger 30 can also exchange heat between the refrigerant and the coolant.

Accordingly, the heat pump heating can be achieved which involves absorbing heat from the outside air to heat the vehicle interior. Further, the hot heat recovered from the inside air can serve as a heat absorption source for the heat pump cycle.

In the intermediate pressure mode, the efficiency of the refrigeration cycle 32 (heat pump cycle) is improved by a decrease in amount of heat absorption from the coolant-cooling heat exchanger 30 in a low temperature range (that is less likely to absorb heat), so that the energy discarded at the time of ventilation is partially recovered.

The heat absorption source mode is a mode that is performed in the winter heating mode and when a heating capacity can be ensured by the hot heat recovered from the inside air as well as the waste heat recovered by the device to be heat-exchanged (that is, when the heat absorption from the outside air is unnecessary).

Figure 30:
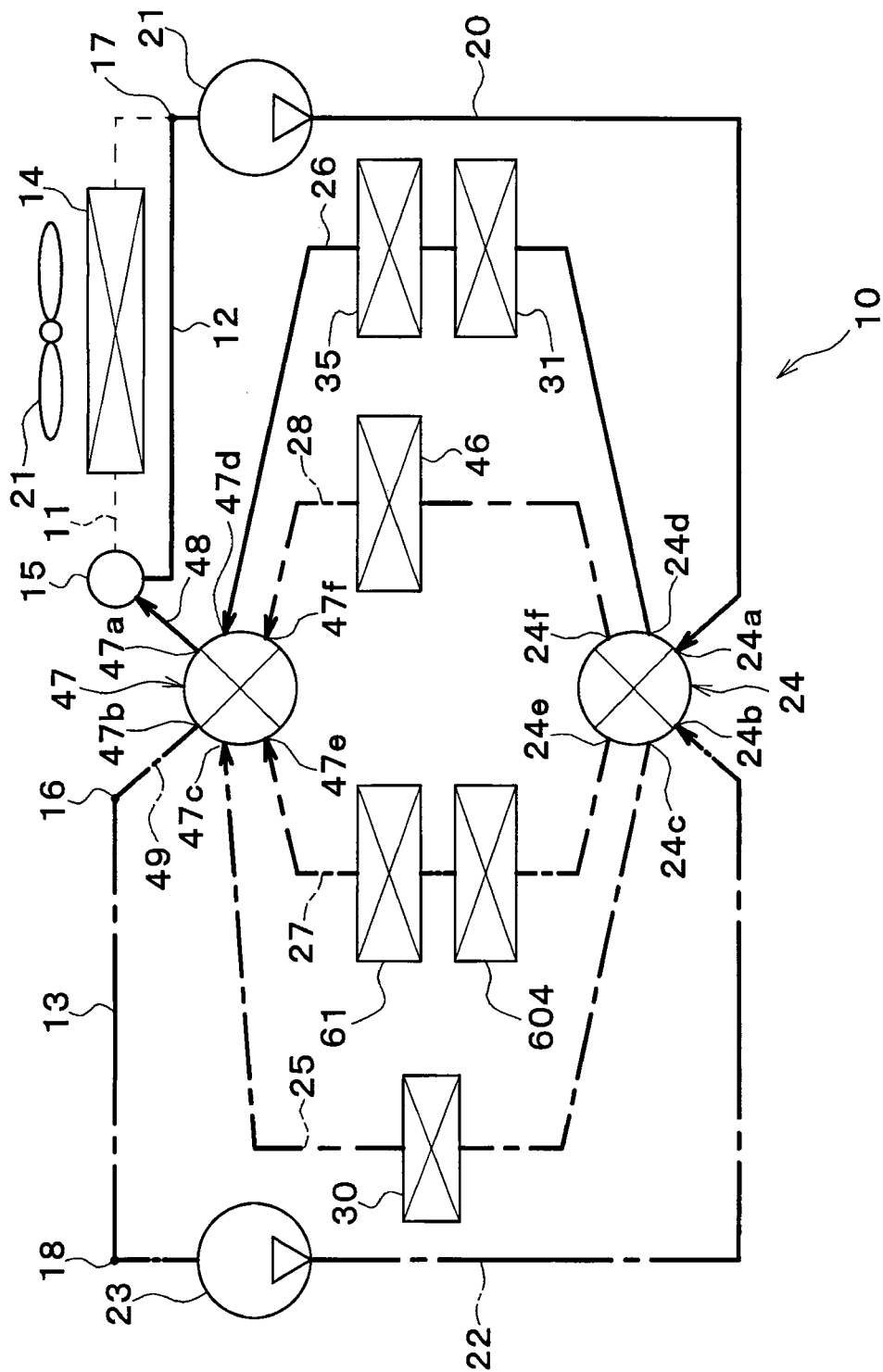
FIG. 30 is an entire configuration diagram of the vehicle thermal management system, while showing a heat absorption source mode in the third embodiment.
Figure 31:
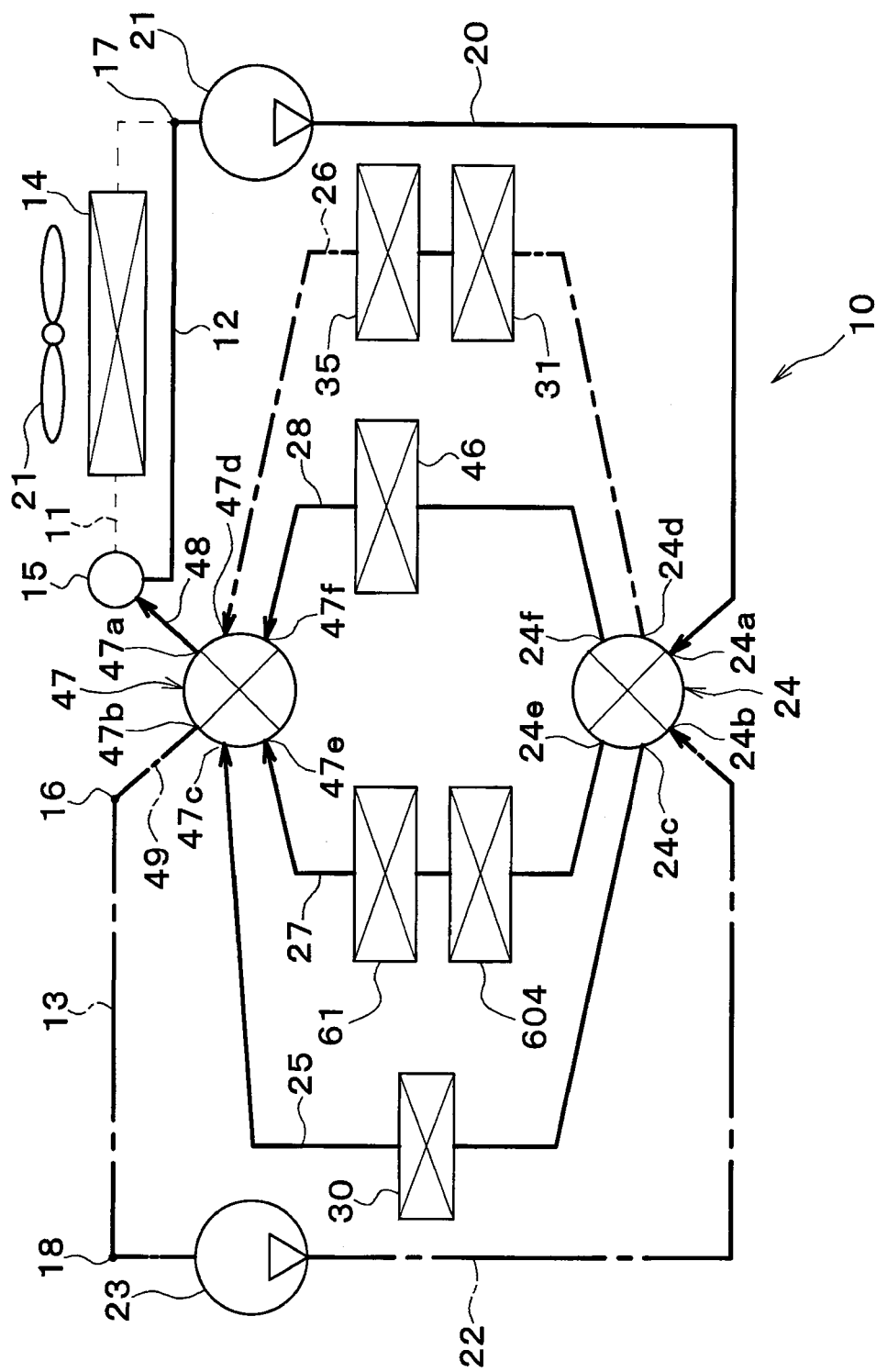
FIG. 31 is an entire configuration diagram of the vehicle thermal management system, while showing a heat absorption source mode in the third embodiment.

In the heat absorption source mode, as indicated by solid arrows and alternate long and short dashed arrows of FIGS. 30 and 31, two coolant circulation circuits (first circulation circuit and second circulation circuit) are formed.

Specifically, the coolant-cooling heat exchanger 30, the battery heat exchanger 604, the coolant-refrigerant heat exchanger 61, and the inverter module 46 form the low-temperature coolant circuit, whereas the coolant-heating heat exchanger 31, and the heater core 35 form the high-temperature coolant circuit.

FIGS. 30 and 31 illustrate substantially the same coolant circuit, but differ from each other only in that as shown in FIG. 30, the first pump 21 forms the high-temperature coolant circuit, and the second pump 23 forms the low-temperature coolant circuit, while as shown in FIG. 31, the first pump 21 forms the low-temperature coolant circuit, and the second pump 23 forms the high-temperature coolant circuit.

Figure 32:
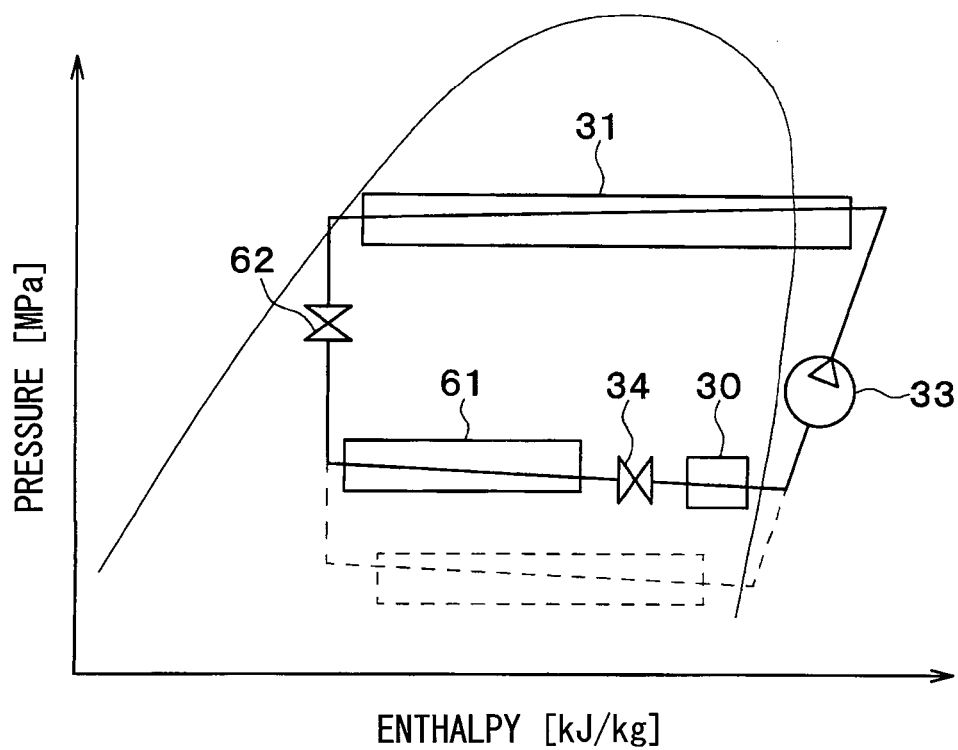
FIG. 32 is a Mollier chart of the refrigeration cycle in the heat absorption source mode.

In the heat absorption source mode, the opening degree of the electric expansion valve 62 is restricted to the predetermined opening degree, and the opening degree of the expansion valve 34 is fully opened. FIG. 32 is a Mollier chart of the refrigeration cycle 32 in the heat absorption source mode.

In the refrigeration cycle 32, the refrigerant flowing from the coolant-heating heat exchanger 31 is decompressed by the electric expansion valve 62, and then flows through the coolant-refrigerant heat exchanger 61 to exchange heat with the coolant. Further, the refrigerant flows through the coolant-cooling heat exchanger 30 without being decompressed by the expansion valve 34 to exchange heat with the coolant.

At this time, in the coolant circuit, the coolant having recovered the hot heat from the inside air ventilated by the battery heat exchanger 604 flows through the coolant-refrigerant heat exchanger 61. Thus, the hot heat recovered from the inside air ventilated can serve as the heat absorption source for the heat pump cycle.

In the heat absorption source mode, the coolant does not circulate through the radiator 14, and thus does not absorb heat from the radiator 14. As compared to the case of absorbing heat from the radiator 14, because the temperature of the coolant entering the coolant-cooling heat exchanger 30 can be drastically increased, it can significantly improve the efficiency of evaporating the refrigerant on the low-pressure side of the refrigeration cycle 32 to reduce the driving power of the compressor 33, thereby achieving the energy saving of the air conditioning. In FIG. 32, a dashed line indicates a Mollier chart of the refrigeration cycle 32 obtained when absorbing heat from the radiator 14.

When the temperature of the coolant flowing through the coolant-cooling heat exchanger 30 is lower than that of the coolant flowing from the battery heat exchanger 604, the heat might be transferred from the refrigerant side to the coolant side, thus wasting the recovered energy. In this aspect, in the heat absorption source mode, because the temperature of the coolant flowing through the coolant-cooling heat exchanger 30 can be substantially the same as that of the coolant flowing from the battery heat exchanger 604, it can prevent the transfer of the heat from the refrigerant side to the coolant side, thereby avoiding the waste of the recovered energy.

In the subcool mode shown in FIG. 27, when the vehicle interior is cooled by the air cooled by the evaporator 37, the coolant-refrigerant heat exchanger 61 and the battery heat exchanger 604 are included in one of the first and second circulation circuits.

Thus, the cold heat recovered from the air which is to be discharged from the vehicle interior to the outside of the vehicle can supercool the high-pressure refrigerant flowing from the coolant-heating heat exchanger 31. As a result, the efficiency of the refrigeration cycle 32 can be improved.

As shown in FIGS. 29 and 32, in the refrigeration cycle 32 of this embodiment, the expansion valve 62 decompressing and expanding the refrigerant flowing from the coolant-heating heat exchanger 31 is disposed between the coolant-heating heat exchanger 31 and the coolant-refrigerant heat exchanger 61.

Thus, the coolant-refrigerant heat exchanger 61 can be used as the intermediate pressure heat exchanger or the low-pressure side heat exchanger of the refrigeration cycle 32, so that the hot heat recovered from the air which is to be discharged from the vehicle interior to the outside of the vehicle in the battery heat exchanger 604 can be absorbed in the refrigerant at the coolant-refrigerant heat exchanger 61.

In the intermediate pressure mode shown in FIG. 29, when the vehicle interior is heated by the air heated by the heater core 35, the battery heat exchanger 604, the coolant-refrigerant heat exchanger 61, and the coolant-cooling heat exchanger 30 are included in one of the first and second circulation circuits. At this time, the expansion valve 62 decompresses and expands the refrigerant flowing from the coolant-heating heat exchanger 31 such that the refrigerant pressure in the coolant-refrigerant heat exchanger 61 is positioned between the refrigerant pressure in the coolant-heating heat exchanger 31 and the refrigerant pressure in the coolant-cooling heat exchanger 30, and such that the evaporation temperature of the refrigerant in the coolant-refrigerant heat exchanger 61 is lower than that of the coolant circulating through the coolant-refrigerant heat exchanger 61.

Thus, the coolant-refrigerant heat exchanger 61 can be used as the intermediate pressure heat exchanger of the refrigeration cycle 32, so that the hot heat recovered from the air which is to be discharged from the vehicle interior to the outside of the vehicle in the battery heat exchanger 604 can be absorbed in the refrigerant at the coolant-refrigerant heat exchanger 61, thereby improving the efficiency of the operation of the heat pump.

In the intermediate pressure mode shown in FIG. 29, when the vehicle interior is heated by the air heated by the heater core 35, the battery heat exchanger 604, the coolant-refrigerant heat exchanger 61, and the coolant-cooling heat exchanger 30 are included in one of the first and second circulation circuits. At this time, the expansion valve 62 decompresses and expands the refrigerant flowing from the coolant-heating heat exchanger 31 such that the refrigerant pressure in the coolant-refrigerant heat exchanger 61 is positioned between the refrigerant pressure in the coolant-heating heat exchanger 31 and the refrigerant pressure in the coolant-cooling heat exchanger 30, and such that the evaporation temperature of the refrigerant in the coolant-refrigerant heat exchanger 61 is lower than that of the coolant circulating through the coolant-refrigerant heat exchanger 61.

Thus, the coolant-refrigerant heat exchanger 61 can be used as the intermediate pressure heat exchanger of the refrigeration cycle 32, so that the hot heat recovered from the air which is to be discharged from the vehicle interior to the outside of the vehicle in the battery heat exchanger 604 can be absorbed in the refrigerant at the coolant-refrigerant heat exchanger 61, thereby improving the efficiency of the operation of the heat pump.

(Fourth Embodiment)

Figure 33:
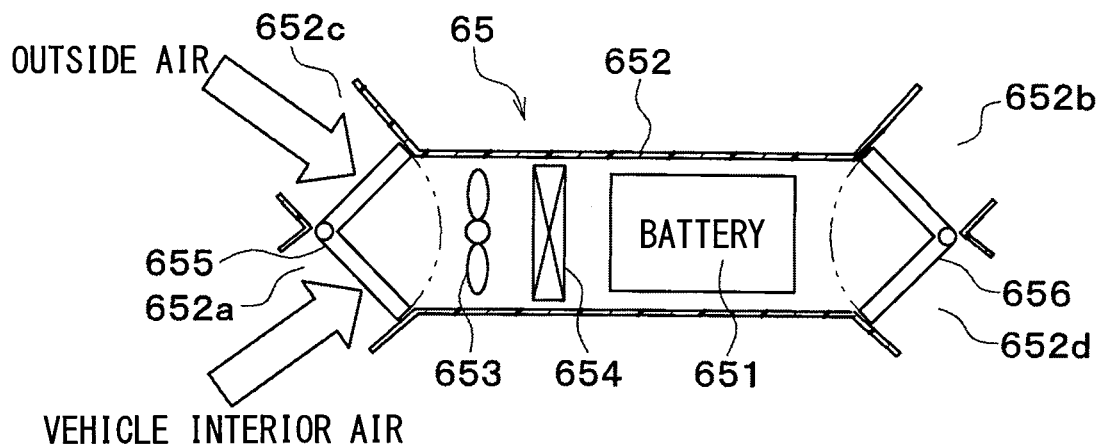
FIG. 33 is a cross-sectional view of a battery module, while showing a heat-retention mode according to a fourth embodiment of the invention.

Although in the above second embodiment, the air passage for allowing the air to U-turn is formed inside the casing 602 of the battery module 60, in a fourth embodiment, as shown in FIG. 33, an air passage for causing the air to linearly flow is formed in a casing 652 of a battery module 65.

The casing 652 of the battery module 65 forms an air passage through which the air blown by a blower 653 flows. Inside air introduction ports 652a and 652b for introducing inside air are provided in the casing 652.

A battery 651 is disposed at the substantially center of the inside of the casing 652. The inside air introduction ports 652a and 652b are disposed on both ends of the casing 652. The substantially center of the casing 652 with the battery 651 disposed therein is formed of thermal insulating material. Thus, the battery module 65 has a heat retaining structure for storing hot heat and cold heat in the battery 651.

The blower 653 is disposed at or close to the inside air introduction port 652a (on the left side in FIG. 33, that is, on the inside air introduction port 652a side) rather than the battery 651 in the casing 652. The blower 653 is operable in two ways, specifically, in one way that blows the air from one inside air introduction port 652a to the other inside air introduction port 652b, and in another way that blows the air in the opposite direction to the above-mentioned one way.

An air passage (not shown) through which air flows is formed in the battery 651. The battery 651 is cooled or heated by exchanging heat with the air passing through the battery. The air passage inside the battery 651 extends from one inside air introduction port 652a side to the other inside air introduction port 652b side.

The case 652 is provided with two air discharge ports 652c and 652d for discharging the outside air therefrom. One air discharge port 652c is disposed adjacent to one inside air introduction port 652a, and the other air discharge port 652d is disposed adjacent to the other inside air introduction port 652b.

A battery heat exchanger 654 is disposed between the battery 651 and the blower 653 inside the casing 652. The battery heat exchanger 654 exchanges heat between the air and the coolant.

Two air path switching doors 655 and 656 are disposed inside the casing 652. The first air path switching door 655 is a V-shaped door that opens and closes the inside air introduction port 652a and the air discharge port 652c by switching between the ports. The second air path switching door 656 is a V-shaped door that opens and closes the inside air introduction port 652b and the air discharge port 652d by switching between the ports.

The operation of the electric actuator for rotatably driving the two air path switching doors 655 and 656 is controlled by the controller 50.

By the rotation of the two air path switching doors 655 and 656, the battery module 65 is switched among four modes, namely, the heat-retention mode, the heat storage mode, the cold storage mode, and the stored cold heat recovery mode.

In the heat-retention mode, the two air path switching doors 655, and 656 are rotated to the position shown in FIG. 33 to close all the inside air introduction ports 652a and 652b and the air discharge ports 652c and 652d.

Thus, in the air passage inside the casing 652, the circulation of both the inside air and outside air is interrupted. As a result, the battery 651 stores herein heat generated by itself. In the heat-retention mode, the circulation of the coolant to the battery heat exchanger 654 is preferably interrupted so as to effectively store the heat in the battery 651.

Figure 34:
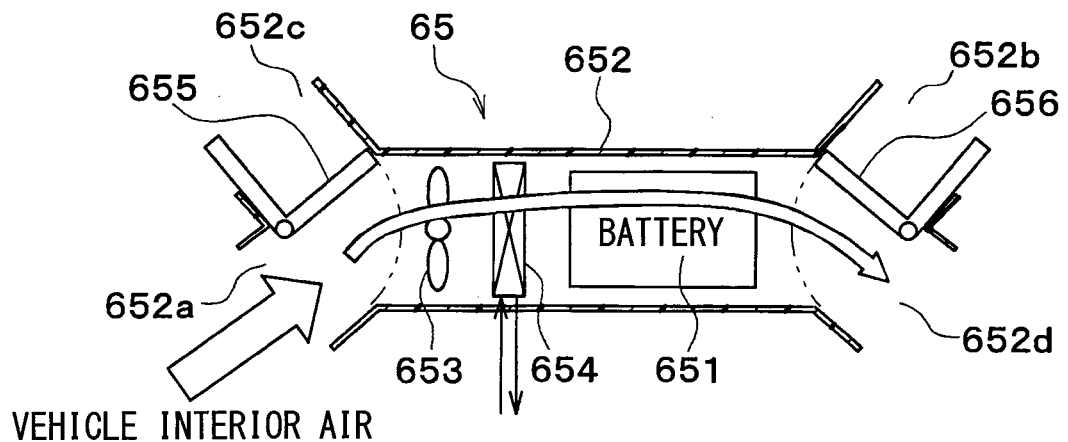
FIG. 34 is a cross-sectional view of the battery module, while showing a heat storage mode and a heat cold mode in the fourth embodiment.

The heat storage mode is performed when the outside air temperature is low, mainly in winter (at a low outside air temperature). As shown in FIG. 34, in the heat storage mode, the first air path switching door 655 opens the inside air introduction port 652a and closes the air discharge port 652c, while the second air path switching door 656 closes the inside air introduction port 652b and opens the air discharge port 652d. The blower 653 blows the air from one inside air introduction port 652a side to the other inside air introduction port 652b side.

Thus, the inside air introduced from the inside air introduction port 652a flows through the battery heat exchanger 654, and the battery 651 in that order within the casing 652, and is then discharged from the air discharge port 652d.

At this time, the battery heat exchanger 654 allows the circulation of the coolant heated by at least one of the coolant-heating heat exchanger 31 and the inverter module 46. In this way, the inside air heated by the battery heat exchanger 654 flows through the battery 651, causing the hot heat to be stored in the battery 651.

The cold storage mode is performed when the outside air temperature is high, mainly in summer (at a high outside air temperature). Like the heat storage mode shown in FIG. 34, in the cold storage mode, the two air path switching doors 655 and 656 are rotated to operate the blower 653 in the same manner as in the heat storage mode shown in FIG. 34.

Thus, the inside air introduced from the inside air introduction port 652a flows through the battery heat exchanger 654, and the battery 651 in that order, and is then discharged from the air discharge port 652d.

At this time, the battery heat exchanger 654 allows the coolant cooled by the coolant-cooling heat exchanger 30 to circulate therethrough. In this way, the inside air cooled by the battery heat exchanger 654 flows through the battery 651, causing the cold heat to be stored in the battery 651.

The stored cold heat recovery mode is performed after the heat storage mode or cold storage mode, that is, when the hot heat or cold heat is stored in the battery 651.

Figure 35:
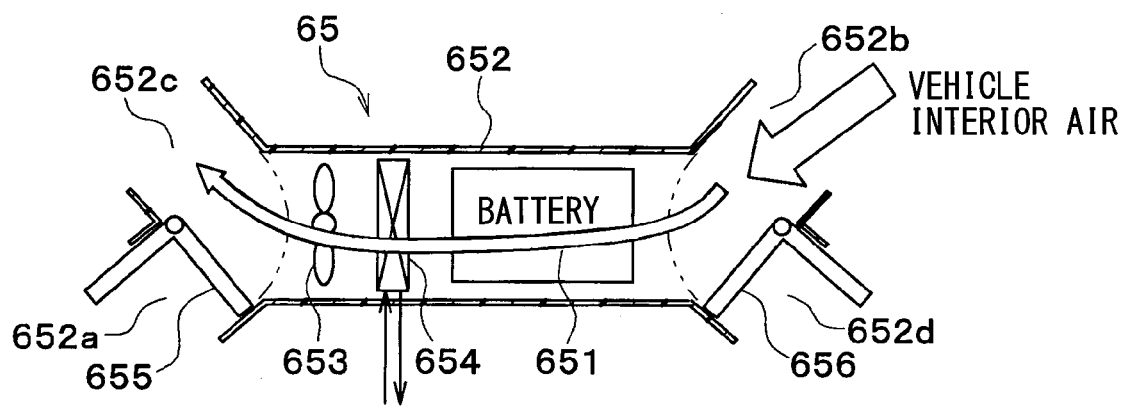
FIG. 35 is a cross-sectional view of the battery module, while a stored cold heat recovery mode in the fourth embodiment.

As shown in FIG. 35, in the stored cold heat recovery mode, the first air path switching door 655 closes the inside air introduction port 652a and opens the air discharge port 652c, while the second air path switching door 656 opens the inside air introduction port 652b and closes the air discharge port 652d. Contrary to the heat storage mode and the cold storage mode shown in FIG. 34, the blower 653 blows the air from the other inside air introduction port 652b to one inside air introduction port 652a.

Thus, the inside air introduced from the inside air introduction port 652a flows through the battery 651 and the battery heat exchanger 654 in that order, and is then discharged from the air discharge port 652c.

At this time, when the hot heat is stored in the battery 651, the battery heat exchanger 654 allows the coolant cooled by the coolant-cooling heat exchanger 30 to circulate therethrough. Thus, the inside air heated by the battery 651 flows through the battery heat exchanger 654, so that the hot heat stored in the battery 651 can be recovered in the coolant.

On the other hand, when the cold heat is stored in the battery 651, the battery heat exchanger 654 allows the circulation of the coolant heated by at least one of the coolant-heating heat exchanger 31 and the inverter module 46. Thus, the inside air cooled by the battery 651 flows through the battery heat exchanger 654, so that the cold heat stored in the battery 651 can be recovered in the coolant.

This embodiment can also obtain the same operation and effects as those of the second embodiment described above.

(Fifth Embodiment)

In the above-mentioned fourth embodiment, the battery module 65 includes the two inside air introduction ports 652a and 652b, the two air discharge ports 652c and 652d, and the two air path switching doors 655 and 656. However, as shown in FIG. 36, in a fifth embodiment, a battery module 68 includes one inside air introduction port 682a and one air discharge port 682b without having an air path switching door.

A casing 682 of the battery module 68 is provided with an air passage 682c through which the air blown from a blower 683 flows. The inside air introduction port 682a for introducing inside air is provided in the casing 682.

A battery 681 is disposed at the substantially center of the inside of the casing 682. The inside air introduction port 682a is disposed on the one end (left end shown in FIG. 36) of the casing 682. The air discharge port 682b for discharging air having flown through the air passage 682c is provided on the other end of the casing 682 (right end shown in FIG. 36).

Figure 36:
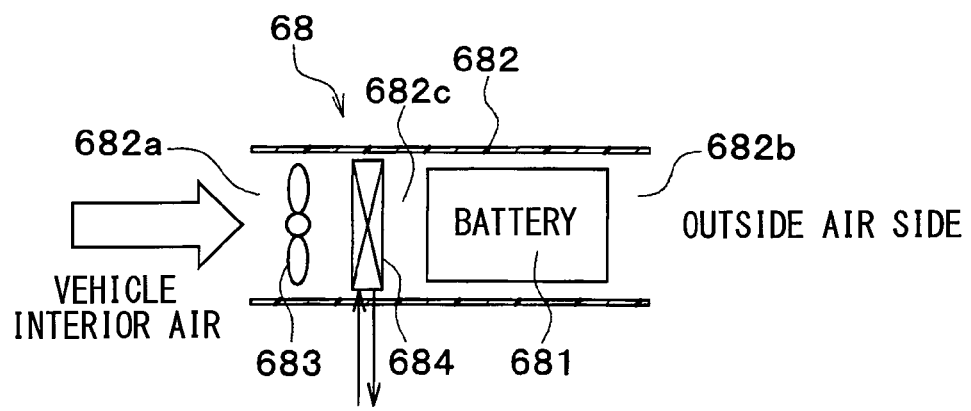
FIG. 36 is a cross-sectional view of a battery module according to a fifth embodiment of the invention.

The blower 683 is disposed close to the inside air introduction port 682a or the air discharge port 682b (on the left end, that is, on the inside air introduction port 682a side as shown in FIG. 36) rather than the battery 681 in the casing 682. The blower 683 blows the inside air introduced from the inside air introduction port 682a, toward the air discharge port 682b.

An air passage (not shown) through which air flows is formed in the battery 681. The battery 681 is cooled or heated by exchanging heat with the air passing through the battery. The air passage inside the battery 681 extends from one inside air introduction port 652a side to the other air discharge port 682b side.

A battery heat exchanger 684 is disposed between the battery 681 and the blower 683 inside the casing 682. The battery heat exchanger 684 exchanges heat between the air and the coolant.

With the above structure, once the first switching valve 24 and the second switching valve 47 are switched to allow the coolant cooled by the coolant-cooling heat exchanger 30 to circulate through the battery heat exchanger 654, the hot heat can be transferred to the coolant from the vehicle interior air to be discharged to the outside air.

Once the first switching valve 24 and the second switching valve 47 are switched to allow the coolant heated by at least one of the coolant-heating heat exchanger 31 and the inverter module 46 to circulate through the battery heat exchanger 684, the cold heat can be transferred to the heat medium from the vehicle interior air to be discharged to the outside air.

That is, in this embodiment, when the hot heat is transferred from the air to the coolant, the battery heat exchanger 684 and the coolant-cooling heat exchanger 30 are included in one of the first and second circulation circuits. When the cold heat is transferred from the air to the coolant, the battery heat exchanger 684 and the heat exchanger 31 for the coolant cooling are included in one of the first and second circulation circuits.

Thus, the hot heat and the cold heat can be recovered from the air which is to be discharged from the vehicle interior to the outside of the vehicle.

When the temperature of the battery 681 is equal to or less than a predetermined value (for example, 0° C. or less), the first switching valve 24 and the second switching valve 47 can be switched to form the following two circulation circuits. As a result, the battery 601 whose temperature is cooled to the predetermined value or less can be heated.

That is, there is provided a circulation circuit for allowing the coolant to circulate among the coolant-cooling heat exchanger 30, the device to be heat-exchanged among the devices to be heat-exchanged (inverter module 46 in this embodiment) other than the battery heat exchanger 684, and one of the first and second bypass flow paths 12 and 13 or flow path 11 for the radiator. Further, there is provided another circulation circuit for allowing the coolant to circulate among the battery heat exchanger 684, the coolant-heating heat exchanger 31, and the other one of the first and second bypass flow paths 12 and 13. As a result, the formation of such circulation circuits can heat the battery 601 whose temperature is cooled to the predetermined value or less.

(Sixth Embodiment)

Figure 37:
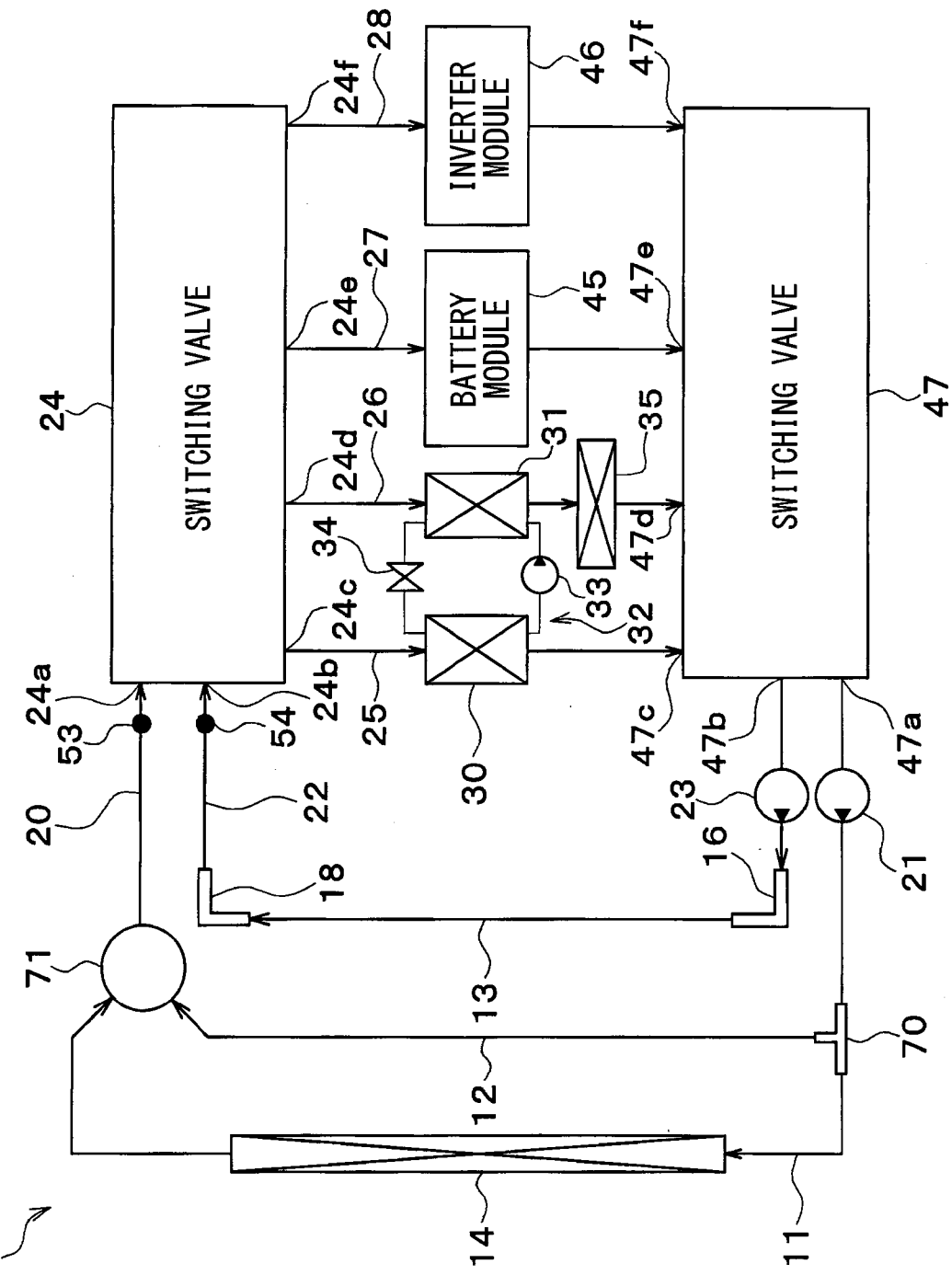
FIG. 37 is an entire configuration diagram of a vehicle thermal management system according to a sixth embodiment of the invention.

Although in each of the above embodiments the first pump 21 and the second pump 23 are disposed on the upstream side of the first switching valve 24, as shown in FIG. 37, the first pump 21 and the second pump 23 may be disposed on the downstream side of the second switching valve 47.

In each of the above embodiments, the three-way valve 15 is disposed on the upstream side of the radiator flow path 11 and the first bypass flow path 12, and the merging flow path 17 is disposed on the downstream side of the radiator flow path 11 and the first bypass flow path 12. Alternatively, as shown in FIG. 37, a branch flow path 70 may be disposed on the upstream side of the radiator flow path 11 and the first bypass flow path 12, and a three-way valve 71 may be disposed on the downstream side of the radiator flow path 11 and the first bypass flow path 12.

The branch flow path 70, the first communication flow path 16, the three-way valve 71, and the second communication flow path 18 constitute a first circulation portion for allowing the coolants for two systems to circulate through the radiator flow path 11, the first bypass flow path 12, and the second bypass flow path 13 (first flow path group).

(Seventh Embodiment)

In each of the above embodiments, the high-pressure side heat exchanger of the refrigeration cycle 32 is formed of the coolant-heating heat exchanger 31 that cools the high-pressure refrigerant with the coolant. However, in a seventh embodiment as shown in FIG. 38, a high-pressure side heat exchanger of the refrigeration cycle 32 is formed of an interior condenser 75 and an exterior condenser 76 that cool the high-pressure refrigerant with the air.

The interior condenser 75 is a heat exchanger for heating that exchanges heat between the air to be blown into the vehicle interior and the high-temperature refrigerant discharged from the compressor 33, thereby heating the air. Although not shown, the interior condenser 75 is disposed on the downstream side of the air flow of the evaporator 37 of the refrigeration cycle 32 within a casing of the interior air conditioning unit.

The exterior condenser 76 exchanges heat between the outside air and the high-pressure refrigerant of the refrigeration cycle 32 to cool the high-pressure refrigerant. A pressure reducing valve 77 for reducing the pressure of the refrigerant flowing into the exterior condenser 76 is disposed between the interior condenser 75 and the exterior condenser 76 in the refrigeration cycle 32.

Figure 38:
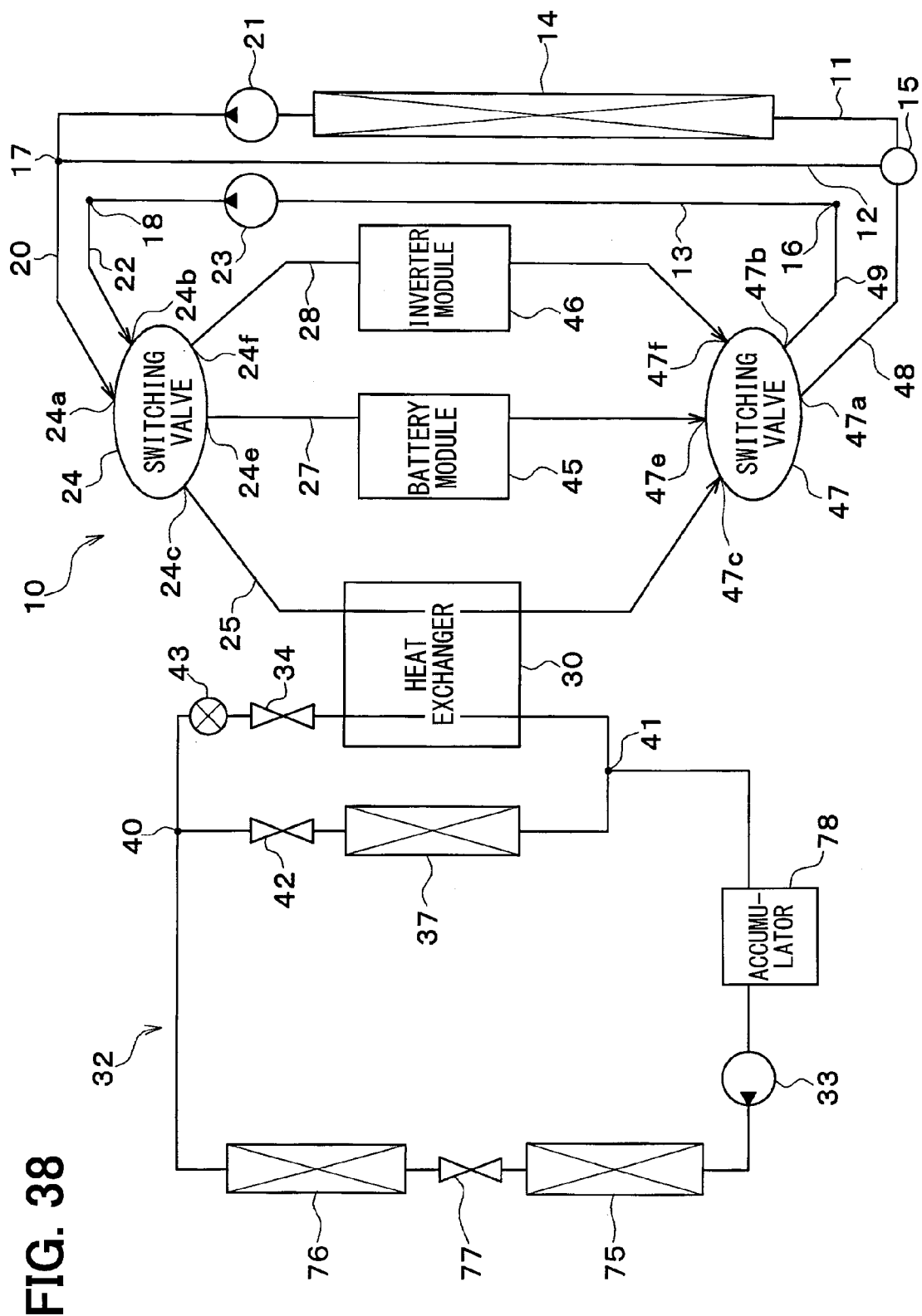
FIG. 38 is an entire configuration diagram of a vehicle thermal management system according to a seventh embodiment of the invention.

In an example shown in FIG. 38, an accumulator 78 is connected to between the evaporator 37 and the compressor 33 in the refrigeration cycle 32. The accumulator 78 is adapted to separate the refrigerant having flowed from the evaporator 37 into gas and liquid phases to store the excessive liquid-phase refrigerant therein.

(Eighth Embodiment)

Figure 39:
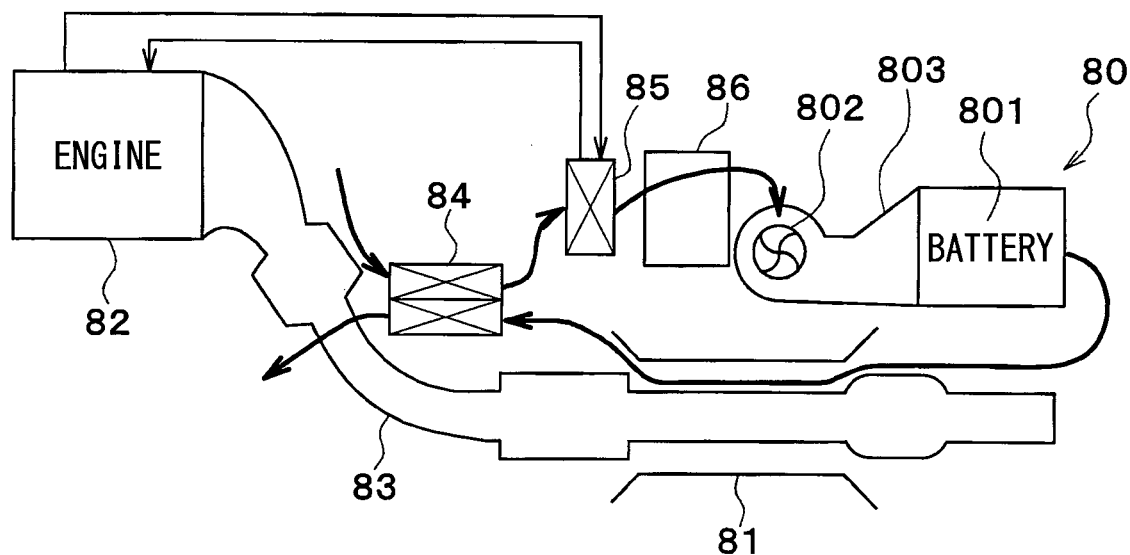
FIG. 39 is a configuration diagram showing a main part of a vehicle thermal management system according to an eighth embodiment of the invention.

Although in the above second to fifth embodiments, the heat held in the air discharged from the vehicle interior to the outside of the vehicle is recovered, in an eighth embodiment as shown in FIG. 39, heat held in exhaust gas from the engine is also recovered.

A battery module 80 includes an air-cooled battery 801, a blower 802, and a casing 803.

An air passage (not shown) through which air flows is formed in the battery 801. The blower 802 blows air (inside air) in the vehicle interior toward the battery 801. The casing 803 forms an air passage through which air flows. The battery 801 and the blower 802 are disposed in the air passage of the casing 803.

An air guide path 81 is disposed on the downstream side of the air flow of the casing 803. The air guide path 81 is connected to an exhaust pipe 83 through which the exhaust gas of the engine 82 flows, and the air having passed through the battery 801 flows through the air guide path 81, so that the air is heated with heat held by the exhaust gas.

A sensible heat recovery unit 84 is disposed on the downstream side of the air flow of the air guide path 81. The sensible heat recovery unit 84 is an air-air heat exchanger that exchanges heat between the air (inside air) having passed through the air guide path 81 and the air (outside air) introduced from the outside of the vehicle compartment. The inside air (air having passed through the battery 801 and the air guide path 81) having passed through the sensible heat recovery unit 84 is discharged to the outside of the vehicle compartment. The outside air having passed through the sensible heat recovery unit 84 passes through the heater core 85. The heater core 85 exchanges heat between the engine coolant and the outside air having passed through the sensible heat recovery unit 84 to thereby heat the outside air having passed through the sensible heat recovery unit 84. The outside air heated by the heater core 85 is blown into a vehicle compartment 86.

With this arrangement, the heat discarded in the ventilation can be recovered to improve the heating capability, while reducing the power consumption for heating the vehicle interior. The exhaust heat can also be covered to further improve the heating capability, while reducing the power consumption for heating the vehicle interior.

Figure 40:
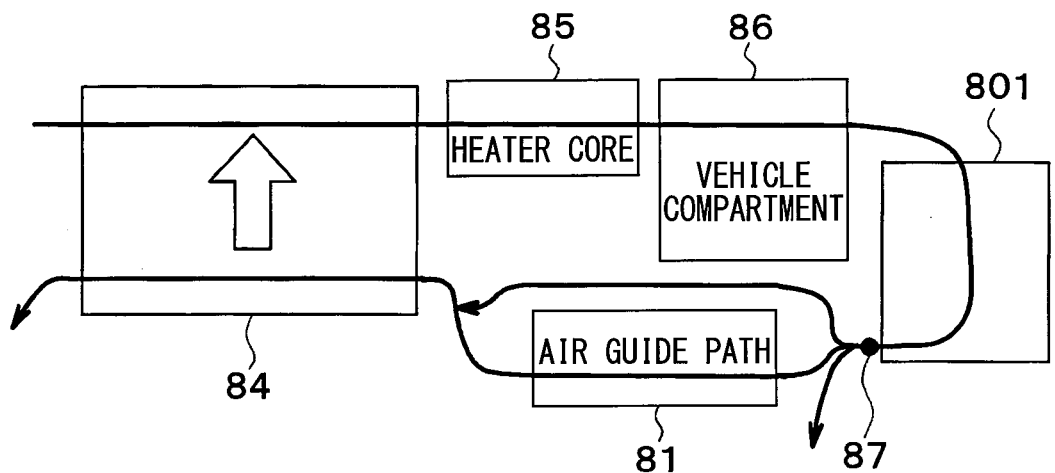
FIG. 40 is a diagram for explaining an operation of the vehicle thermal management system in the eighth embodiment.

As shown in FIG. 40, a temperature sensor 87 is provided for detecting the temperature of air having passed through the battery 801. According to the temperature of air detected by the temperature sensor 87, the air having passed through the battery 801 may be switched among the state of flowing through the air guide path 81, the state of bypassing the air guide path 81 to flow to the sensible heat recovery unit 84, and the state of bypassing the air guide path 81 to be discharged to the outside of the vehicle.

In this way, the switching can be performed between an exhaust heat recovery mode of recovering exhaust heat, and an exhaust heat non-recovery mode of not recovering exhaust heat according to the temperature of the air having passed through the battery 801. For example, in summer, the switching is performed to the exhaust heat non-recovery mode, in which the air having passed through the battery 801 may bypass the air guide path 81 to flow to the sensible heat recovery unit 84, or in which the air having passed through the battery 801 may bypass the air guide path 81 to be discharged to the outside of the vehicle.

(Ninth Embodiment)

In the above-mentioned embodiment, the coolant (heat medium) for use is a liquid containing at least ethylene glycol or poly(dimethylsiloxane). However, nano-fluids may be used as the coolant.

The nano-fluid is a fluid into which nanoparticles with a particle diameter of the order of nanometer are mixed. Mixing of the nanoparticles into the coolant can have the following effects, in addition to the same effect of decreasing a freezing point as that in use of a coolant using ethylene glycol (so-called antifreezing solution).

That is, the nanoparticles can have the effects which include improving a thermal conductivity in a specific temperature range, increasing a heat capacity of the coolant, preventing corrosion of a metal pipe or degradation of a rubber pipe, and enhancing a fluidity of the coolant at an ultralow temperature.

Such effects vary depending on the composition, shape, and compounding ratio of a nanoparticle, and an additive.

In this way, the nanoparticles can improve the thermal conductivity, whereby even a small amount of the coolant with the nanoparticles can obtain the same cooling efficiency as that of the coolant to which no nanoparticle is added.

Further, the thermal capacity of the coolant can be increased to increase the amount of the cold heat stored in the coolant itself (stored cold heat due to sensible heat).

In order to obtain the sufficient thermal conductivity, an aspect ratio of the nanoparticle is preferably 50 or more. The term "aspect ratio" as used herein means a shape index indicative of a ratio between the longitudinal and lateral dimensions of the nanoparticle.

Figure 41:
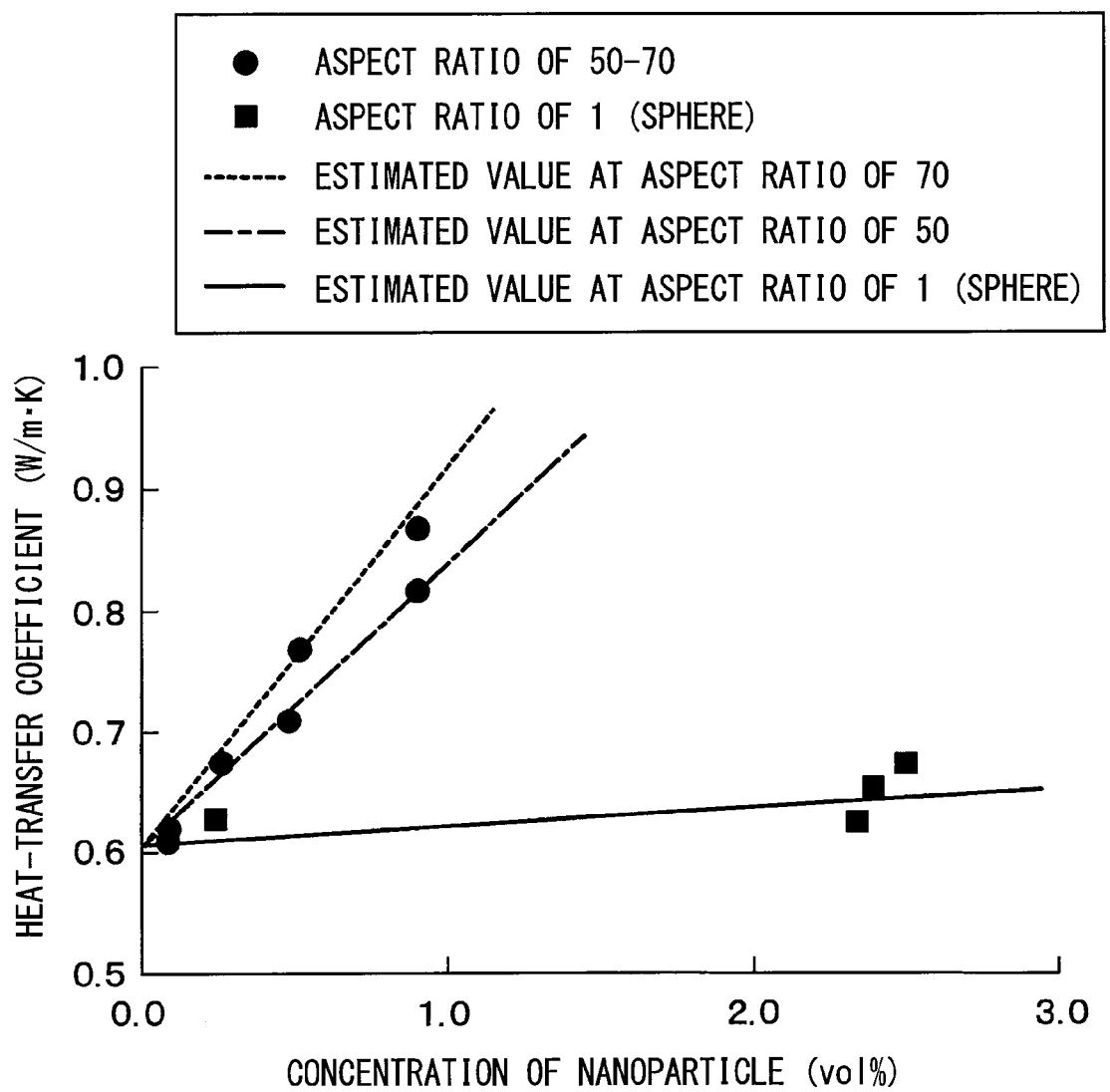
FIG. 41 is a graph showing the relationship between an aspect ratio of nano-fluid and a thermal conductivity thereof according to a ninth embodiment of the invention.

That is, as shown in the result of measurements of FIG. 41, a nanoparticle having an aspect ratio of about 50 to 70 can obtain a high thermal conductivity as compared to a nanoparticle having an aspect ratio of 1 (sphere). A heat-transfer coefficient between the coolant and another fluid is proportional to a two-thirds power of the thermal conductivity. The nanoparticle having the aspect ratio of about 50 to 70 can have the higher heat-transfer coefficient than the nanoparticle having the aspect ratio of 1 (sphere).

In order to improve the thermal conductivity of the coolant, the first pump 21 and the second pump 23 can be reduced in size. The reason for the above description will be given below. The heat-transfer coefficient inside the heat exchanger is proportional to a 0.8th power of the flow rate. This feature is well known as an experimental equation of the heat-transfer coefficient of a pipe turbulence (Colburn's equation, Dittus-Boelter equation).

By improving the thermal conductivity of the coolant, substantially the same heat-transfer coefficient as that in the related art can be ensured even at a low level of flow speed (that is, flow rate). Thus, even the use of the pump with the small discharge flow rate can ensure substantially the same heat-transfer coefficient as that in the related art.

The pump with the small discharge flow rate can be used to suppress the power consumption of the pump to a lower level. As a result, a heat dissipation amount of the power control element of the pump can also be reduced, thereby reducing the size of a heat sink of the pump, and further reducing the size of the body of the pump.

Nanoparticles for use can include any one of Au, Ag, Cu, and C. Specifically, as atoms of the nanoparticles, an Au nanoparticle, a Ag nanowire, a CNT (carbon nanotube), a graphene, a graphite core shell type nano particle (grain body having a structure surrounding the above-mentioned atom, such as a carbon nanotube), and an Au nanoparticle-containing CNT, can be used.

Figure 42:
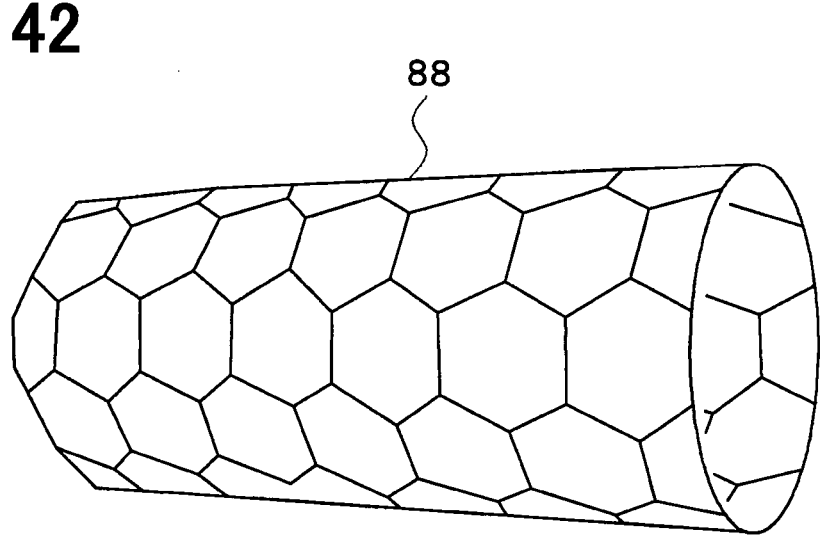
FIG. 42 is a perspective view showing a carbon nanotube mixed in a coolant in the ninth embodiment.
Figure 43:
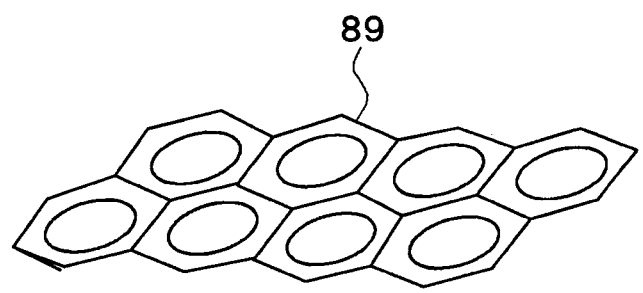
FIG. 43 is a perspective view showing a graphene mixed in a coolant in the ninth embodiment.

As shown in FIG. 42, a carbon nanotube 88 is a tube-shaped carbon atom aggregate. As shown in FIG. 43, a graphene 89 is a sheet-shaped carbon atom aggregate composed of carbon atoms bonded in the form of a hexagonal mesh. The graphene has the same thickness as one carbon atom. The graphite is made of a crystal composed of an aggregate of graphene layers shown in FIG. 43.

(Tenth Embodiment)

Figure 44:
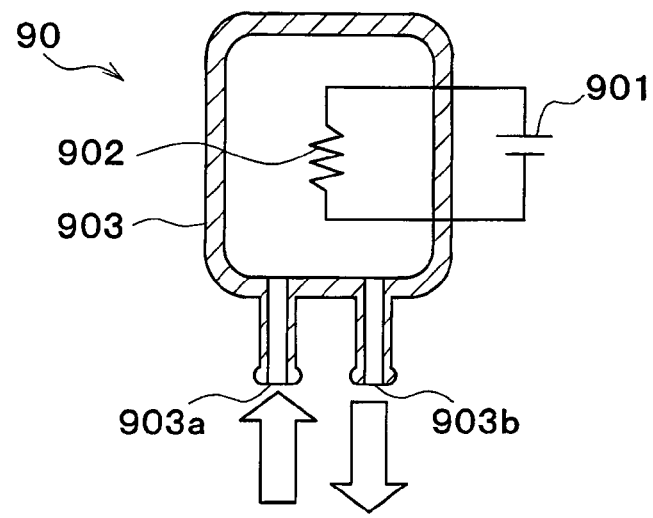
FIG. 44 is a cross-sectional view of a tank incorporating therein an electric heater according to a tenth embodiment of the invention.
Figure 45:
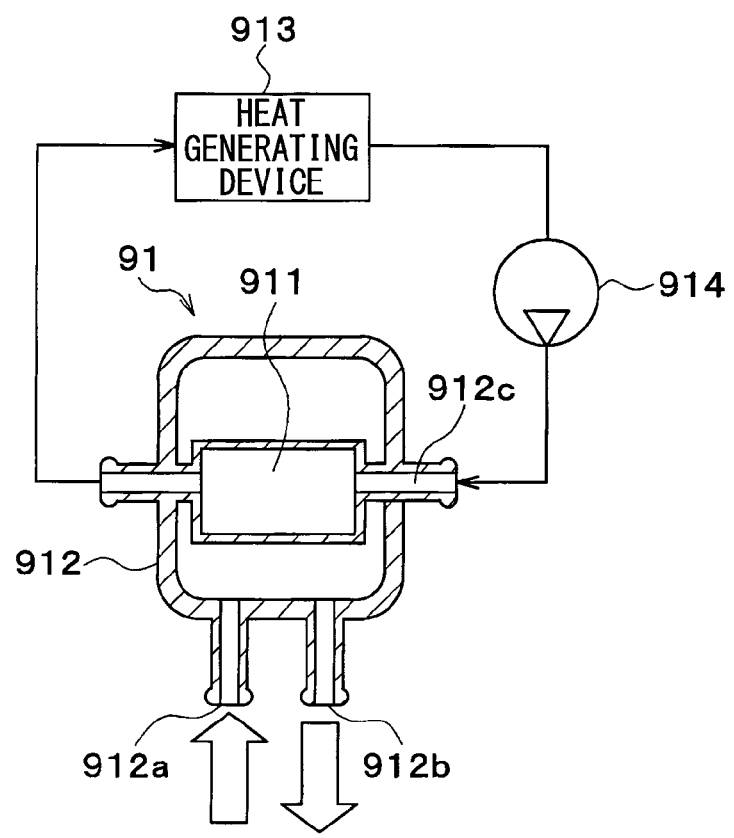
FIG. 45 is a cross-sectional view of a tank incorporating therein a heat exchanger in the tenth embodiment.

In the above embodiments, the battery module 45 and the inverter module 46 are used as the heat storage member. Alternatively, for example, a tank 90 with a built-in electric heater shown in FIG. 44, and a tank 91 with a built-in heat exchanger shown in FIG. 45 may be used as the heat storage member.

The tank 90 with the built-in electric heater includes an electric heater 902 connected to a battery 901, and a tank 903 for accommodating therein the electric heater 902. The tank 903 is provided with an inlet 903*a* and an outlet 903*b* for the coolant.

The tank 91 with the built-in heat exchanger includes a coolant-coolant heat exchanger 911 for exchanging heat between the coolants for two systems, and a tank 912 for accommodating therein the coolant-coolant heat exchanger 911. The tank 903 is provided with an inlet 912*a* and an outlet 912*b* for the coolant for one system.

The tank 903 is provided with a flow path 912*c* for circulation of the coolant for the other system through the coolant-coolant heat exchanger 911. The flow path 912*c* is disposed in a coolant circulation circuit including a heat generating device 913, such as an inverter or motor, and a pump 914 for circulation of the coolant for the other system.

Various modules having a structure with a heat generating member accommodated in a heat-retention tank can be used as the heat storage member.

(Eleventh Embodiment)

Figure 46:
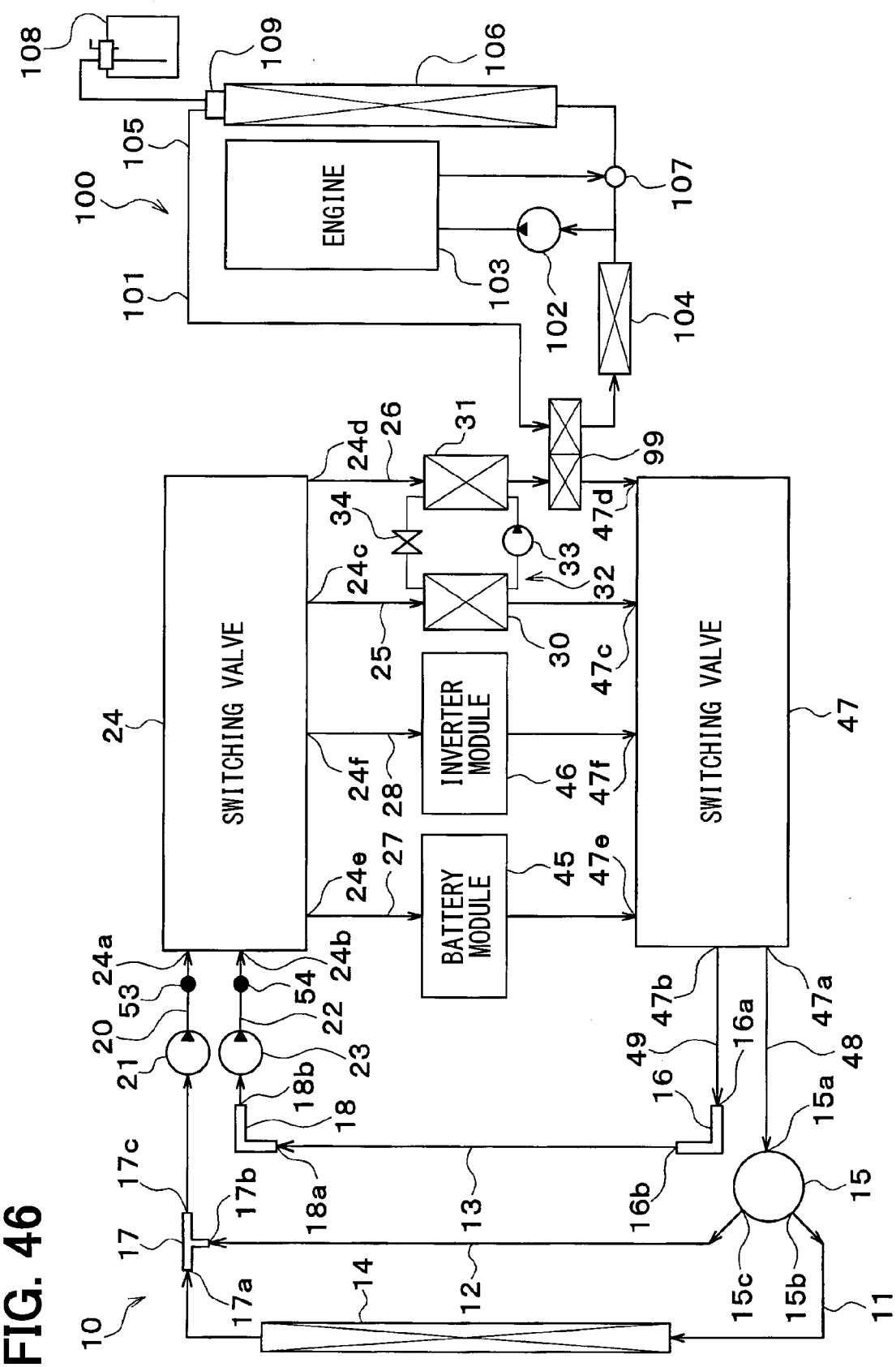
FIG. 46 is an entire configuration diagram of a vehicle thermal management system according to an eleventh embodiment of the invention.

In the first embodiment, the heater core 35 is disposed on the downstream side of the coolant-heating heat exchanger 31 in the second parallel flow path 26. On the other hand, in an eleventh embodiment, as shown in FIG. 46, a coolant-coolant heat exchanger 99 is disposed instead of the heater core 35.

The coolant-coolant heat exchanger 99 is a heat exchanger (heat medium-heat medium heat exchanger) that exchanges heat between an engine coolant (second heat medium) circulating through an engine cooling circuit 100 (second heat medium circulation circuit), and the coolant circulating by the first pump 21 or second pump 23. The coolant-coolant heat exchanger 99 is a coolant circulation device (heat medium circulation device) through which the coolant circulates.

The engine cooling circuit 100 includes a circulation flow path 101 for allowing the engine coolant to circulate therethrough. In this embodiment, a liquid containing at least ethylene glycol, dimethylpolysiloxane, or a nano-fluid, or an antifreezing solution is used as the engine coolant.

In the circulation flow path 101, a pump 102 for the engine, an engine 103, the coolant-coolant heat exchanger 99, and a heater core 104 are arranged in series in that order.

The pump 102 for the engine is an electric pump for sucking and discharging the engine coolant. The heater core 104 is a heat exchanger for heating that exchanges heat between air to be blown into the vehicle interior and the engine coolant, thereby heating the air into the vehicle interior.

A part on a coolant outlet side of the engine 103 in the circulation flow path 101 is connected to one end of a radiator flow path 105 for the engine. The other end of the radiator flow path 105 for the engine is connected to a part on a suction side of the pump 102 for the engine in the circulation flow path 101.

The radiator flow path 105 for the engine is provided with a radiator 106 for the engine. The radiator 106 for the engine is a heat dissipation device for the engine (heat medium-outside air heat exchanger for the engine) that exchanges heat between the coolant and the air outside the vehicle compartment (hereinafter referred to as an "outside air") to dissipate the heat of the coolant into the outside air.

The outside air is blown to the radiator 106 for the engine by an exterior blower (not shown). The radiator 106 for the engine is disposed at the forefront part of the vehicle on the downstream side in the outside air flow direction with respect to the radiator 14.

A thermostat 107 is disposed in the connection portion between the other end of the radiator flow path 105 for the engine and the circulation flow path 101. The thermostat 107 is a coolant-temperature responsive valve constructed of a mechanical mechanism that is designed to open and close a coolant flow path by displacing a valve body using a thermo wax (temperature sensing member) whose volume changes in response to the temperature.

Specifically, when the temperature of coolant is below a predetermined temperature (for example, of less than 80° C.), the thermostat 107 is adapted to close the radiator flow path 105 for the engine. When the temperature of coolant is above the predetermined temperature (for example, of 80° C. or more), the thermostat 107 is adapted to open the radiator flow path 105 for the engine.

The radiator flow path 105 for the engine is connected to a closed-type reserve tank 108. The reserve tank 108 serves as a storage portion for storing therein the engine coolant, and also as a pressure holding portion for holding a pressure of the engine coolant in an appropriate range.

The reserve tank 108 is sealed to effectively hold the pressure of the engine coolant in a predetermined value or less. The reserve tank 108 separates air bubbles mixed in the engine coolant into gas and liquid phases. The reserve tank 108 holds the pressure of the engine coolant at the appropriate pressure against abnormal increase and decrease in pressure due to the expansion and contraction caused by the change in temperature of the engine coolant. Because excessive engine coolant is stored in the reserve tank 108, it can suppress the decrease in liquid amount of the engine coolant circulating through the engine cooling circuit 100.

A pressurizing valve 109 is disposed in a connection portion between the reserve tank 108 and the radiator flow path 105 for the engine. The pressurizing valve 109 is closed when the internal pressure of the radiator flow path 105 for the engine is lower than a preset pressure which is larger than an atmospheric pressure, and is open when the internal pressure of the radiator flow path 105 for the engine is equal to or higher than the preset pressure. Accordingly, when the internal pressure of the engine coolant circuit 100 is equal to or higher than the preset pressure, the engine coolant of the engine cooling circuit 100 is discharged to the reserve tank 108.

In this embodiment, the coolant-coolant heat exchanger 99 is provided for exchanging heat between the engine coolant and the coolant circulating by the first pump 21 or the second pump 23, so that the heat can be exchanged between the engine 103 and the devices 45 and 46 to be heat-exchanged via the coolant-coolant heat exchanger 99.

Specifically, the first switching valve 24 and the second switching valve 47 can implement the operation mode of allowing the coolant on a side of one of the first and second pumps 21 and 23 to circulate through the coolant-coolant heat exchanger 99 and the devices 45 and 46 to be heat-exchanged. Thus, the waste heat from the engine 103 can be used to heat the devices 45 and 46 to be heat-exchanged, or the waste heat from the devices 45 and 46 to be heat-exchanged can be used to heat (warm-up) the engine 103.

In this embodiment, the first and second switching valves 24 and 47 can implement the operation mode in which the coolant on the side of one of the first and second pumps 21 and 23 circulates through the coolant-cooling heat exchanger 30 and the radiator 14, and the coolant on a side of the other pump of the first and second pumps 21 and 23 circulates through the coolant-heating heat exchanger 31 and the coolant-coolant heat exchanger 99.

Thus, the heat of the outside air is absorbed in the coolant at the radiator 14, and the heat of the coolant is dissipated by the coolant-coolant heat exchanger 99 into the engine coolant, which can heat (warm-up) the engine 103 by pumping up the heat of the outside air.

In this embodiment, the first switching valve 24 and the second switching valve 47 can implement the operation mode in which the coolant on the side of one of the first and second pumps 21 and 23 circulates through the radiator 14 and the coolant-coolant heat exchanger 99.

Thus, the heat of the engine coolant can be supplied to the radiator 14 via the coolant. The waste heat from the engine 103 can be used to melt the frost formed on the radiator 14, or the radiator 14 can be used to dissipate the waste heat from the engine 103 into the outside air.

In this embodiment, the first switching valve 24 and the second switching valve 47 can implement the operation mode in which the coolant on the side of one of the first and second pumps 21 and 23 circulates through the coolant-heating heat exchanger 31, the coolant-coolant heat exchanger 99, and the radiator 14.

Thus, the heat having dissipated from the high-pressure side refrigerant into the coolant at the coolant-heating heat exchanger 31 can be further dissipated into the outside air at both the radiator 14 and the radiator 106 for the engine.

In this embodiment, the waste heat recovery heating mode (see FIGS. 14 and 15) can be implemented as described in the first embodiment. When heating the vehicle interior with the air heated by the heater core 104 in the waste heat recovery heating mode, the coolant-coolant heat exchanger 99, one bypass flow path 13 of the first and second bypass flow paths 12 and 13, and one of the devices 45 and 46 to be heat-exchanged in which the temperature of the coolant at the coolant outlet is the predetermined value or higher are included in one of the first and second circulation circuits. Further, one flow path of the first flow path groups 11, 12, and 13 other than one bypass flow path 13, and the other one of the devices 45 and 46 to be heat-exchanged in which the temperature of the coolant at the coolant outlet is lower than the predetermined value are included in the other one of the first and second circulation circuits.

In this way, the coolant having a relatively high temperature of the coolants having flowed from the devices 45 and 46 to be heat-exchanged is allowed to circulate through the coolant-coolant heat exchanger 99. On the other hand, the coolant having a relatively low temperature among the coolants flowing from the devices 45 and 46 to be heat-exchanged does not circulate through the coolant-coolant heat exchanger 99. When performing heating using the waste heat from the devices 45 and 46 to be heat-exchanged, the blown air temperature of the heater core 104 can be set as high as possible.

In this embodiment, the outside-air heat absorption heat pump heating mode (see FIG. 16) can be implemented as described in the first embodiment. In the outside-air heat absorption heat pump heating mode, when the amount of waste heat recovered from the devices 45 and 46 to be heat-exchanged is not sufficient for the heating capacity, the coolant-heating heat exchanger 31, the coolant-coolant heat exchanger 99, and one bypass flow path 13 of the first and second bypass flow paths 12 and 13 are included in one of the first and second circulation circuits. On the other hand, the coolant-cooling heat exchanger 30 and the radiator flow path 11 are included in the other one of the first and second circulation circuits. Thus, the vehicle interior can be heated by the heat pump operation which involves absorbing heat from the outside air.

In contrast, when the amount of waste heat recovered by the devices 45 and 46 to be heat-exchanged is sufficient for the heating capacity, the waste heat recovery heating mode shown in FIG. 15 is performed. In this case, the coolant-heating heat exchanger 31, the coolant-coolant heat exchanger 99, and one bypass flow path 13 are included in one circulation circuit. At least one device 46 to be heat-exchanged of the devices 45 and 46 to be heat-exchanged, the coolant-cooling heat exchanger 30, and the other bypass flow path 12 are included in the other one of the first and second circulation circuits.

Thus, the vehicle interior can be heated using the waste heat from the devices 45 and 46 to be heat-exchanged. Since the coolant does not flow through the radiator flow path 11 and the radiator 14, the coolant does not absorb heat from the outside in the radiator 14.

The above heating mode can drastically increase the temperature of the coolant flowing into the coolant-cooling heat exchanger 30, and can also improve the efficiency of evaporating the refrigerant on the low-pressure side of the refrigeration cycle 32, as compared to the outside-air heat absorption heat pump heating mode in which the radiator 14 absorbs heat from the outside air.

When the total of the amount of heat dissipated from the devices 45 and 46 to be heat-exchanged into the coolant and the power of the compressor 33 of the refrigeration cycle 32 is estimated not to exceed the heat amount required for heating of the vehicle interior, it can be determined that the amount of the waste heat recovered from the device to be heat-exchanged is not sufficient for the heating capacity. When the total of the amount of heat dissipated from the devices 45 and 46 to be heat-exchanged into the coolant and the power of the compressor 33 of the refrigeration cycle 32 is estimated to exceed the heat amount required for heating of the vehicle interior, it can be determined that the amount of the waste heat recovered from the device to be heat-exchanged is sufficient for the heating capacity.

When the total of the amount of heat generated by the devices 45 and 46 to be heat-exchanged and the amount of heat dissipated by the coolant-heating heat exchanger 31 into the coolant is estimated not to exceed the heat amount required for heating of the vehicle interior, it can be determined that the amount of the waste heat recovered from the device to be heat-exchanged is not sufficient for the heating capacity. When the total of the amount of heat generated by the devices 45 and 46 to be heat-exchanged and the amount of heat dissipated by the coolant-heating heat exchanger 31 into the coolant is estimated to exceed the heat amount required for heating of the vehicle interior, it can be determined that the amount of the waste heat recovered from the device to be heat-exchanged is sufficient to have an adequate heating capacity.

(Twelfth Embodiment)

Figure 47:
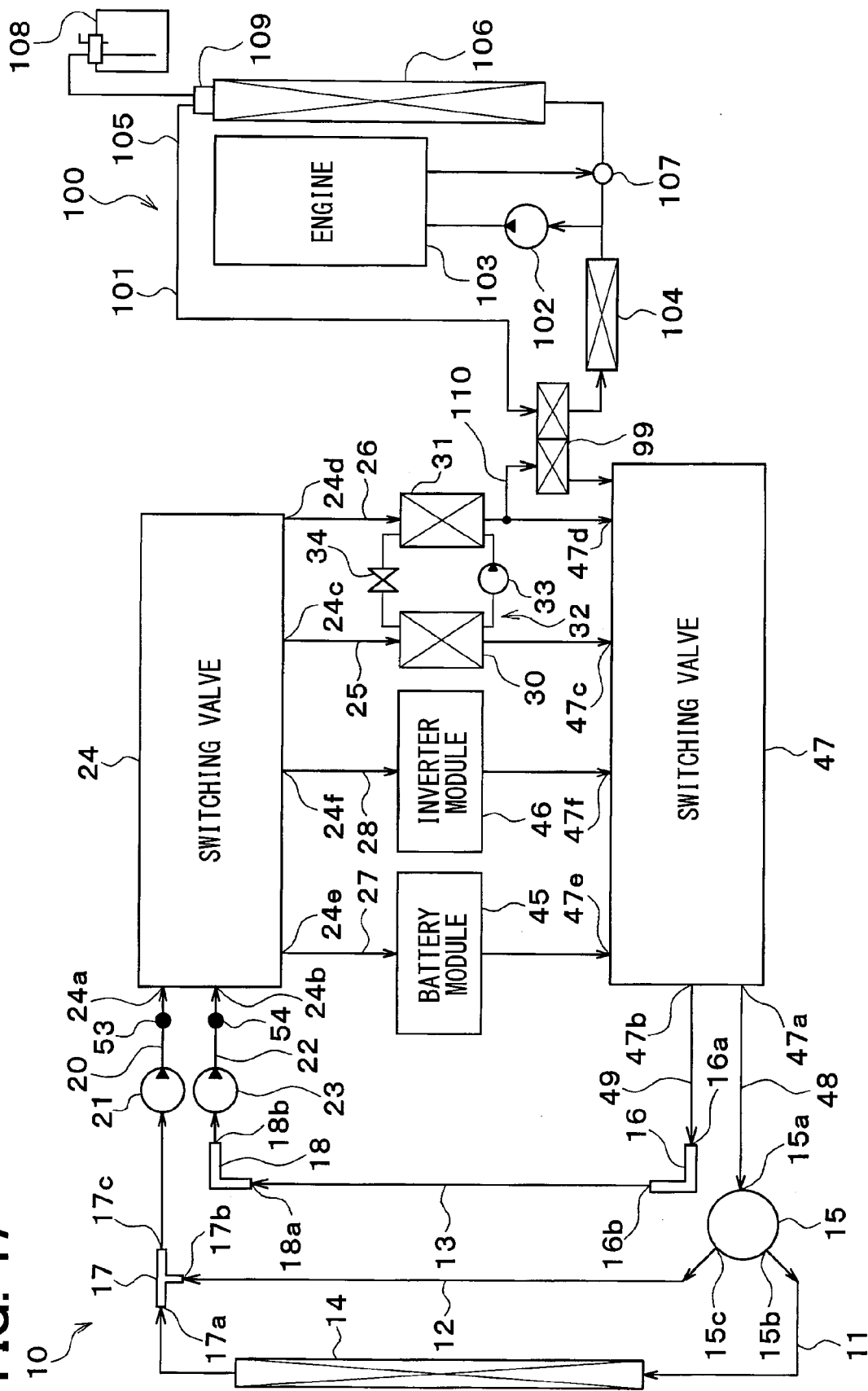
FIG. 47 is an entire configuration diagram of a vehicle thermal management system according to a twelfth embodiment of the invention.

In the eleventh embodiment, the coolant-coolant heat exchanger 99 is disposed on the downstream side of the coolant-heating heat exchanger 31 in the second parallel flow path 26. On the other hand, in a twelfth embodiment, as shown in FIG. 47, a coolant-coolant heat exchanger 99 is disposed in the flow path 110 for the coolant-coolant heat exchanger.

The flow path 110 for the coolant-coolant heat exchanger has its one end connected to between the coolant-heating heat exchanger 31 and the second switching valve 47 in the second parallel flow path 26, and its other end connected to the second switching valve 47. In other words, the second parallel flow path 26 is connected to the end of the flow path 110 for the coolant-coolant heat exchanger.

In this embodiment, the second switching valve 47 can open and close the flow path 110 for the coolant-coolant heat exchanger. Thus, the switching can be performed between the state of flowing the coolant through the coolant-coolant heat exchanger 99 and the state of not flowing the coolant through the coolant-coolant heat exchanger 99.

In this embodiment, the coolant inlet side of the coolant-coolant heat exchanger 99 is connected to between the coolant-heating heat exchanger 31 and the second switching valve 47, whereby the coolant circulating through the heat exchanger 31 for the coolant heating can flow through the coolant-coolant heat exchanger 99 without providing a port for the coolant-coolant heat exchanger 99 in the first switching valve 24. Thus, the structure of the first switching valve 24 can be simplified.

In this embodiment, the coolant outlet side of the coolant-coolant heat exchanger 99 is connected to the second switching valve 47. Thus, the second switching valve 47 can connect and disconnect the circulation of the heat medium with respect to the coolant-coolant heat exchanger 99, so that the circulation of the coolant through the coolant-heating heat exchanger 31 can be connected or disconnected with respect to the coolant-coolant heat exchanger 99.

(Other Embodiments)

The above-mentioned embodiments can be appropriately combined together. Various modifications and changes can be made to the above-mentioned embodiments, for example, in the following manner.

Various devices can be used as the device to be heat-exchanged. For example, a heat exchanger incorporated in a seat where a passenger sits and adapted to cool and heat the seat by coolant may be used as the device to be heat-exchanged. The number of devices to be heat-exchanged may be any number as long as the number is a plural number (two or more).

In each of the above-mentioned embodiments, the coolant may intermittently circulate through the device to be heat-exchanged to thereby control the heat exchanging capacity for the device to be heat-exchanged.

In the embodiments described above, the coolant-cooling heat exchanger 30 that cools the coolant by the low-pressure refrigerant of the refrigeration cycle 22 is used as the cooler for cooling the coolant. However, a Peltier element may be used to cool the coolant.

In each of the above-mentioned embodiments, the coolant is used as the heat medium. Alternatively, various kinds of media, such as oil, may be used as the heat medium.

The refrigeration cycle 32 of each of the above embodiments uses a fluorocarbon refrigerant as the refrigerant. However, the kind of the refrigerant is not limited thereto. For example, natural refrigerant, such as carbon dioxide, or hydrocarbon-based refrigerant may be used.

The refrigeration cycle 32 of each of the above embodiments forms a subcritical refrigeration cycle whose high-pressure side refrigerant pressure does not exceed a critical pressure of the refrigerant. Alternatively, the refrigeration cycle may form a supercritical refrigeration cycle whose high-pressure side refrigerant pressure exceeds the critical pressure of the refrigerant.

In each of the above-mentioned embodiments, the vehicle cooling system of the present disclosure is applied to the hybrid car by way of example. Alternatively, the present disclosure may be applied to an electric car which obtains a driving force for traveling from an electric motor for traveling without including an engine.

What is claimed is:

1. A thermal management system for a vehicle, comprising:
    a radiator exchanging heat between a heat transfer medium and outside air;
    a first flow path group including a radiator flow path in which the heat transfer medium flows and the radiator is disposed, and a first bypass flow path and a second bypass flow path that allow the heat transfer medium to bypass the radiator
    a cooler cooling the heat transfer medium;
    a heater heating the heat transfer medium;
    a heat transfer medium circulation device through which the heat transfer medium heated by the heater circulates;
    a plurality of devices to be heat-exchanged that exchanges heat with the heat transfer medium;
    a second flow path group including (i) a cooler flow path in which the heat transfer medium flows and the cooler is disposed, (ii) a heater flow path in which the heat transfer medium flows and the heater is disposed, and a plurality of device flow paths in which the heat transfer medium flows and the devices to be heat-exchanged are disposed;
    a first pump and a second pump, sucking and discharging the heat medium into two systems;
    a first circulation portion circulating heat transfer medium in the two systems, discharged from the first pump and the second pump, with respect to the first flow path group; and
    a second circulation portion circulating the heat transfer medium in the two systems, with respect to the second flow path group, wherein
    the heat transfer medium circulation device is disposed in the heater flow path, or the heater flow path is connected to an end of a flow path with the heat transfer medium circulation device disposed therein,
    the first circulation portion switches a flow of the heat transfer medium such that one of the heat transfer media for the two systems selectively circulates through the radiator flow path or the first bypass flow path,
    the second circulation portion switches a flow of the heat transfer medium such that the heat transfer media for the two systems selectively circulate with respect to the second flow path group, and
    the first circulation portion and the second circulation portion switch the flow of the heat transfer medium so as to form a first circulation circuit that allows the heat transfer medium to circulate between the second flow path group and the first pump, as well as a second circulation circuit that allows the heat transfer medium to circulate among the first flow path group, the second flow path group, and the second pump.

2. The thermal management system for a vehicle according to claim 1, wherein
    the heat transfer medium circulation device is a heating heat exchanger that exchanges heat between the heat transfer medium heated by the heater and air to be blown into a vehicle interior to heat the air.

3. The thermal management system for a vehicle according to claim 2, wherein
    when the vehicle interior is heated with the air heated by the heating heat exchanger, the first circulation portion and the second circulation portion switch the flow of the heat transfer medium, such that a device to be heat-exchanged among the devices to be heat-exchanged, in which a temperature of the heat transfer medium at a heat transfer medium outlet is a predetermined value or higher, the heating heat exchanger, and one bypass flow path of the first and second bypass flow paths are included in one circulation circuit of the first and second circulation circuits, and such that another device to be heat-exchanged among the devices to be heat-exchanged, in which a temperature of the heat transfer medium at a heat transfer medium outlet is less than the predetermined value, and one flow path of the first flow path group other than the one bypass flow path are included in the other circulation circuit of the first and second circulation circuits.

4. The thermal management system for a vehicle according to claim 2, wherein
the cooler is a low-pressure side heat exchanger of a refrigeration cycle, and
the heater is a high-pressure side heat exchanger of the refrigeration cycle, wherein
when a total of an amount of heat dissipation into the heat transfer medium from the devices to be heat-exchanged and a power of a compressor in the refrigeration cycle is estimated not to exceed a heat amount necessary for heating of the vehicle interior, the first circulation portion and the second circulation portion switch the flow of the heat transfer medium such that the heater, the heating heat exchanger, and one bypass flow path of the first and second bypass flow paths are included in one circulation circuit of the first and second circulation circuits, and such that the cooler and the radiator flow path are included in the other circulation circuit of the first and second circulation circuits, and
when the total is estimated to exceed the heat amount, the first circulation portion and the second circulation portion switch the flow of the heat transfer medium such that the heater, the heating heat exchanger, and the one bypass flow path are included in the one circulation circuit, and such that at least one of the devices to be heat-exchanged, the cooler, and the other bypass flow path of the first and second bypass flow paths are included in the other circulation circuit of the first and second circulation circuits.

5. The thermal management system for a vehicle according to claim 2, wherein
the cooler is a low-pressure side heat exchanger of a refrigeration cycle, and
the heater is a high-pressure side heat exchanger of the refrigeration cycle, wherein
when a total of an amount of heat generated by the devices to be heat-exchanged and an amount of heat dissipation into the heat transfer medium from the high-pressure side heat exchanger is estimated not to exceed a heat amount necessary for heating of the vehicle interior, the first circulation portion and the second circulation portion switch the flow of the heat medium such that the heater, the heating heat exchanger, and one bypass flow path of the first and second bypass flow paths are included in one circulation circuit of the first and second circulation circuits, and such that the cooler and the radiator flow path are included in the other circulation circuit of the first and second circulation circuits, and
when the total is estimated to exceed the heat amount, the first circulation portion and the second circulation portion switch the flow of the heat transfer medium such that the heater, the heating heat exchanger, and the one bypass flow path are included in the one circulation circuit, and such that at least one of the devices to be heat-exchanged, the cooler, and the other bypass flow path of the first and second bypass flow paths are included in the other circulation circuit of the first and second circulation circuits.

6. The thermal management system for a vehicle according to claim 1, further comprising:
a second heat transfer medium circulation circuit for circulation of a second heat transfer medium; and
a heating heat exchanger that exchanges heat between the second heat medium and air to be blown into a vehicle interior so as to heat the air, wherein
a heat transfer medium/heat transfer medium heat exchanger of the heat transfer medium circulation devices exchanges heat between the heat transfer medium heated by the heater and the second heat transfer medium.

7. The thermal management system for a vehicle according to claim 6, wherein
when the vehicle interior is heated with the air heated by the heating heat exchanger, the first circulation portion and the second circulation portion switch the flow of the heat transfer medium such that a device to be heat-exchanged among the devices to be heat-exchanged, in which a temperature of the heat medium at a heat transfer medium outlet is a predetermined value or higher, the heat transfer medium-heat transfer medium heat exchanger, and one bypass flow path of the first and second bypass flow paths are included in one circulation circuit of the first and second circulation circuits, and such that another device to be heat-exchanged among the devices to be heat-exchanged, in which a temperature of the heat transfer medium at a heat transfer medium outlet is less than the predetermined value, and one flow path of the first flow path group other than the one bypass flow path are included in the other circulation circuit of the first and second circulation circuits.

8. The thermal management system for a vehicle according to claim 6, wherein
the cooler is a low-pressure side heat exchanger of a refrigeration cycle, and
the heater is a high-pressure side heat exchanger of the refrigeration cycle,
when a total of an amount of heat dissipation into the heat transfer medium from the devices to be heat-exchanged and a power of a compressor in the refrigeration cycle is estimated not to exceed a heat amount necessary for heating of the vehicle interior, the first circulation portion and the second circulation portion switch the flow of the heat transfer medium such that the heater, the heat transfer medium-heat transfer medium heat exchanger, and one bypass flow path of the first and second bypass flow paths are included in one circulation circuit of the first and second circulation circuits, and such that the cooler and the radiator flow path are included in the other circulation circuit of the first and second circulation circuits, and
when the total is estimated to exceed the heat amount, the first circulation portion and the second circulation portion switch the flow of the heat transfer medium such that the heater, the heat transfer medium-heat transfer medium heat exchanger, and the one bypass flow path are included in the one circulation circuit, and such that at least one of the devices to be heat-exchanged, the cooler, and the other bypass flow path of the first and second bypass flow paths are included in the other circulation circuit of the first and second circulation circuits.

9. The thermal management system for a vehicle according to claim 6, wherein
the cooler is a low-pressure side heat exchanger of a refrigeration cycle, and
the heater is a high-pressure side heat exchanger of the refrigeration cycle, wherein
when a total of an amount of heat generated by the devices to be heat-exchanged and an amount of heat dissipation into the heat transfer medium from the high-pressure side heat exchanger is estimated not to exceed a heat amount necessary for heating of the vehicle interior, the first circulation portion and the second circulation portion switch the flow of the heat transfer medium such that the heater, the heat transfer medium-heat transfer medium heat exchanger, and one bypass flow path of the first and second bypass flow paths are included in one circulation circuit of the first and second circulation circuits, and such that the cooler and the radiator flow path are included in the other circulation circuit of the first and second circulation circuits, and
when the total is estimated to exceed the heat amount, the first circulation portion and the second circulation portion switch the flow of the heat medium such that the heater, the heat transfer medium-heat transfer medium heat exchanger, and the one bypass flow path are included in the one circulation circuit, and such that at least one of the devices to be heat-exchanged, the cooler and the other bypass flow path of the first and second bypass flow paths are included in the other circulation circuit of the first and second circulation circuits.

10. The thermal management system for a vehicle according to claim 1, wherein
the cooler is a low-pressure side heat exchanger of the refrigeration cycle,
the heater is a high-pressure side heat exchanger of the refrigeration cycle, and
at least one of the devices to be heat-exchanged is a heat storage member capable of storing therein hot heat, and
when frost is estimated to be formed on the radiator, the first circulation portion and the second circulation portion switch the flow of the heat transfer medium such that the devices to be heat-exchanged serving as the heat storage member, the cooler, and the radiator flow path are included in one circulation circuit of the first and second circulation circuits, and such that the heater, and one bypass flow path of the first and second bypass flow paths are included in the other circulation circuit of the first and second circulation circuits.

11. The thermal management system for a vehicle according to claim 1, wherein
the cooler is a low-pressure side heat exchanger of a refrigeration cycle,
the heater is a high-pressure side heat exchanger of the refrigeration cycle, and
at least one of the devices to be heat-exchanged is a heat storage member capable of storing therein hot heat, and
when frost is estimated to be formed on the radiator, the first circulation portion and the second circulation portion switch the flow of the heat transfer medium such that the devices to be heat-exchanged serving as the heat storage member, the cooler, and one bypass flow path of the first and second bypass flow paths are included in one circulation circuit of the first and second circulation circuits, and such that the heater, and the radiator flow path are included in the other circulation circuit of the first and second circulation circuits.

12. The thermal management system for a vehicle according to claim 1, wherein
the cooler is a low-pressure side heat exchanger of a refrigeration cycle,
the heater is a high-pressure side heat exchanger of the refrigeration cycle, and
at least one of the devices to be heat-exchanged is a heat storage member capable of storing therein hot heat, and
when a temperature of the device to be heat-exchanged as the heat storage member is higher than a predetermined temperature, the first circulation portion and the second circulation portion switch the flow of the heat transfer medium such that the devices to be heat-exchanged serving as the heat storage member, the cooler, and one bypass flow path of the first and second bypass flow paths are included in one circulation circuit of the first and second circulation circuits, and such that the heater, and the other bypass flow path of the first and second bypass flow paths are included in the other circulation circuit of the first and second circulation circuits.

13. The thermal management system for a vehicle according to claim 1, further comprising:
a blower blowing air in a vehicle interior;
a casing forming an air passage through which the air flows; and
an air flow switching device switching a flow of the air in the air passage, wherein
one of the devices to be heat-exchanged is a battery heat exchanger that exchanges heat between a battery and the heat transfer medium via air,
the battery and the battery heat exchanger are disposed in the air passage, and
the casing is provided with an air discharge port that discharges the air having flowed through the air passage to an outside of the vehicle,
the air flow switching device is capable of switching between a first air flow state of allowing the air to flow through the battery heat exchanger, the battery, and the air discharge port in that order, and a second air flow state of allowing the air to flow through the battery, the battery heat exchanger, and the air discharge port in that order,
in a case of transferring hot heat from the air to the heat transfer medium, when a temperature of the battery is higher than that of the air, the air flow switching device switches the air flow to the second air flow state, whereas when a temperature of the battery is lower than that of the air, the air flow switching device switches the air flow to the first air flow state, and
in a case of transferring cold heat from the air to the heat medium, when a temperature of the battery is higher than that of the air, the air flow switching device switches the air flow to the first air flow state, whereas when a temperature of the battery is lower than that of the air, the air flow switching device switches the air flow to the second air flow state.

14. The thermal management system for a vehicle according to claim 13, wherein,
when the vehicle interior is heated and a temperature of the vehicle interior is higher than an outside air temperature, the first circulation portion and the second circulation portion switch the flow of the heat transfer medium such that the battery heat exchanger, the heat transfer medium-refrigerant heat exchanger, and the cooler are included in one circulation circuit of the first and second circulation circuits.

15. The thermal management system for a vehicle according to claim 1, further comprising:
a blower blowing air in a vehicle interior;
a casing forming an air passage through which the air flows; and
an air flow switching device switching a flow of the air in the air passage, wherein
one of the devices to be heat-exchanged is a battery heat exchanger that exchanges heat between a battery and the heat transfer medium via air,
the battery and the battery heat exchanger are disposed in the air passage, and
the casing is provided with an air discharge port through which the air having flowed through the air passage is discharged to an outside of the vehicle,
the air flow switching device is capable of switching between a first air flow state of allowing the air to flow through the battery heat exchanger, the battery, and the air discharge port in that order, and a second air flow state of allowing the air to flow through the battery, the battery heat exchanger, and the air discharge port in that order,
in a case of transferring hot heat from the air to the heat transfer medium, when a temperature of the battery is higher than that of the air, the air flow switching device switches the air flow to the second air flow state, whereas when a temperature of the battery is lower than that of the air, the air flow switching device switches the air flow to the first air flow state, and
in a case of transferring cold heat from the air to the heat transfer medium, when a temperature of the battery is higher than that of the air, the air flow switching device switches the air flow to the first air flow state, whereas when a temperature of the battery is lower than that of the air, the air flow switching device switches the air flow to the second air flow state.

16. The thermal management system for a vehicle according to claim 1, further comprising:
a blower blowing air in a vehicle interior; and
a casing forming an air passage through which the air flows, wherein
one of the devices to be heat-exchanged is a battery heat exchanger that exchanges heat between a battery and the heat transfer medium, wherein
the casing is provided with an air discharge port through which the air having flowed through the air passage is discharged to an outside of the vehicle,
the battery heat exchanger and the battery are arranged in the air passage so as to allow the air to flow therethrough in that order,
when hot heat is transmitted from the air to the heat transfer medium, the first circulation portion and the second circulation portion switch the flow of the heat transfer medium such that the battery heat exchanger and the cooler are included in one circulation circuit of the first and second circulation circuits, and
when cold heat is transmitted from the air to the heat transfer medium, the first circulation portion and the second circulation portion switch the flow of the heat transfer medium such that the battery heat exchanger and the heater are included in one circulation circuit of the first and second circulation circuits.

17. The thermal management system for a vehicle according to claim 16, wherein when a temperature of the battery is equal to or lower than a predetermined value, the first circulation portion and the second circulation portion switch the flow of the heat transfer medium such that the cooler, the device to be heat-exchanged among the devices to be heat-exchanged other than the battery heat exchanger, and one bypass flow path of the first and second bypass flow paths or the radiator flow path are included in one circulation circuit of the first and second circulation circuits, and such that the battery heat exchanger, the heater, and the other bypass flow path of the first and second bypass flow paths are included in the other circulation circuit of the first and second circulation circuits.

18. The thermal management system for a vehicle according to claim 17, wherein the predetermined value is 0° C.

19. The thermal management system for a vehicle according to claim 1, wherein
the cooler is a low-pressure side heat exchanger of the refrigeration cycle, and
the heater is a high-pressure side heat exchanger of the refrigeration cycle,
the thermal management system includes a heat medium-refrigerant heat exchanger exchanging heat between the heat transfer medium flowing through one of the device flow paths and refrigerant flowing from the heater,
the refrigeration cycle includes a cooling heat exchanger that exchanges heat between the refrigerant and air to be blown into the vehicle interior to cool the air, and
when the vehicle interior is cooled by the air cooled by the cooling heat exchanger, the heat transfer medium-refrigerant heat exchanger and the battery heat exchanger are included in one circulation circuit of the first and second circulation circuits.

20. The thermal management system for a vehicle according to claim 19, wherein the heat transfer medium-refrigerant heat exchanger and the battery heat exchanger are arranged in series in one device flow path of the device flow paths.

21. The thermal management system for a vehicle according to claim 19, wherein an expansion valve decompressing and expanding the refrigerant having flowed from the heater is disposed between the heater and the heat transfer medium-refrigerant heat exchanger in the refrigeration cycle.

22. The thermal management system for a vehicle according to claim 21, wherein
when the vehicle interior is heated and a temperature of the vehicle interior is higher than an outside air temperature,
the first circulation portion and the second circulation portion switch the flow of the heat transfer medium such that the battery heat exchanger, the heat transfer medium-refrigerant heat exchanger, and the cooler are included in one circulation circuit of the first and second circulation circuits, and
the expansion valve decompresses and expands the refrigerant flowing from the heat exchanger such that a refrigerant pressure in the heat transfer medium-refrigerant heat exchanger is a pressure positioned between a refrigerant pressure in the heater and a refrigerant pressure in the cooler, and such that an evaporation temperature of a refrigerant in the heat transfer medium-refrigerant heat exchanger is lower than that of the heat transfer medium circulating through the heat transfer medium-refrigerant heat exchanger.

23. The thermal management system for a vehicle according to claim 21, wherein
when the vehicle interior is heated and a temperature of the vehicle interior is higher than an outside air temperature,
the first circulation portion and the second circulation portion switch the flow of the heat transfer medium such that the battery heat exchanger, the heat transfer medium-refrigerant heat exchanger, and the cooler are included in one circulation circuit of the first and second circulation circuits, and
the expansion valve decompresses and expands the refrigerant flowing from the heater such that a refrigerant pressure in the heat transfer medium-refrigerant heat exchanger is a pressure positioned between a refrigerant pressure in the heater and a refrigerant pressure in the cooler, and such that an evaporation temperature of a refrigerant in the heat transfer medium-refrigerant heat exchanger is lower than that of the heat transfer medium circulating through the heat transfer medium-refrigerant heat exchanger.

24. The thermal management system for a vehicle according to claim 1, wherein
the second circulation portion has a first switching valve that distributes the heat transfer media for the two systems with respect to the second flow path group, and a second switching valve that collects the heat transfer media for the two systems with respect to the second flow path group,
the first switching valve has a first inlet for inflow of the heat transfer medium discharged from the first pump, a second inlet for inflow of the heat transfer medium discharged from the second pump, and a number of outlets for outflow of the heat transfer medium individually with respect to the cooler flow path, the heater flow path, and the device flow paths, and
the second switching valve has a first outlet for outflow of the heat transfer medium to be sucked by the first pump, a second outlet for outflow of the heat transfer medium to be sucked by the second pump, and a number of inlets for individual inflow of the heat transfer medium having flowed from the cooler flow path, the heater flow path, and the device flow paths.

25. The thermal management system for a vehicle according to claim 24, wherein
the first circulation portion includes:
a three-way valve connected to the first outlet, an inlet side of the radiator flow path, and an inlet side of one bypass flow path of the first and second bypass flow paths;
a first communication flow path for communication between the second outlet and the other bypass flow path of the first and second bypass flow paths;
a merging flow path for communication among an outlet side of the radiator flow path, an outlet side of the one bypass flow path, and the first inlet; and
a second communication flow path for communication between the other bypass flow path and the second inlet, and wherein
the first pump is disposed between the merging flow path and the first inlet, and
the second pump is disposed between the second communication flow path and the second inlet.

26. The thermal management system for a vehicle according to claim 24, wherein
the first circulation portion includes:
a branch flow path for communication among the first outlet, an inlet side of the radiator flow path, and an inlet side of one bypass flow path of the first and second bypass flow paths;
a first communication flow path for communication between a second outlet of the second switching valve and the other bypass flow path of the first and second bypass flow paths;
a three-way valve connected to an outlet side of the radiator flow path, an outlet side of the one bypass flow path, and the first inlet; and
a second communication flow path for communication between the other bypass flow path and a second inlet of the first switching valve, wherein
the first pump is disposed between the first outlet and the branch flow path, and
the second pump is disposed between the second outlet and the first communication flow path.

27. The thermal management system for a vehicle according to claim 24, further comprising:
a temperature detector detecting a temperature of the heat medium flowing into the first inlet and a temperature of the heat transfer medium flowing into the second inlet, wherein
the first switching valve includes a mixing space that mixes the heat transfer medium flowing into the first inlet and the heat transfer medium flowing into the second inlet, and a valve body that adjusts a mixing ratio of the heat transfer medium flowing into the first inlet to the heat transfer medium flowing into the second inlet based on a temperature of the heat transfer medium required by the devices to be heat-exchanged, and
the second switching valve includes a distribution space that distributes the heat medium flowing into a number of inlets to the heat transfer medium flowing from the first outlet and the heat transfer medium flowing from the second outlet, and a valve body that adjusts a distribution ratio of the heat transfer medium flowing from the first outlet to the heat transfer medium flowing from the second outlet based on the mixing ratio.

28. The thermal management system for a vehicle according to claim 1, wherein
the cooler is a low-pressure side heat exchanger in a refrigeration cycle, and cools the heat transfer medium by exchanging heat between a low-pressure refrigerant in the refrigeration cycle and the heat transfer medium, and
the heater is a high-pressure side heat exchanger in the refrigeration cycle, and heats the heat transfer medium by exchanging heat between a high-pressure refrigerant in the refrigeration cycle and the heat transfer medium.

29. The thermal management system for a vehicle according to claim 28, wherein
the refrigeration cycle includes:
a first expansion valve decompressing a refrigerant flowing into the cooler;
a cooling heat exchanger that exchanges heat between the low-pressure refrigerant and air to be blown into the vehicle interior to cool the air, the heat exchanger being adapted to allow the low-pressure refrigerant to flow therethrough in parallel with the cooler;
a second expansion valve decompressing a refrigerant flowing into the cooling heat exchanger; and
an electromagnetic valve opening or closing a refrigerant flow path between the first expansion valve and a branch portion that branches a flow of the refrigerant into a side of the cooler and a side of the cooling heat exchanger.

30. The thermal management system for a vehicle according to claim 1, wherein the heat transfer medium is a fluid containing nanoparticles with a particle diameter of the order of nanometer.

31. The thermal management system for a vehicle according to claim 30, wherein an aspect ratio of the nanoparticle is 50 or more.

32. The thermal management system for a vehicle according to claim 31, wherein a constituent atom of the nanoparticle includes one of Au, Ag, Cu, and C.

33. The thermal management system for a vehicle according to claim 32, wherein the nanoparticle includes at least one of a carbon nanotube, a graphene, and a graphite.

* * * * *